US011533471B2

(12) United States Patent
Tsukuba

(10) Patent No.: US 11,533,471 B2
(45) Date of Patent: Dec. 20, 2022

(54) IMAGE PROCESSING APPARATUS AND IMAGE PROCESSING METHOD

(71) Applicant: Sony Corporation, Tokyo (JP)

(72) Inventor: Takeshi Tsukuba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/252,292

(22) PCT Filed: Jun. 7, 2019

(86) PCT No.: PCT/JP2019/022684
§ 371 (c)(1),
(2) Date: Dec. 15, 2020

(87) PCT Pub. No.: WO2019/244669
PCT Pub. Date: Dec. 26, 2019

(65) Prior Publication Data
US 2021/0266525 A1 Aug. 26, 2021

(30) Foreign Application Priority Data

Jun. 22, 2018 (JP) .............................. JP2018-119063

(51) Int. Cl.
*H04N 19/132* (2014.01)
*H04N 19/137* (2014.01)
(Continued)

(52) U.S. Cl.
CPC ............. *H04N 19/105* (2014.11); *G06F 7/24* (2013.01); *H04N 19/132* (2014.11);
(Continued)

(58) Field of Classification Search
CPC .......................... H04N 19/105; H04N 19/132
See application file for complete search history.

(56) References Cited

U.S. PATENT DOCUMENTS 10,595,046 B2 * 3/2020 Tsukuba ............... H04N 19/517
10,863,190 B2 * 12/2020 Li ........................ H04N 19/577
(Continued)

FOREIGN PATENT DOCUMENTS

JP   2001-61151 A    3/2001
JP   2012-532501 A   12/2012
WO   2010/131601 A1  11/2010

OTHER PUBLICATIONS

Essenlik (Huawei) S et al: "Description of Core Experiment 9 (CE9): Decoder Side Motion Vector Derivation", 10. JVET Meeting: Apr. 19, 2018-Apr. 20, 2018: San Diego, (The Joint Video Exploration Team of ISO/IEC JTC1/SC29/WG11 and ITU-T SG.16). No. JVET-J1029 Apr. 20, 2018 (Apr. 20, 2018), XP030151328. Retrieved from the Internet: URL: http://phenix.int-evry.fr/jvet/doc_end_user/documents/ 1 Q_San%20Diego/wg11/JVET-J1029-v1.zip JVET-J1029.doc [retrieved on Apr. 20, 2018].

(Continued)

*Primary Examiner* — Irfan Habib
(74) *Attorney, Agent, or Firm* — Xsensus LLP

(57) ABSTRACT

An image processing apparatus and an image processing method make it possible to suppress increase of the load of template matching. For each of motion vector candidates of accuracy rougher than accuracy of a motion vector candidate list, template matching between a template of a current block and a template of a reference block is performed to derive a cost, and elements of the motion vector candidate list are sorted on the basis of the derived costs of the motion vector candidates. Alternatively, for each of motion vector candidates of accuracy rougher than accuracy of a motion vector candidate list, template matching between a template of a current block and a template of a search point is performed to derive a cost, and a modification motion vector candidate (Continued)

is derived on the basis of the derived costs of the motion vector candidates.

16 Claims, 56 Drawing Sheets

(51) Int. Cl.
    *H04N 19/159*     (2014.01)
    *H04N 19/176*     (2014.01)
    *H04N 19/105*     (2014.01)
    *G06F 7/24*     (2006.01)

(52) U.S. Cl.
    CPC ......... *H04N 19/137* (2014.11); *H04N 19/159* (2014.11); *H04N 19/176* (2014.11)

(56) References Cited

U.S. PATENT DOCUMENTS

| | | | |
|---|---|---|---|
| 11,109,055 B2* | 8/2021 | Liu | H04N 19/137 |
| 2011/0176611 A1 | 7/2011 | Huang | |
| 2018/0199057 A1* | 7/2018 | Chuang | H04N 19/573 |
| 2020/0068218 A1* | 2/2020 | Chen | H04N 19/82 |
| 2020/0374543 A1* | 11/2020 | Liu | H04N 19/543 |
| 2020/0413045 A1* | 12/2020 | Zhang | H04N 19/159 |

OTHER PUBLICATIONS

Wien Met al: "TE1: RWTH partner report on DMVD". 2. JCT-VC Meeting: Jul. 21, 2010-Jul. 28, 201 O; Geneva; (Joint CollaborativeTeam on Video Coding of ISO/IEC JTC1/SC29/WG11 and ITU-T SG.16 ); URL: http://wftp3.itu.int/av-arch/jctvc-site/,, No. JCTVC-8030, Jul. 23, 2010 (Jul. 23, 2010), XP030007610.

International Search Report and Written Opinion dated Aug. 27, 2019 for PCT/JP2019/022684 filed on Jun. 7, 2019, 11 pages including English Translation of the International Search Report.

Hsu et al., "Description of SDR video coding technology proposal by MediaTek", Joint Video Experts Team (JVET) of ITU-T SG 16 WP 3 and ISO/IEC JTC 1/SC 29/WG 11, 10th Meeting, San Diego, US, Apr. 10-20, 2018, 12 pages.

An et al., "Enhanced Merge Mode based on JEM7.0", Joint Video Experts Team (JVET) of ITU-T SG 16 WP 3 and ISO/IEC JTC 1/SC 29/WG 11, 10th Meeting, San Diego, US, Apr. 10-20, 2018, pp. 1-7.

Koo et al., "Description of SDR video coding technology proposal by LG Electronics", Joint Video Experts Team (JVET) of ITU-T SG 16 WP 3 and ISO/IEC JTC 1/SC 29/WG 11, 10th Meeting, San Diego, US, Apr. 10-20, 2018, 8 pages.

ITU-T, "Advanced video coding for generic audiovisual services", Telecommunication Standardization Sector of ITU, H.264, Feb. 2016, pp. 1-781.

ITU-T, "High efficiency video coding", Telecommunication Standardization Sector of ITU, H.265, Nov. 2019, p. 1-692.

JVET, "Working Draft 1 of Versatile Video Coding", Joint Video Experts Team (JVET) of ITU-T SG 16 WP 3 and ISO/IEC JTC 1/SC 29/WG 11, 10th Meeting, San Diego, US, Apr. 10-20, 2018, pp. 1-36.

* cited by examiner

FIG. 3

| METHOD | SORTING PROCESS | EFFECT |
|---|---|---|
| #1 | SIMPLIFICATION OF TEMPLATE MATCHING | LOAD SUPPRESSION OF TEMPLATE MATCHING |
| #1-1 | TEMPLATE MATCHING IS PERFORMED IN ROUGH ACCURACY | SIMPLIFICATION OF CALCULATION OF TEMPLATE MATCHING |
| #1-2 | TEMPLATE MATCHING OF OVERLAPPING MV IS SKIPPED | REDUCTION OF NUMBER OF TIMES OF TEMPLATE MATCHING |
| #1-3 | TEMPLATE IS THINNED OUT ACCORDING TO PU SIZE | REDUCTION OF CALCULATION AMOUNT OF TEMPLATE MATCHING |
| #1-4 | IN CASE WHERE PU IS ADJACENT CTU BOUNDARY, NUMBER OF TEMPLATE LINES IS REDUCED | REDUCTION OF LINE BUFFER SIZE |
| #1-5 | IN CASE WHERE PU SIZE IS SMALL, MV CORRECTION IS SKIPPED | REDUCTION OF USED MEMORY BANDWIDTH |
| #1-6 | TEMPLATE MATCHING BY SINGLE PREDICTION IS PERFORMED FOR MULTIPLE PREDICTION CANDIDATE MVS | REDUCTION OF CALCULATION AMOUNT OF TEMPLATE MATCHING |

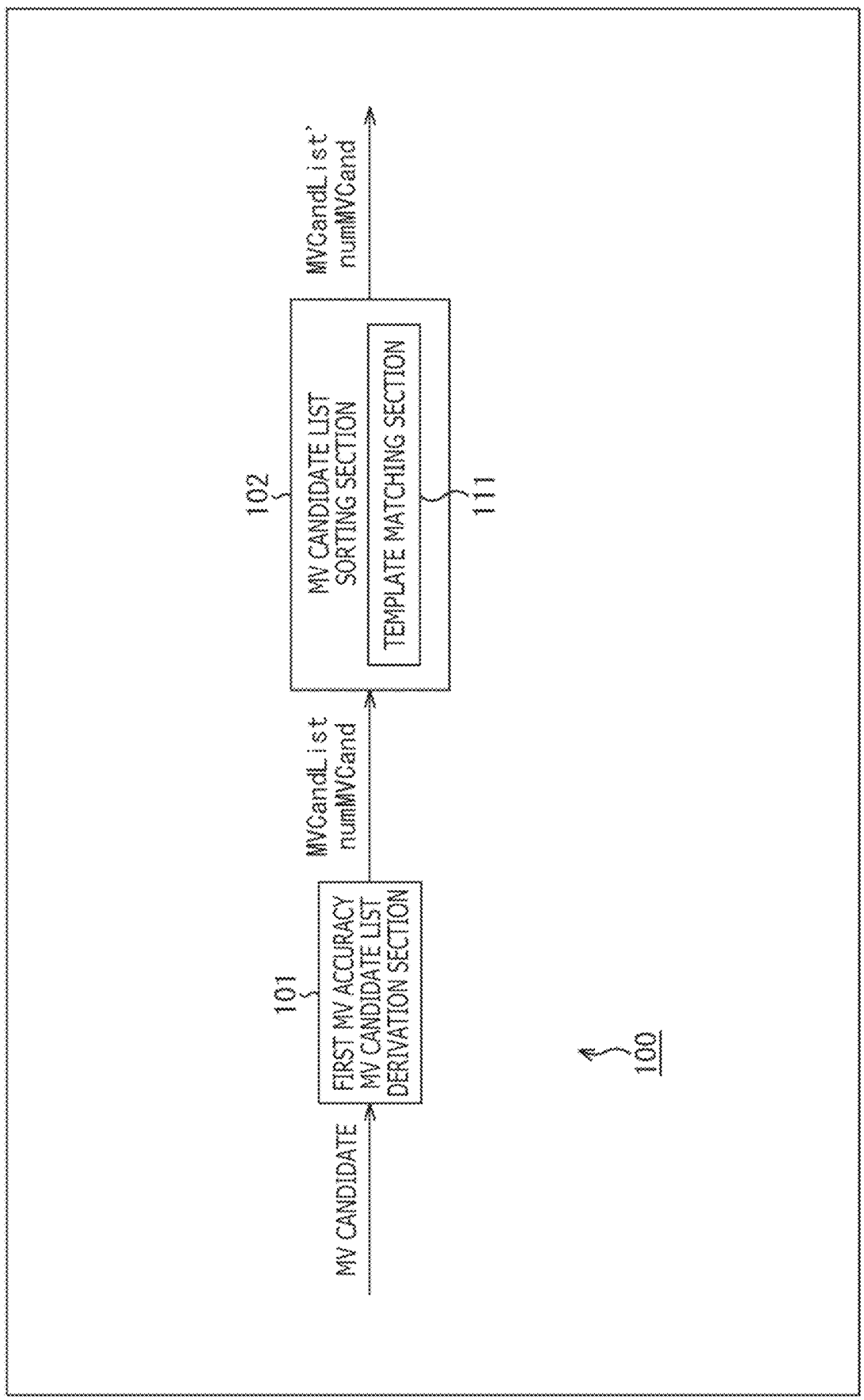

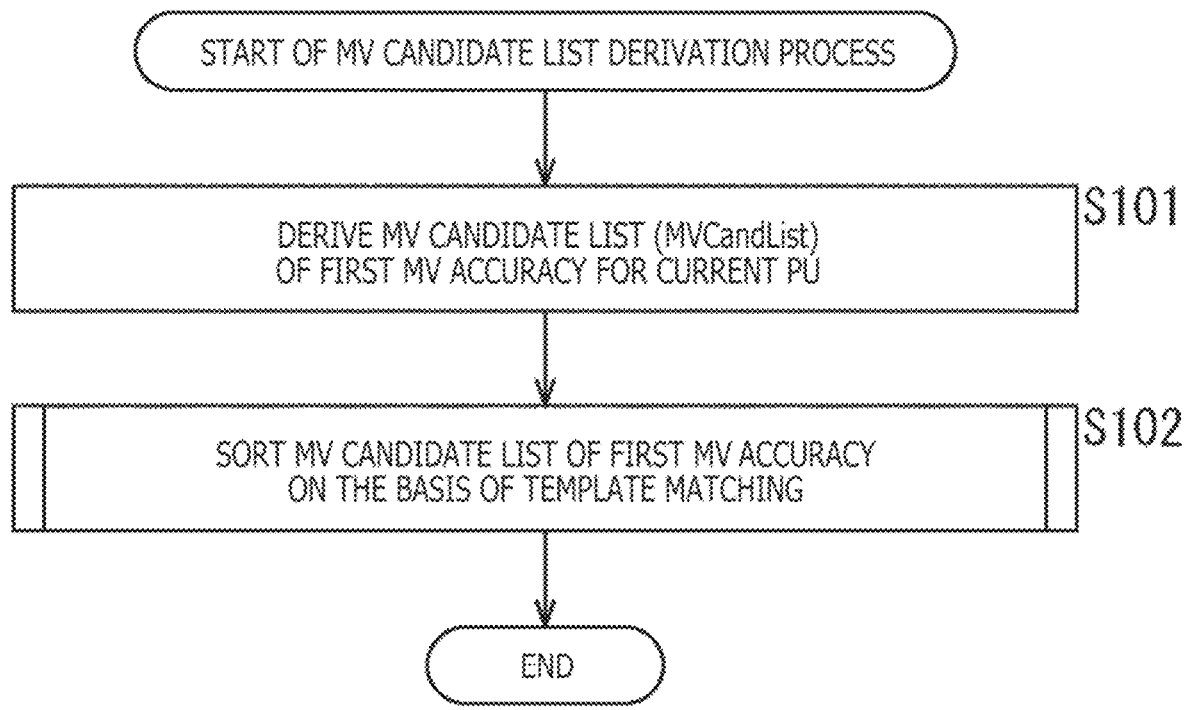

FIG. 9

| Index | FIRST MV ACCURACY MV Candidates (MV Candidates) | SECOND MV ACCURACY MV Candidates (Coarse MV Candidates) | TEST FLAG (ToBeTestedFlag) | COST REFERENCE INDEX (CostRefIndex) | Comment |
|---|---|---|---|---|---|
| 0 | A1 | A1' | 1 | -1 | SINCE TEMPLATE MATCHING FOR CANDIDATE MVS OF A1' OF SECOND MV ACCURACY IS PERFORMED, SET ToBeTestedFlag = 1, CostRefIdx = -1 |
| 1 | B1 | B1' | 1 | -1 | SINCE TEMPLATE MATCHING FOR CANDIDATE MVS OF B1' OF SECOND MV ACCURACY IS PERFORMED, SET ToBeTestedFlag = 1, CostRefIdx = -1 |
| 2 | B0 | B0' | 0 | 0 | SINCE CANDIDATE MVS OF B0' OF SECOND MV ACCURACY ARE SAME IN MOTION INFORMATION AS A1', IN ORDER TO OMIT TEMPLATE MATCHING AND SUBSTITUTE IT WITH COST OF A1', ToTestedFlag = 0, CostRefIdx = 0 |
| 3 | A0 | A0' | 1 | -1 | SINCE TEMPLATE MATCHING FOR CANDIDATE MVS OF A0' OF SECOND MV ACCURACY IS PERFORMED, SET ToTestedFlag = 1, CostRefIdx = -1 |
| 4 | Col | Col' | 0 | 1 | SINCE CANDIDATE MVS OF Col' OF SECOND MV ACCURACY ARE SAME IN MOTION INFORMATION AS B1', TEMPLATE MATCHING IS OMITTED AND SET ToTestedFlag = 0, CostRefIdx = 1 |
| ... | ... | ... | ... | ... | |
| numMVCand-1 | X | X' | 0 | 3 | SINCE CANDIDATE MVS OF X' OF SECOND MV ACCURACY ARE SAME IN MOTION INFORMATION AS A0', TEMPLATE MATCHING IS OMITTED AND SET ToTestedFlag = 0, CostRefIdx = 3 |

FIG. 10

```
/*PSEUDO CODE*/
ToBeTestedFlagList[i] = 1;           (i=0, ..., numMVCand-1)
CostRefIdxList[i] = -1;               (i=0, ..., numMVCand-1)

for (idx=0; idx<numMVCand; idx++)
{
  if (ToBeTestedFlagList[idx] == 1)
  {
    // LOOP FOR CONFIRMATION ABOUT WHETHER OVERLAPPING MVS EXIST
    numSameMV = 0;   // TEMPORARY VARIABLE INDICATIVE OF NUMBER OF OVERLAPPING MVS
    for (idx2 = idx + 1; idx2 < numMVCand; idx2++)
    {
      // CHECK WHETHER SECOND MV ACCURACY MV CANDIDATE OF idx AND SECOND MV ACCURACY MV CANDIDATE OF idx2 ARE SAME
      if (CoarseMVCandList[idx] == CoarseMVCandList[idx2])   // THEY ARE OVERLAPPING MVS
      {
        // TEST FLAG OF SECOND MV ACCURACY MV CANDIDATE OF idx AND '1' ARE ORED
        ToBeTestedFlagList[idx] |= 1;

// TEST FLAG FOR SECOND MV ACCURACY MV CANDIDATE OF idx2 IS SET TO 0
        ToBeTestedFlagList[idx2] = 0;

// idx IS SET AS COST REFERENCE DESTINATION FOR SECOND MV ACCURACY MV CANDIDATE OF idx2
        costRefIdxList[idx2] = idx;

numSameMV++;   // NUMBER OF OVERLAPPING MVS IS INCREMENTED BY 1
      } // end of if (CoarseMVCandList[idx] == CoarseMVCandList[idx2])
    } // end of for (idx2 = idx + 1; idx2 < numMVCand; idx2++)
  } // end of if ( ToBeTestedFlagList [idx] == 1)
} // end of for (idx=0; idx<numMVCand; idx++)
```

'IF INTER-PREDICTION IDENTIFIER inter_pred_idc == 'L0 PREDICTION', THEN REFERENCE LX PREDICTION refLXPred IS SET TO 'L0 PREDICTION'. THAT IS, refLXPred = 'L0 PREDICTION'

'IF INTER-PREDICTION IDENTIFIER inter_pred_idc == 'L1 PREDICTION', THEN REFERENCE LX PREDICTION refLXPred IS SET TO 'L1 PREDICTION'. THAT IS, refLXPred = 'L1 PREDICTION'

'IF INTER-PREDICTION IDENTIFIER inter_pred_idc == 'BI-PREDICTION', THEN REFERENCE LX PREDICTION refLXPred IS SET TO ONE OF 'L0 PREDICTION' OR 'L1 PREDICTION' ON THE BASIS OF PREDETERMINE RULE

B

```
if abs(getPoc( curPic ) ? getPoc( refPicL0)) < abs ( getPoc( curPic) ? getPoc ( refPicL1)):
    refLXPred = 'L0 PREDICTION';
else if abs (getPoc( curPic ) ? getPoc( refPicL0)) > abs ( getPoc( curPic) ? getPoc ( refPicL1)):
    refLXPred = 'L1 PREDICTION';
else abs(getPoc( curPic ) ? getPoc( refPicL0)) == abs ( getPoc( curPic) ? getPoc ( refPicL1)):
    refLXPred = 'L0 PREDICTION';
```

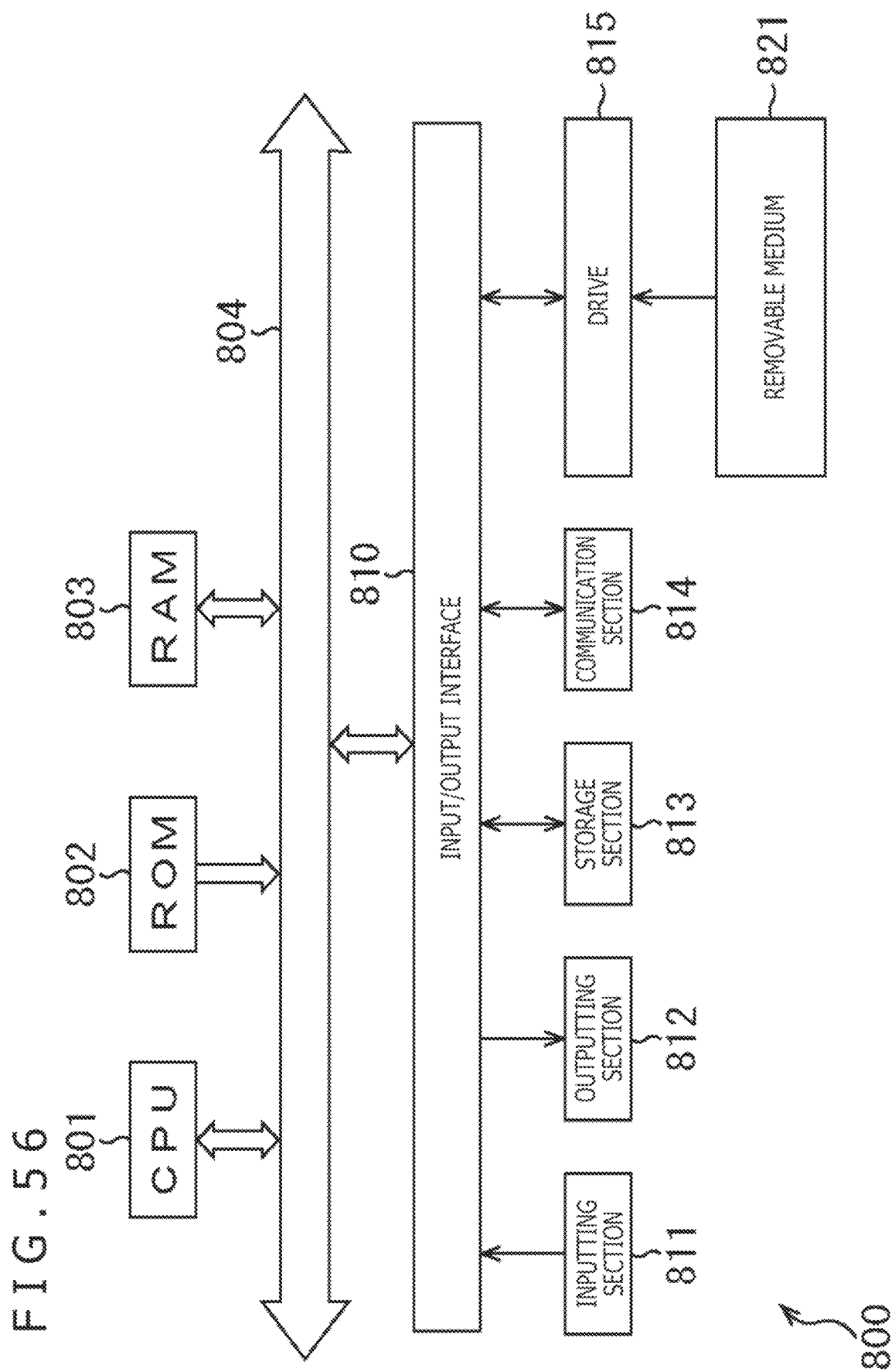

IMAGE PROCESSING APPARATUS AND IMAGE PROCESSING METHOD

CROSS-REFERENCE TO RELATED APPLICATIONS

The present application is based on PCT filing PCT/JP2019/022684, filed Jun. 7, 2019, which claims priority to JP 2018-119063, filed Jun. 22, 2018, the entire contents of each are incorporated herein by reference.

TECHNICAL FIELD

The present disclosure relates to an image processing apparatus and an image processing method, and specifically to an image processing apparatus and an image processing method that make it possible to suppress increase of the load of template matching.

BACKGROUND ART

Conventionally, in inter prediction of image encoding, a mode is available in which encoding of a motion vector using a prediction motion vector is performed. In this encoding of a motion vector, an MV candidate list that is a list of candidates for a prediction motion vector (also called MV candidates) is generated, and one of the MV candidates in the MV candidate list is selected and used as a prediction motion vector.

In recent years, a method of sorting an order of MV candidates in this MV candidate list on the basis of costs derived by template matching has been proposed (for example, refer to NPL 1).

CITATION LIST

Non Patent Literature

[NPL 1]

Moonmo Koo, Jin Heo, Junghak Nam, Naeri Part, Jaeho Lee, Jangwon Choi, Sunmi Yoo, Hyeongmun Jang, Ling Li, Jaehyun Lim, "Description of SDR video coding technology proposal by LG Electronics," JVET-J0017-v1, Joint Video Experts Team (JVET) of ITU-T SG 16 WP 3 and ISO/IEC JTC 1/SC 29/WG 11 10th Meeting: San Diego, Calif., 10-20 Apr. 2018

SUMMARY

Technical Problem

However, in the case of the method described in NPL 1, since template matching for deriving a cost is performed for each of MV candidates of the MV candidate list, there is the possibility that the load by this template matching increases.

The present disclosure has been made in view of such a situation as described above and makes it possible to suppress increase of the load of template matching.

Solution to Problem

The image processing apparatus of one aspect of the present technology is an image processing apparatus including a template matching section configured to perform, for each of motion vector candidates of accuracy rougher than accuracy of a motion vector candidate list, template matching between a template of a current block and a template of a reference block to derive a cost, and a sorting section configured to sort elements of the motion vector candidate list on the basis of the costs of the motion vector candidates derived by the template matching section.

The image processing method of one aspect of the present technology is an image processing method including performing, for each of motion vector candidates of accuracy rougher than accuracy of a motion vector candidate list, template matching between a template of a current block and a template of a reference block to derive a cost, and sorting elements of the motion vector candidate list on the basis of the derived costs of the motion vector candidates.

The image processing apparatus of another aspect of the present technology is an image processing apparatus including a template matching section configured to perform, for each of motion vector candidates of accuracy rougher than accuracy of a motion vector candidate list, template matching between a template of a current block and a template of a search point to derive a cost, and an update section configured to derive a modification motion vector candidate on the basis of the costs of the motion vector candidates derived by the template matching section and update the motion vector candidate list by use of the derived modification motion vector candidate.

The image processing method of another aspect of the present technology is an image processing method including performing, for each of motion vector candidates of accuracy rougher than accuracy of a motion vector candidate list, template matching between a template of a current block and a template of a search point to derive a cost, and deriving a modification motion vector candidate on the basis of the derived costs of the motion vector candidates and updating the motion vector candidate list by use of the derived modification motion vector candidate.

In the image processing apparatus and the image processing method of the one aspect of the present technology, for each of motion vector candidates of accuracy rougher than accuracy of a motion vector candidate list, template matching between a template of a current block and a template of a reference block is performed to derive a cost, and elements of the motion vector candidate list are sorted on the basis of the derived costs of the motion vector candidates.

In the image processing apparatus and the image processing method of the another aspect of the present technology, for each of motion vector candidates of accuracy rougher than accuracy of a motion vector candidate list, template matching between a template of a current block and a template of a search point is performed to derive a cost, a modification motion vector candidate is derived on the basis of the derived costs of the motion vector candidates, and then the motion vector candidate list is updated by use of the derived modification motion vector candidate.

Advantageous Effects of Invention

According to the present disclosure, an image can be processed. Especially, increase of the load of template matching can be suppressed. It is to be noted that advantageous effects described above are not restrictive, and any advantageous effects indicated in the present specification or other advantageous effects that can be grasped from the present specification may be achieved together with the advantageous effects described above or in place of the advantageous effects described above.

BRIEF DESCRIPTION OF DRAWINGS

FIG. 3 is a view depicting a main example of a method of template matching to which the present technology is applied.

FIG. 4 is a block diagram depicting an example of principal components of an MV candidate list derivation apparatus.

FIG. 5 is a flow chart illustrating an example of a flow of an MV candidate list derivation process.

FIG. 9 is a view depicting an example of setting of a test flag and a cost reference index.

FIG. 10 is a view depicting an example of a pseudo code.

FIG. 26 is a view depicting a manner of setting of reference LX prediction.

FIG. 56 is a block diagram depicting an example of principal components of a computer.

DESCRIPTION OF EMBODIMENTS

Figure 1:
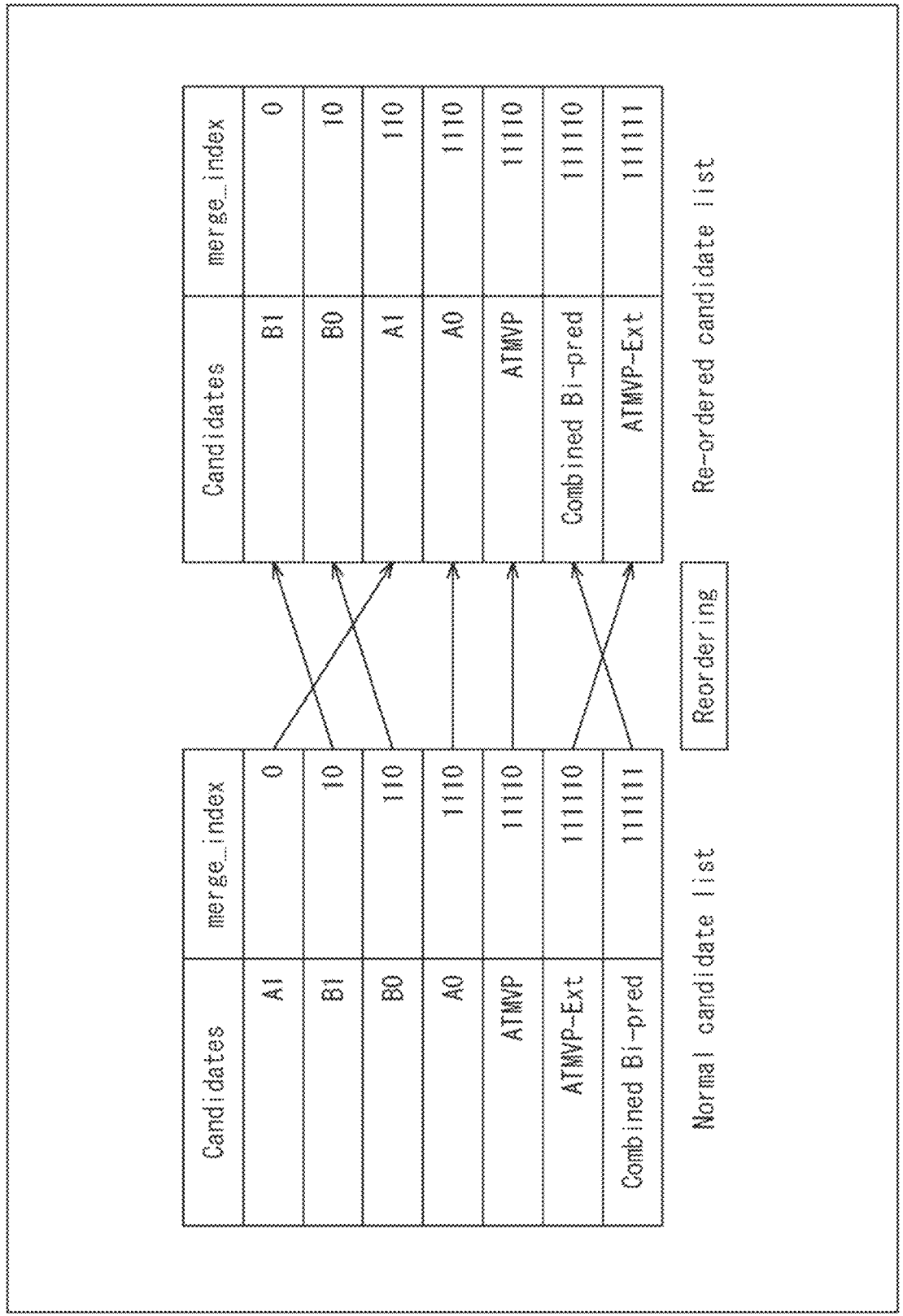
FIG. 1 is a view depicting an example of sorting of an MV candidate list.

In the following, modes for carrying out the present disclosure (hereinafter referred to as embodiments) are described. It is to be noted that description is given in the following order.
1. Simplification of Template Matching
2. First Embodiment (Application to Sorting of MV Candidate List)
3. Second Embodiment (Application to Image Encoding Apparatus)
4. Third Embodiment (Application to Image Decoding Apparatus)
5. Fourth Embodiment (Application to Modification MV Candidate Derivation)
6. Fifth Embodiment (Application to Difference Motion Vector Derivation)
7. Appendix

1. Simplification of Template Matching

Documents and So Forth That Support Technical Contents and Technical Terms

The scope disclosed in the present technology not only includes contents described in the embodiments but also includes contents described in the following non-patent literature that are publicly known at the time of the application of the present technology.
NPL 1: (specified hereinabove)
NPL 2: Jianle Chen, Elena Alshina, Gary J. Sullivan, Jens-Rainer, Jill Boyce, "Algorithm Description of Joint Exploration Test Model 4," JVET-G1001 v1, Joint Video Exploration Team (JVET) of ITU-T SG 16 WP 3 and ISO/IEC JTC 1/SC 29/WG 11 7th Meeting: Torino, IT, 13-21 Jul. 2017
NPL 3: TELECOMMUNICATION STANDARDIZATION SECTOR OF ITU (International Telecommunication Union), "Advanced video coding for generic audiovisual services," H.264, 04/2017
NPL 4: TELECOMMUNICATION STANDARDIZATION SECTOR OF ITU (International Telecommunication Union), "High efficiency video coding," H.265, 12/2016
NPL 5: B. Bross, "Versatile Video Coding (Draft 1)," JVET-J1001, Joint Video Experts Team (JVET) of ITU-T SG 16 WP 3 and ISO/IEC JTC 1/SC 29/WG 11 10th Meeting: San Diego, US, 10-20 Apr. 2018
NPL 6: Jiane Chen, Elena Alshina, "Algorithm description for Versatile Video Coding and Test Model 1 (VTM 1)," JVET-J1002, Joint Video Experts Team (JVET) of ITU-T SG 16 WP 3 and ISO/IEC JTC 1/SC 29/WG 11 10th Meeting: San Diego, US, 10-20 Apr. 2018
NPL 7: Huanbang Chen, Jianle Chen, Roman Chernyak, Semih Esenlik, Alexey Filippov, Shan Gao, Sergey Ikonin, Alexander Karabutov, Anand Meher Kotra, Xiaomu Lu, Xiang Ma, Vasily Rufitskiy, Timofey Solovyev, Victor Stepin, Maxim Sychev, Tian Wang, Ye-kui Wang, Weiwei Xu, Haitao Yang, Vladyslav Zakharchenko, Hong Zhang, Yin Zhao, Zhijie Zhao, Jiantong Zhou, Cheung Auyeung, Han Gao, Ivan Krasnov, Ruslan Mullakhmetov, Biao Wang, Yiu Fai Wong, Georgy Zhulikov, Adeel Abbas, David Newman, Jicheng An, Xu Chen, Yongbing Lin, Quanhe Yu, Jianhua Zheng, Sri Nitchith Akula, Alexander Alshin, Elena Alshina, Kiho Choi, Kwang Pyo Choi, Narae Choi, Woongil Choi, Amith Dsouza, Raj Narayana Gadde, Seungsoo Jeong, Bora Jin, Chanyul Kim, Sunil Lee, Junghye Min, JeongHoon Park, Minsoo Park, Min Woo Park, Yinji Piao, Chirag Pujara, Anish Tamse, Heechyul Yang, "Description of SDR, HDR and 360° video coding technology proposal by Huawei, GoPro, HiSilicon, and Samsung," JVET-J0025_v2, buJoint Video Exploration Team (JVET) of ITU-T SG 16 WP 3 and ISO/IEC JTC 1/SC 29/WG 11 10th Meeting: San Diego, US, 10-20 Apr. 2018

In short, also the contents described in the non-patent literature specified above make the basis when support requirements are decided. For example, even in the case where Quad-Tree Block Structure described in NPL 4, QTBT (Quad Tree Plus Binary Tree) Block structure described in NPL 2, and Multi-type (binary/ternay/quaternary) tree Block Structure (also called BT/TT/QT coding block structure) described in NPL 5 and NPL 6 are not directly described in the embodiments, they fall within the scope of disclosure of the present technology and satisfy the support requirements for the claims. Further, similarly, even where such technical terms as parsing, syntax, and semantics are not directly described in the embodiments, they fall within the scope of disclosure of the present technology and satisfy the support requirements for the claims.

Further, in the present specification, unless otherwise mentioned specifically, "block" (that is not a block indicative of a processing section) used in description as a partial region of an image (picture) or a processing unit indicates any partial region in a picture and is not restrictive in terms of the size, shape, characteristic, and so forth. For example, the "block" includes any partial region (processing unit) such as TB (Transform Block), TU (Transform Unit), PB (Prediction block), PU (Prediction Unit), SCU (Smallest Coding Unit), CU (Coding Unit), LCU (Largest Coding Unit), CTB (Coding Tree Block), CTU (Coding Tree Unit), transform block, sub block, macro block, tile, and slice described in NPL 2 to NPL 6 given above. Further, when to designate a size of such a block as described above, a block size may be designated not only directly but also indirectly. For example, identification information for identifying a size may be used to designate a block size. As an alternative, for example, a block size may be designated by a ratio or a difference with respect to a size of a block (for example, an LCU or an SCU) as a reference. For example, in the case where information that designates a block size is transmitted as a syntax element or the like, such information that indirectly designates a size as described above may be used as the information. This sometimes makes it possible to reduce the amount of the information and improve the encoding efficiency. Further, the designation of a block size includes also a designation of a range of a block size (for example, a designation of a range of a permissible block size or the like).

Further, in the present specification, encoding not only includes entire processes for converting an image into a bit stream but also includes part of such processes. For example, encoding not only includes processing comprehensively including a prediction process, orthogonal transform, quantization, arithmetic encoding, and so forth but also includes processing that comprehensively includes a process that collectively refers to quantization and arithmetic encoding, a process comprehensively including a prediction process, quantization, and arithmetic encoding, and so forth. Similarly, decoding not only includes entire processes for converting a bit stream into an image but also includes part of such processes. For example, decoding not only includes processing comprehensively including back arithmetic decoding, dequantization, inverse orthogonal transform, a prediction process, and so forth but also includes processing that comprehensively includes back arithmetic decoding and dequantization, processing that comprehensively includes back arithmetic decoding, dequantization, and a prediction process, and so forth.

<Encoding of Motion Vector>

For example, the image encoding and decoding method described in NPL 2 or NPL 4 has a mode of inter prediction in which a motion vector (MV) is encoded using a prediction motion vector (MVP (Motion Vector Prediction)). In this encoding of a motion vector, an MV candidate list (MVCandList) that is a list of candidates for a prediction motion vector (also referred to as MV candidates) is generated, and one of the MV candidates in the MV candidate list is selected and used as a prediction motion vector.

The MV candidates include, for example, spatial motion vector MV candidates derived using motion vector information of a decoded block adjacent a current PU, time MV candidates derived using motion vector information of blocks including blocks having same spatial positions in an encoding target picture (curPic (Current Picture)) and another picture at different time (ColPic (Collocated Picture)) and adjacent blocks to the blocks, zero MV candidates that are MV candidates having zero motion vector, and so forth.

Which one of MV candidates in the MV candidate list is to be made an MVP is designated by an MV candidate index (mvpIdx) (mvp=MVCandList[mvpIdx]). It is to be noted that, in the case of a SKIP/MERGE mode, the MV candidate list is called merge MV candidate list (MergeMVCandList) and the MV candidate index is called merge index (mergeIdx). On the other hand, if not in the SKIP/MERGE mode, for each of L0 prediction and L1 prediction, the MV candidate list is called LXMV candidate list (LXMVCandList (X=0,1)), and the MV candidate index is called LXMV candidate index (mvpIdxLX (X=0,1)).

Construction of an MV candidate list is performed by such a procedure that MV candidates are added in an insertion order determined in advance and then the MV candidates determined in advance are compared with each other to exclude overlapping MVs. It is to be noted that, in the case where the number of MV candidates as a result of the procedure described above is smaller than a predetermined value, an additional MV candidate (for example, a zero MV candidate) is added until the number of MV candidates becomes equal to the predetermined value. In the case of such an MV candidate list as just described, the insertion order of MV candidates is fixed, and the MV candidate list can be considered as a static MV candidate list.

<Sorting of MV Candidate List>

In NPL 1, an MV candidate list sorting process of sorting, after construction of an MV candidate list, the MV candidate list as depicted, for example, in FIG. 1 is proposed in order to make it possible to cope with a change in characteristics for each sequence or each block. In the case of the example of FIG. 1, the order of MV candidates of an MV candidate list (Normal candidate list) depicted on the left in FIG. 1 is sorted as indicated by arrow marks (Reordaring) to derive an MV candidate list after sorting (Re-ordered candidate list) depicted on the right in FIG. 1.

Figure 2:
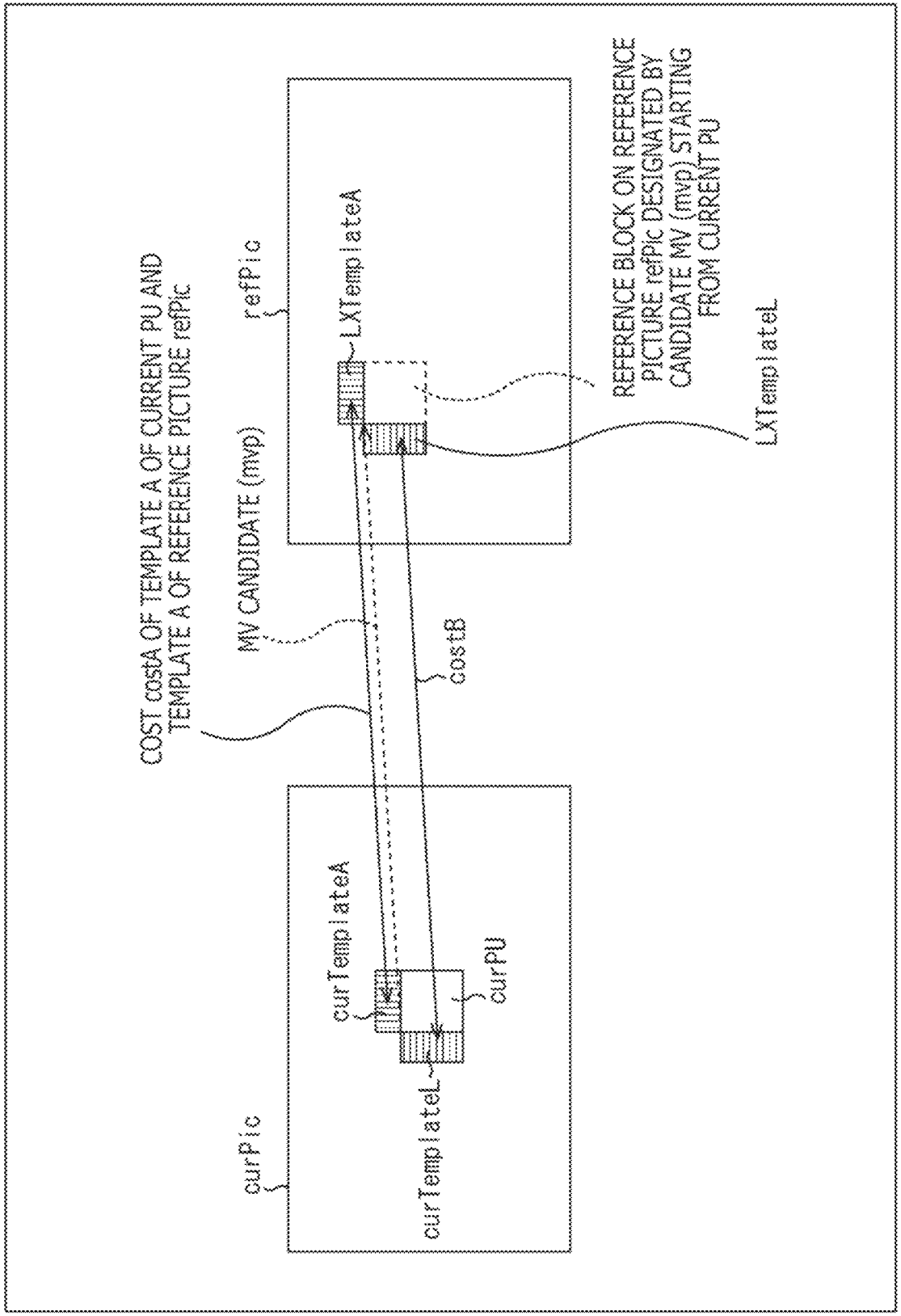
FIG. 2 is a view depicting an example of a manner of template matching.

In NPL 1, for such sorting, a method is proposed in which, for example, as depicted in FIG. 2, template matching is performed between a template (curTemplate) configured from an adjacent decoded pixel group of a current PU and a template (refTemplate) of a reference picture (refPic) determined by motion information of each MV candidate, and the MV candidate list is sorted into an order of the cost.

For example, in the case of FIG. 2, template matching is performed between an upper template (curTemplateA) configured from a decoded pixel group adjacent on the upper side to a current PU (curPU) on a current picture (curPic) that is a processing target and an upper template (LXTemplateA) of a reference block on a reference picture (refPic) designated by an MV candidate (mvp) from a start point given by the current PU. Further, template matching is performed between a left template (curTemplateL) configured from a decoded pixel group adjacent on the left side to the current PU and a left template (LXTemplateL) of a reference block on a reference picture (refPic) designated by an MV candidate (mvp) from a start point given by the current PU.

It is to be noted that the upper template (curTemplateA) of the current PU is referred to also as template A of the current PU. Further, the upper template (LXTemplateA) of the reference block is referred to also as template A (refTemplateA) of the reference block or as template A of the reference picture designated by the MV candidate (mvp) and corresponding to the template A of the current PU. Furthermore, the left template (curTemplateL) of the current PU is referred to also as template L of the current PU. Further, the left template (LXTemplateL) of the reference block is referred to also as template L (refTemplateL) of the reference block or as template L of the reference picture designated by the MV candidate (mvp) and corresponding to the template L of the current PU.

Further, the upper template and the left template of the current PU are referred to also as template of the current PU, and the upper template and the left template of the reference block are referred to also as template of the reference block (or as template of the reference picture designated by the MV candidate (mvp) and corresponding to the template of the current PU).

Then, using results of such template matching, the costs of the template (curTemplate) of the current PU and the template (refTemplate) of the reference picture designated by the MV candidate (mvp) and corresponding to the current PU are calculated. If the cost of the template A of the current PU and the template A of the reference picture designated by the MV candidate (mvp) and corresponding to the current PU is represented as costA and the cost of the template L of the current PU and the template L of the reference picture designated by the MV candidate (mvp) and corresponding to the current PU is represented as costB, then in the case of LX prediction, the cost described above is derived in such a manner as indicated by the following expression (1).

[Math. 1]

$$\cos t\_uni(LX) = \cos tA(LX) + \cos tL(LX) \qquad (1)$$

On the other hand, in the case of bi-prediction, the cost described above is derived in such a manner as indicated by the following expression (2).

[Math. 2]

$$\cos t\_bi = (\cos t\_uni(L0) + \cos t\_uni(L1)) >> 1 \qquad (2)$$

cost_uni(LX) is derived as indicated by the following expression (3), for example, by SAD (Sum of Absolute Difference) (similarity evaluation based on the sum of absolute values of differences of pixel values). It is to be noted that, in the following expression (3), pos indicates each pixel position in the template.

[Math. 3]

$$\cos t\_uni(LX) = \Sigma |curTemplate(pos) - LXTemplate(pos+cand\_mv)| over\ pos \quad (3)$$

Sorting of the MV candidate list is performed on the basis of (the magnitudes) of the costs derived in this manner.

However, according to such a method as described above, since template matching is performed for each MV candidate of the MV candidate list, it is necessary to perform motion compensation (MC) for each MV candidate to generate a template for a reference picture. Therefore, there is the possibility that the load of (the template matching of) the MV candidate list sorting process may increase.

<Simplification of Template Matching>

Therefore, the template matching is simplified as in a method #1 of a table of FIG. 3. By such simplification, increase of the load of template matching can be suppressed (the load can be reduced). For example, by simplifying template matching that is performed in the MV candidate list sorting process, increase of the load of the MV candidate list sorting process can be suppressed (the load can be reduced). By suppressing increase of the load, for example, increase of the cost of hardware, increase of the processing time, increase of the power consumption, and so forth can be suppressed.

<Method #1-1>

As a method of simplification of template matching, for example, template matching may be performed with rough accuracy as in a method #1-1 of the table of FIG. 3.

For example, for motion vector candidates of accuracy rougher than that of a motion vector candidate list, template matching between a template of a current block and a template of a reference block may be performed and a cost may be derived. Then, on the basis of the derived costs of the motion vector candidates, elements of the motion vector candidate list may be sorted.

For example, an image processing apparatus may include a template matching section that performs, for motion vector candidates of accuracy rougher than that of a motion vector candidate list, template matching between a template of a current block and a template of a reference block and derives a cost, and a sorting section that sorts, on the basis of the costs of the motion vector candidates derived by the template matching section, elements of the motion vector candidate list.

This makes it possible to simplify calculation to be performed in template matching and suppress increase of the load.

Especially, in the case where MV candidates indicate sub-pel positions, it is necessary to generate a template of the sub-pel position by motion compensation, and there is the possibility that the calculation amount may increase. In the case where an MV candidate list has decimal pixel accuracy in this manner, by performing template matching, for example, in integer pixel accuracy, increase of the calculation amount for template generation (motion compensation) can be suppressed. In short, increase of the load of template matching can be suppressed.

At this time, a motion vector candidate list of integer pixel accuracy corresponding to the motion vector candidate list of the decimal pixel accuracy may be derived. For example, the image processing apparatus may further include a derivation section that derives a motion vector candidate list of integer pixel accuracy corresponding to the motion vector candidate list of the decimal pixel accuracy such that the template matching section performs, for each motion vector candidate of the motion vector candidate list of the integer pixel accuracy derived by the derivation section, template matching between the template of the current block and the template of the reference block and derives a cost and the sorting section sorts the elements of the motion vector candidate list of the decimal pixel accuracy on the basis of the cost of each motion vector candidate derived by the template matching section.

This makes it possible to easily perform template matching in integer accuracy.

For example, the derivation section may convert each MV candidate of decimal pixel accuracy into that of integer pixel accuracy to generate an MV candidate list of the integer pixel accuracy corresponding to the MV candidate list of the decimal pixel accuracy and perform template matching using the MV candidate list of the integer pixel accuracy. This makes it possible to derive a motion vector candidate list of the integer pixel accuracy corresponding to the motion vector candidate list of the decimal pixel accuracy.

<Method #1-2>

As an alternative, template matching of an overlapping MV candidate (overlapping MV) may be skipped (omitted) as in a method #1-2 of the table of FIG. 3. For example, in the image processing apparatus, the template matching section may skip template matching for a motion vector candidate same as a motion vector candidate for which template matching has already been performed. This makes it possible to suppress increase of the number of times of template matching (reduce the number of times). In short, increase of the load of template matching can be suppressed.

<Method #1-3>

As another alternative, some of pixels of a template may be thinned out, for example, as in a method #1-3 of the table of FIG. 3. For example, some of pixels of a template may be thinned out at a thinning rate (ratio) according the size of the current PU. For example, in the image processing apparatus, the template matching section may perform template matching between a template of a current block at a sampling interval according to the size of the current block and a template of a reference block at a sampling interval according to the size of the current block to derive a cost.

In other words, from a decoded pixel group adjacent the current PU (pixel group in a predetermined region adjacent the current PU), pixels may be sampled at intervals according to the size of the current PU (in short, pixels may be extracted at a ratio (extraction rate) according to the size of the current PU from the adjacent decoded pixel group) such that a template configured from the sampled pixels is generated.

By generating a template in this manner, the number of pixels of the template decreases, and therefore, increase of the calculation amount of template matching can be suppressed (the calculation amount can be reduced). In short, increase of the load of template matching can be suppressed.

<Method #1-4>

Incidentally, in the case where a current PU is adjacent a CTU boundary, it is necessary to secure a line buffer of a CTU level by a size of a template to be referred to in template matching, and there is the possibility that the memory size may increase.

Therefore, in the case where a current PU is adjacent a CTU boundary, the number of lines of the template may be reduced as in a method #1-4 of the table of FIG. 3. In other words, a template may be generated with a size according to the position of the current PU (namely, the template size may be set according to the position of the current PU).

For example, in the image processing apparatus, the template matching section may perform template matching between a template of a current block of a size according to the position of the current block and a template of a reference block of the size according to the position of the current block and derive a cost.

By generating a template in this manner, increase of decoded pixels to be used for template generation can be suppressed (decoded pixels to be used for template generation can be reduced). In particular, increase of the size of the line buffer for storing (retaining) the decoded pixels can be suppressed (the line buffer size can be suppressed). In short, increase of the load of template matching can be suppressed.

<Method #1-5>

Further, in the case where the size of the current PU is small, upon template matching, there is the possibility that the number of times of access to an adjacent decoded pixel group or a reference picture may increase, resulting in increase of the memory band to be used (in short, the load may increase).

Therefore, for example, in the case where the size of the current PU is small (for example, in the case where the size of the current PU is smaller than a predetermined threshold value) as in a method #1-5 of the table of FIG. 3, the sorting process (MV correction) of the MV candidate list described hereinabove may be skipped (omitted).

For example, in the image processing apparatus, in the case where the current block is smaller than a predetermined threshold value, the template matching section and the sorting section may skip the process.

By performing the control in this manner, template matching for a current PU whose load is large and whose size is small (sorting process of the MV candidate list) can be skipped. In short, increase of the load of template matching can be suppressed.

<Method #1-6>

Further, in the case of multiple prediction, since it is necessary to generate a template of a reference block for each prediction, there is the possibility that the load may increase. Therefore, for MV candidates for which multiple prediction is to be performed, the number of prediction may be reduced to perform template matching by single prediction as in a method #1-6 of the table of FIG. 3. For example, in the image processing apparatus, the template matching section may set single prediction for motion vector candidates for multiple prediction (multiple prediction candidate MVs), perform template matching between a template of a current block as a motion vector candidate of the single prediction and a template of a reference block, and then derive a cost.

By doing this, increase of the number of templates generated can be suppressed (the number of templates generated can be reduced), and therefore, increase of the calculation amount in template matching can be suppressed (the calculation amount can be reduced).

<Combination of Methods>

It is to be noted that the method #1-1 to the method #1-6 described above can be applied singly and also a plurality of ones of them can be applied in combination. For example, the method #1-1 may be used in combination with any one of the methods #1-2 to #1-6. Further, for example, a plurality of ones of the methods #1-2 to #1-6 may be combined. Naturally, the number of methods to be combined may be freely decided, and three or more methods may be combined.

2. First Embodiment

<Simplification of Template Matching in Sorting of MV Candidate List>

As described hereinabove, since template matching is performed in an MV candidate list sorting process, by simplifying the template matching, increase of the load of the MV candidate list sorting process can be suppressed (the load can be reduced).

<MV Candidate List Derivation Apparatus>

FIG. 4 is a block diagram depicting an example of a configuration of an MV candidate list derivation apparatus that is a mode of an image processing apparatus to which the present technology is applied. The MV candidate list derivation apparatus 100 depicted in FIG. 4 is an apparatus that derives an MV candidate list that is used for encoding of a motion vector. As depicted in FIG. 4, the MV candidate list derivation apparatus 100 includes a first MV accuracy MV candidate list derivation section 101 and an MV candidate list sorting section 102 and performs derivation and sorting of an MV candidate list.

The first MV accuracy MV candidate list derivation section 101 refers to encoded (decoded) motion information of peripheral blocks of a current PU and motion information of a reference picture to derive (generate) an MV candidate list (MVCandList) of first MV accuracy including space MV candidates, time MV candidates, zero MV candidates and so forth of the first MV accuracy. It is to be noted that the MV accuracy indicates accuracy of an MV candidate, and the first MV accuracy indicates predetermined MV accuracy.

Further, the first MV accuracy MV candidate list derivation section 101 derives (generates) information (numMVCand) indicative of the number of MV candidates included in the MV candidate list of the first MV accuracy. The first MV accuracy MV candidate list derivation section 101 supplies the generated MV candidate list of the first MV accuracy and the information indicative of the number of MV candidates included in the MV candidate list of the first MV accuracy to the MV candidate list sorting section 102.

The MV candidate list sorting section 102 sorts the order of the MV candidates of the MV candidate list of the first MV accuracy supplied from the first MV accuracy MV candidate list derivation section 101 to derive (generate) a sorted MV candidate list (MVCandList'). The MV candidate list sorting section 102 includes a template matching section 111 and performs the sorting utilizing template matching by the template matching section 111. The MV candidate list sorting section 102 outputs the derived sorted MV candidate list (MVCandList') as a derived MV candidate list. Further, at this time, the MV candidate list sorting section 102 outputs also the information (numMVCand) indicative of the number of MV candidates included in the MV candidate list of the first MV accuracy (sorted MV candidate list).

The template matching section 111 performs template matching (for MV candidate list sorting) in a simplified fashion.

Accordingly, the template matching section 111 can suppress increase of the load of template matching and the MV candidate list sorting section 102 can suppress increase of the load of sorting of the MV candidate list as described hereinabove in <Simplification of Template Matching>. Accordingly, the MV candidate list derivation apparatus 100 can suppress increase of the load of MV candidate list derivation.

<Flow of MV Candidate List Derivation Process>

An example of a flow of the MV candidate list derivation process executed by the MV candidate list derivation apparatus 100 is described with reference to a flow chart of FIG. 5.

After the MV candidate list derivation process is started, the first MV accuracy MV candidate list derivation section 101 derives (generates) an MV candidate list (MVCandList) of the first MV accuracy for a current PU in step S101. It is to be noted that, at this time, the first MV accuracy MV candidate list derivation section 101 derives (generates) information (numMVCand) indicative of the number of MV candidates included in the MV candidate list of the first MV accuracy.

In step S102, the MV candidate list sorting section 102 performs sorting of MV candidates of the MV candidate list of the first MV accuracy derived in step S101 on the basis of template matching to derive (generate) a sorted MV candidate list (MVCandList').

When the process in step S102 ends, the MV candidate list derivation process ends.

By executing the processes in the steps in such a manner as described above, increase of the load of template matching can be suppressed as described hereinabove in <Simplification of Template Matching>. In short, increase of the load of sorting of the MV candidate list can be suppressed. In other words, increase of the load of MV candidate list derivation can be suppressed.

<Method #1-1: MV Candidate List Sorting Section>

Figure 6:
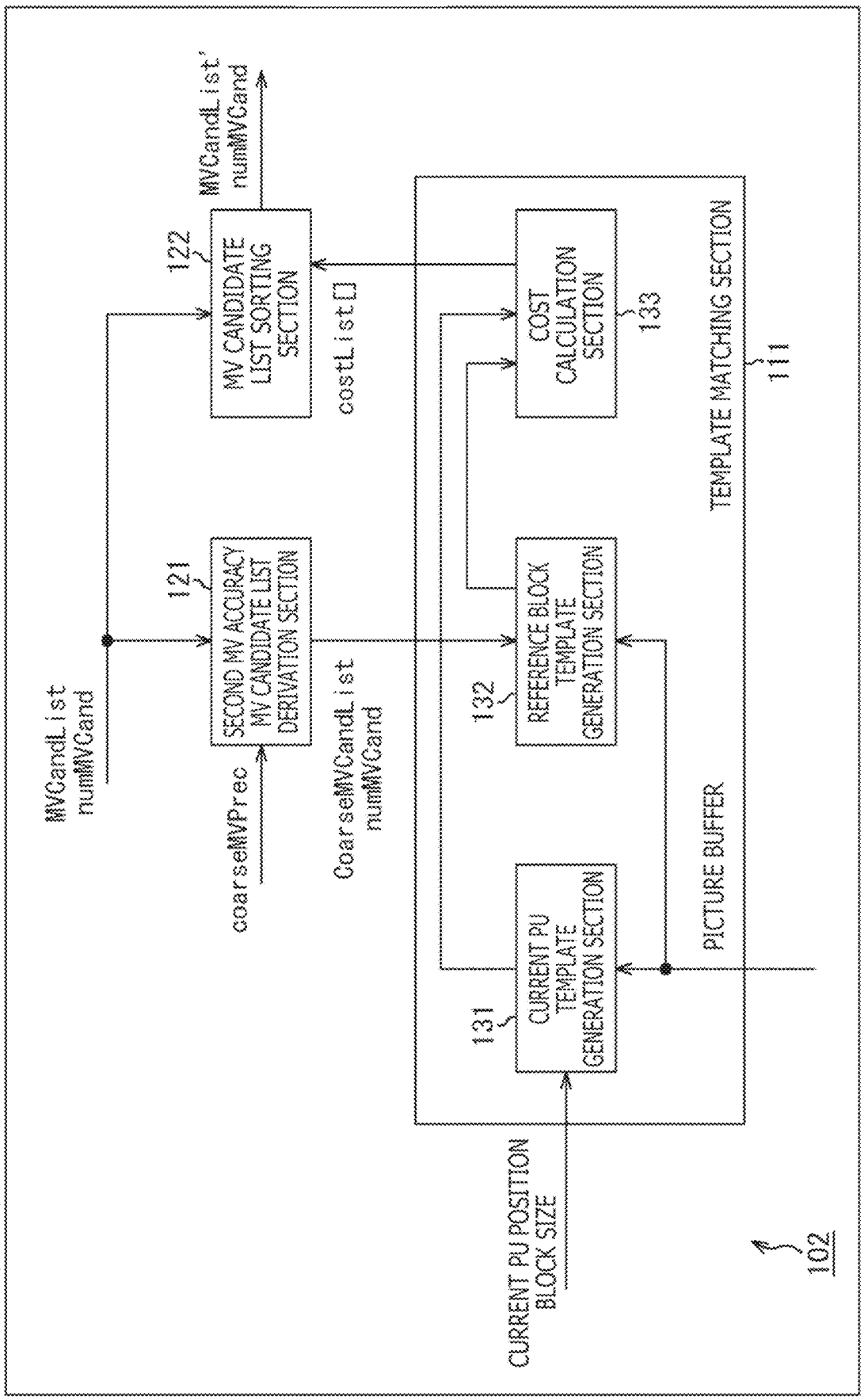
FIG. 6 is a block diagram depicting an example of principal components of an MV candidate list sorting section.

Now, a case in which the MV candidate list sorting section 102 performs sorting by the method #1-1 of FIG. 3. FIG. 6 is a block diagram depicting an example of a configuration of the MV candidate list sorting section 102 of FIG. 4. As depicted in FIG. 6, the MV candidate list sorting section 102 in this case includes a second MV accuracy MV candidate list derivation section 121, an MV candidate list sorting section 122, and a template matching section 111.

<Second MV Accuracy MV Candidate List Derivation Section>

The second MV accuracy MV candidate list derivation section 121 acquires an MV candidate list (MVCandList) of the first MV accuracy supplied from the first MV accuracy MV candidate list derivation section 101 and information (numMVCand) indicative of the number of MV candidates included in the MV candidate list of the first MV accuracy.

The second MV accuracy MV candidate list derivation section 121 derives (generates) an MV candidate list of the second MV accuracy (CoarseMVCandList) corresponding to the acquired MV candidate list (MVCandList) of the first MV accuracy.

The second accuracy MV indicates MV accuracy lower than that of the first MV accuracy. The first MV accuracy and the second MV accuracy may be any accuracy if they keep this relation. For example, the first MV accuracy may be decimal pixel accuracy (sub-pel accuracy) while the second MV accuracy is integer pixel accuracy (integer pel accuracy). In the case where the second MV accuracy is integer pixel accuracy, the first MV accuracy may be, for example, ½-pel accuracy (half pel (half pixel) accuracy) or may be ¼-pel accuracy (quarter pel (¼ pixel) accuracy). Further, in the case where the first MV accuracy is ¼-pel accuracy, the second MV accuracy may be, for example, integer pixel accuracy or ½-pel accuracy. Naturally, at least one of the first MV accuracy or the second MV accuracy may be any other accuracy than them.

An MV accuracy parameter (coarseMVPrec) indicative of the second MV accuracy is inputted to the second MV accuracy MV candidate list derivation section 121. The second MV accuracy MV candidate list derivation section 121 derives (generates), on the basis of the inputted MV accuracy parameter (coarseMVPrec), an MV candidate list (CoarseMVCandList') of the second MV accuracy indicated by the MV accuracy parameter (coarseMVPrec) corresponding to the MV candidate list of the first MV accuracy supplied from the first MV accuracy MV candidate list derivation section 101. It is to be noted that this second MV accuracy may be a fixed value or may be set by a user or the like.

Further, the second MV accuracy MV candidate list derivation section 121 supplies the derived MV candidate list (CoarseMVCandList') of the second MV accuracy to (a reference block template generation section 132 of) the template matching section 111 together with the information (numMVCand) indicative of the number of MV candidates included in the MV candidate list of the first MV accuracy.

<Derivation of MV Candidate List of Second MV Accuracy>

For example, the second MV accuracy MV candidate list derivation section 121 derives (generates) an MV candidate list (CoarseMVCandList) of the second MV accuracy as indicated by the following expression (4).

[Math. 4]

$$CoarseMVCandList = (MVCandList >> coarseMVPrec) << coarseMV Prec \quad (4)$$

In the case of a process representation for each element, it is represented by such a pseudo code as given below. In particular, as indicated by expressions (5) and (6) in the pseudo code, by performing right bit shift and left bit shift of a motion vector (mv_x, mv_y) of each candidate MV with an MV accuracy parameter (coarseMVPrec), information of lower bits of the motion vector is discarded and motion information of rough MV accuracy (namely, of the second MV accuracy) is obtained.

```
for (i=0; i<numMVCand; i++) {
    mv_x = MVCandList[i].x   //x component of ith candidate MV
    mv_y = MVCandList[i].y   //y component of ith candidate MV
    CoarceMVCandList[i].x = (mv_x>>coarseMVPrec) << coarseMVPrec ... (5)
    CoarceMVCandList[i].y = (mv_y>>coarseMVPrec) << coarseMVPrec ... (6)
}
```

<MV Accuracy Parameter>

In the case where the second MV accuracy MV candidate list derivation section 121 reduces the MV accuracy of an MV candidate list (MV candidates) from the first MV accuracy to the second MV accuracy, for example, this process may be performed, for example, for each of a vertical direction and a horizontal direction (namely, for an x component and a y component). In short, in this case, the MV accuracy of each of the x component and the y component of the MV candidates is reduced to the second MV accuracy. For example, in the case where the first MV accuracy is sub-pel accuracy, the MV accuracy of both the x component and the y component of the MV candidates is converted to integer pixel accuracy.

For example, in the case where the first MV accuracy is ½^{max_mv_prec}-pel accuracy, by setting the MV accuracy parameter as indicated by the following expression (7), the second MV accuracy can be made integer pixel accuracy.

$$\text{coarseMVPrec} = \text{max\_mv\_prec} \tag{7}$$

By doing this, template matching can be performed using an MV candidate of the second MV accuracy in place of an MV candidate of the first MV accuracy. In short, the cost of template matching with the first MV accuracy can be substituted by the cost obtained by template matching with the second MV accuracy. Accordingly, for example, it is possible to perform template matching with integer accuracy, thereby to avoid template matching of sub-pel accuracy. By doing this, the sorting process of an MV candidate list can be simplified while the encoding efficiency is maintained. Consequently, for example, processing of an encoder or a decoder can be reduced.

It is to be noted that only the MV accuracy of the y component of the MV candidates may be roughened to integer accuracy. In other words, only for the y component, the MV accuracy may be converted from the first MV accuracy into the second MV accuracy. In this case, the MV accuracy parameter coarseMVPrec reduced to the second MV accuracy is applied to the y component. In this case, the expressions (5) and (6) given hereinabove can be expressed as in the following expressions (8) and (9), respectively.

$$\text{CoarseMVCandList}[i] \cdot x = mv\_x \tag{8}$$

$$\text{CoarseMVCandList}[i] \cdot y = (mv\_y >> \text{coarseMVPrec}) << \text{coarseMVPrec} \tag{9}$$

Generally, in regard to access to pixels that become necessary for template generation of a reference block, memory access in the vertical direction (to the y components) is higher in cost than memory access in the horizontal direction (to the x components). Especially, on the decoder side, this tendency is more remarkable. Further, by reducing the MV accuracy in the vertical direction (y components) to integer accuracy, the matching accuracy in the y direction is reduced to integer pixel accuracy while the matching accuracy in the x direction of template matching is kept to sub-pel accuracy. In the case where only the MV accuracy of the y components is reduced to the second MV accuracy, the matching accuracy is higher than in the case where the MV accuracy of both the x components and the y components is reduced to the second MV accuracy, and therefore, the loss in encoding efficiency is less. However, the reduction effect of the processing amount is higher in the case where the MV accuracy of both the x components and the y components is reduced to the second MV accuracy.

<Template Matching Section>

The template matching section 111 performs template matching using the MV candidate list of the second MV accuracy derived by the second MV accuracy MV candidate list derivation section 121 to derive (calculate) the cost.

As depicted in FIG. 6, the template matching section 111 includes a current PU template generation section 131, a reference block template generation section 132, and a cost calculation section 133.

<Current PU Template Generation Section>

The current PU template generation section 131 acquires information indicative of a current CU position, a block size of the current PU, and so forth and pixel values decoded already from the picture buffer and generates, on the basis of them, a template (curTemplate) of the current PU.

In particular, the current PU template generation section 131 generates an upper template (curTemplateA) of the current PU and a left template (curTemplateL) of the current PU with reference to an upper left position (x0, y0) of the current PU. The upper template (curTemplateA) of the current PU is configured from such a pixel group at a coordinate position on the current picture as indicated, for example, by the following expression (10).

[Math. 5]

$$\text{curTemplate}A = \{x0+i, y0-j-1) | i=0,1, \ldots, PU_{width}-1, j=0, \ldots, \text{templateSize}-1\} \tag{10}$$

Meanwhile, the left template (curTemplateL) of the current PU is configured from such a pixel group at a coordinate position on the current picture as indicated, for example, by the following expression (11).

[Math. 6]

$$\text{curTemplate}L = \{(x0-i-1, y0+j) | i=0, \ldots, \text{templateSize}-1, j=0,1, \ldots, PU_{height}-1\} \tag{11}$$

For example, a case is conceivable in which the upper template or the left template of the current PU cannot be utilized because the current PU is adjacent a picture boundary or in a like situation. In this case, it is sufficient if the template on the side that cannot be referred to is generated by setting a predetermined value to it. For example, if a bit depth of the input image is represented by bitDepth, then it is sufficient if '1<<(bitDepth-1)' or '(1<<(bitDepth-1))-1' is set to the predetermined value. It is to be noted that, in the expressions (10) and (11), the parameter templateSize indicates the number of lines of pixels used in the template.

The current PU template generation section 131 supplies the templates of the current PU generated in such a manner as described above to the cost calculation section 133.

<Reference Block Template Generation Section>

The reference block template generation section 132 acquires the MV candidate list of the second MV accuracy derived by the second MV accuracy MV candidate list derivation section 121 and the pixel values decoded already from the picture buffer and derives (generates), on the basis of them, templates of the reference block.

In particular, the reference block template generation section 132 generates an upper template (LXTemplateA) and a left template (LXTemplateL) of the reference block determined by the current PU and the MV candidate (MVCandList[i]). It is to be noted that, in the case of bi-prediction, both of the templates for L0 and L1 are generated. The upper template (LXTemplateA) of the reference block is configured, for example, from such a pixel group at a coordinate position on the reference picture as indicated by the following expression (12).

[Math. 7]

$$LX\text{Template}A = \{(x0+lx_{dx}+i, y0+lx_{dy}-j-1) | i=0, 1, \ldots, PU_{width}-1, j=0, \ldots, \text{templateSize}-1\} \tag{12}$$

Meanwhile, the left template (LXTemplateL) of the reference block is configured from, for example, such a pixel group at a coordinate position on the reference picture as indicated by the following expression (13).

[Math. 8]

$$LX\text{Template}L = \{(x0+lx_{dx}-i, y0+lx_{dy}+j) | i=0, \ldots, \text{templateSize}-1, j=0,1, \ldots, PU_{height}-1\} \tag{13}$$

For example, a case is conceivable in which the upper template or the left template of the reference block cannot be utilized because the reference block is adjacent a picture boundary or in a like situation. In this case, it is sufficient if the template on the side that cannot be referred to is generated by setting a predetermined value to it. It is to be noted that, in the expressions (12) and (13), $lx_{dx}$ indicates a motion vector in the x direction of LX prediction of the MV candidate (MVCandList[i]) and $lx_{dy}$ indicates a motion vector in the y direction of LX prediction of the MV candidate (MVCandList[i]).

On the other hand, in the case where the coordinate position of a pixel group included in a template of the reference block is a sub-pel position, for example, linear interpolation from a pixel at an adjacent integer position is performed for generation. It is to be noted that the reference block template generation section 132 derives (generates) a template of the reference block on the basis of MV candidates of the second MV accuracy. Accordingly, for example, if the second MV accuracy is integer pixel accuracy, then the reference block template generation section 132 can derive a point play of the reference block without performing such linear interpolation as described above. In short, the reference block template generation section 132 can derive (generate) a template of the reference block more easily than in the case where the derivation (generation) is based on MV candidates of the first MV accuracy. Accordingly, the calculation amount for template derivation of the reference block can be reduced. The reference block template generation section 132 supplies the generated template of the reference block to the cost calculation section 133.

<Cost Calculation Section>

The cost calculation section 133 uses templates of a current PU supplied from the current PU template generation section 131 and templates of a reference block supplied from the reference block template generation section 132 to derive (calculate) costs of them.

The costs of the templates of the current PU and the templates of the reference picture designated by the MV candidate (MVCandList[i]) are derived, in the case of LX prediction, in accordance with the following expression (14), and in the case of bi-prediction, in accordance with the following expression (15).

[Math. 9]

$$\cos t\_uni(LX) = \cos tA(LX) + \cos tL(LX) \quad (14)$$

$$\cos t\_bi = (\cos t\_uni(L0) + \cos t\_uni(L1)) >> 1 \quad (15)$$

In the expressions (14) and (15), costA indicates a cost obtained from the upper template (curTemplateA) of the current PU and the upper template (LXTemplateA) of the reference block. Meanwhile, costL indicates a cost obtained from the left template (curTemplateL) of the current PU and the left template (LXTemplateL) of the reference block. Further, cost_uni(LX) is a cost obtained from the template of the current PU and the template of the reference block designated by motion information of the LX prediction part of the MV candidate and is derived (calculated), for example, by SAD, in accordance with the following expression (16).

[Math. 10]

$$\cos t\_uni(LX) = \Sigma |curTemplate(pos) - LXTemplate(pos + lx_{mv})| \text{over pos} \quad (16)$$

It is to be noted that, in this expression (16), pos indicates a pixel position constituted from a pair of (x, y) in the template, and $lx_{mv}$ indicates a motion vector in the LX prediction part of the MV candidate.

In short, the cost calculation section 133 derives (calculates) a cost using the templates of the reference block derived (generated) on the basis of the MV candidates of the second MV accuracy. Accordingly, the cost calculation section 133 can derive the cost more easily than in the case where the templates of the reference block derived (generated) on the basis of the MV candidates of the first MV accuracy are used. In short, the calculation amount for cost calculation can be reduced. The cost calculation section 133 lists the derived costs corresponding to the MV candidates and supplies the cost list (CostList) to the MV candidate list sorting section 122.

<MV Candidate List Sorting Section>

The MV candidate list sorting section 122 receives, as inputs thereto, an MV candidate list (MVCandList) of the first MV accuracy supplied from the first MV accuracy MV candidate list derivation section 101 and a cost list (CostList) of template matching corresponding to the candidate MVs of the MV candidate list (CoarseMVCandList) of the second MV accuracy supplied from the cost calculation section 133. The MV candidate list sorting section 122 refers to the cost list to sort the MV candidates of the MV candidate list (MVCandList) of the first MV accuracy in the ascending order of the cost and outputs a resulting sorted MV candidate list (MVCandList').

As above, the second MV accuracy MV candidate list derivation section 121 generates an MV candidate list of the second MV accuracy rougher (lower in accuracy) than the first MV accuracy, which corresponds to the MV candidate list of the first MV accuracy, and the template matching section 111 performs template matching using the MV candidate list of the second MV accuracy to calculate the costs. Then, the MV candidate list sorting section 122 performs sorting of the MV candidates of the MV candidate list of the first MV accuracy on the basis of the costs obtained by the template matching.

Accordingly, the MV candidate list sorting section 102 can suppress increase of the load of template matching and can thereby suppress increase of the load of sorting of the MV candidate list.

<Flow of MV Candidate List Sorting Process>

Figure 7:
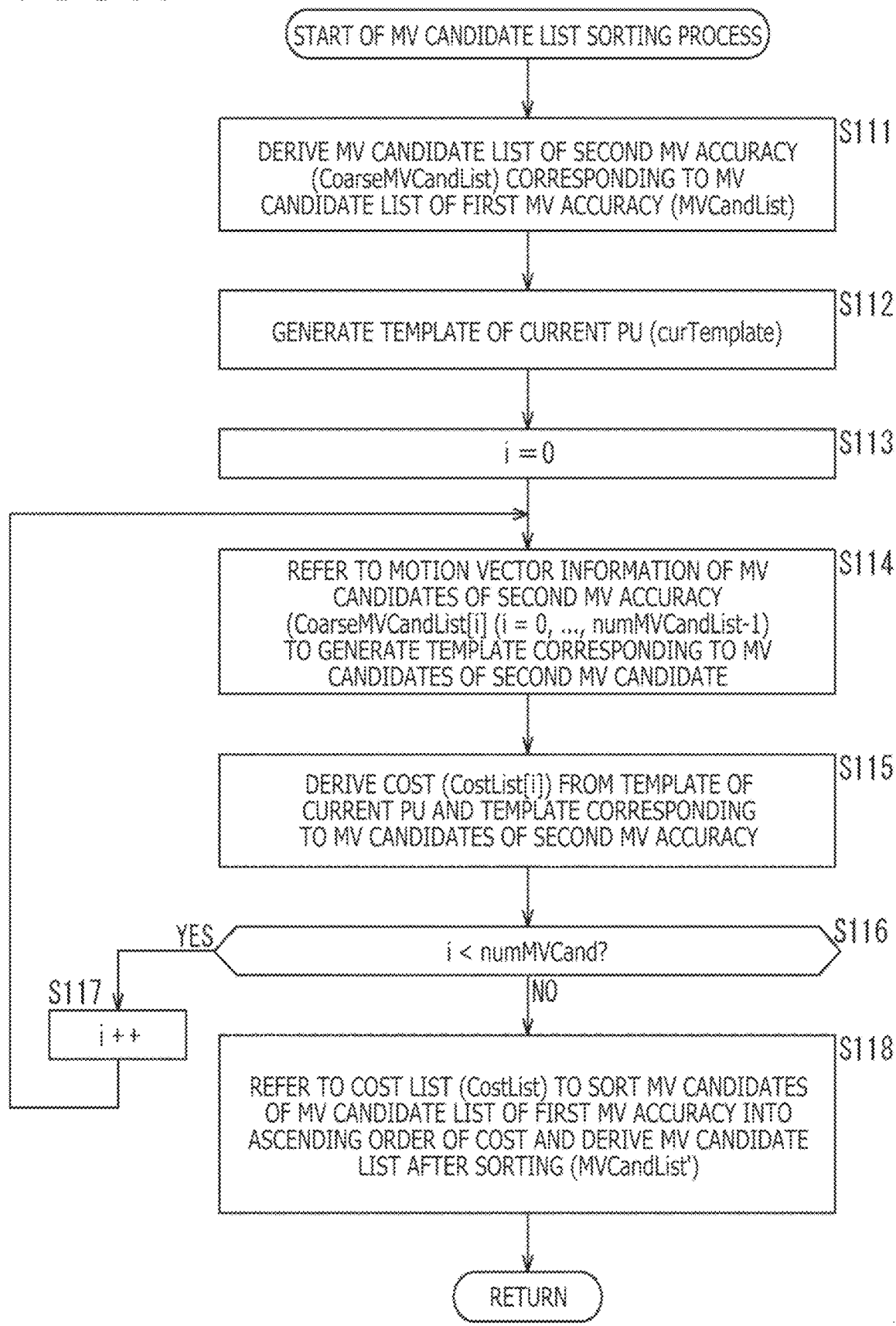
FIG. 7 is a flow chart illustrating an example of a flow of an MV candidate list sorting process.

An example of a flow of the MV candidate list sorting process executed in step S102 of FIG. 5 by the MV candidate list sorting section 102 in this case (method #1-1) is described with reference to a flow chart of FIG. 7.

After the MV candidate list sorting process is started, the second MV accuracy MV candidate list derivation section 121 derives, in step S111, an MV candidate list (CoarseMVCandList) of the second MV accuracy corresponding to the MV candidate list (MVCandList) of the first MV accuracy on the basis of the MV accuracy parameter (coarseMVPrec) indicative of the second MV accuracy.

In step S112, the current PU template generation section 131 generates a template (curTemplate) of the current PU.

In step S113, the reference block template generation section 132 sets an initial value (for example, "0") to a variable i.

In step S114, the reference block template generation section 132 refers to motion vector information of the MV candidate (CoarseMVCandList[i] (i=0, . . . , numMVCandList−1)) of the second MV accuracy to generate templates of the reference block corresponding to the MV candidate of the second MV accuracy.

In step S115, the cost calculation section 133 derives a cost (CostList[i]) on the basis of the template of the current PU generated in step S112 and the template of the reference block corresponding to the MV candidate of the second MV accuracy generated in step S114.

In step S116, the reference block template generation section 132 decides whether or not the value of the variable i is smaller than a value (numMVCand) indicative of the number of MV candidates included in the MV candidate list (MVCandList) of the first MV accuracy. In the case where it is decided that the variable i is smaller than the value (numMVCand) (i<numMVCand), the processing advances to step S117.

In step S117, the reference block template generation section 132 increments the variable i (adds "+1" to the value of the variable i). After the process in step S117 ends, the processing returns to step S114 and the processes in the subsequent steps are repeated.

In short, the processes in steps S114 to S117 are executed in regard to each MV candidate (cost (CostList[i]) corresponding to the MV candidate).

Then, in the case where it is decided in step S116 that the variable i is equal to or greater than the value (numMVCand) (i numMVCand), the processing advances to step S118.

In step S118, the MV candidate list sorting section 122 refers to the cost list (CostList) to sort the MV candidates of the MV candidate list of the first MV accuracy in the ascending order of the cost to derive an MV candidate list after sorting (MVCandList').

When the process in step S118 ends, the MV candidate list sorting process ends and the processing returns to FIG. 5.

By performing the MV candidate list sorting process in such a manner as described above, the MV candidate list sorting section 102 can suppress increase of the load of sorting of the MV candidate list.

<Method #1-2: MV Candidate List Sorting Section>

Figure 8:
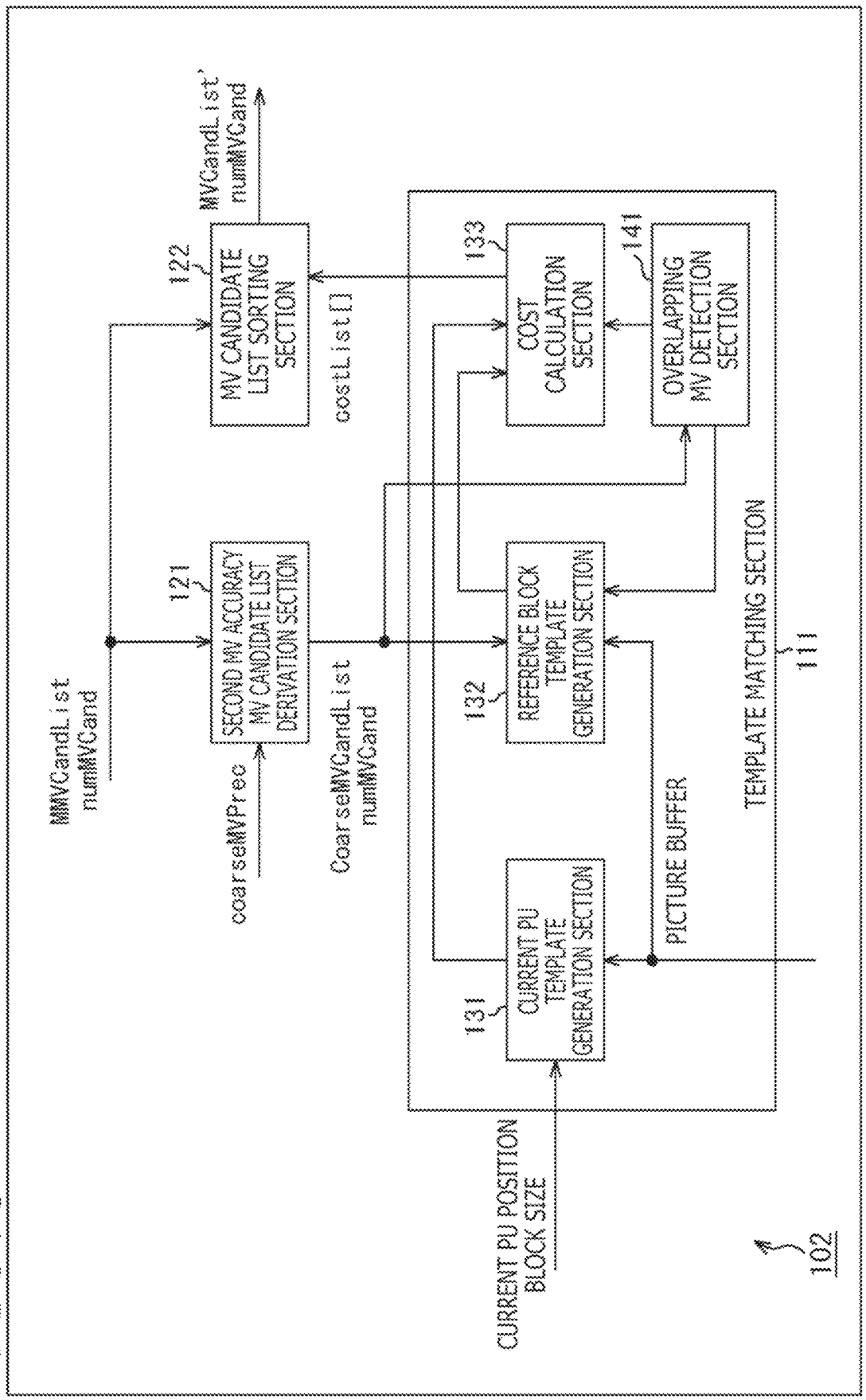
FIG. 8 is a block diagram depicting an example of principal components of the MV candidate list sorting section.

Now, a case in which the method #1-2 of FIG. 3 is applied is described. FIG. 8 is a block diagram depicting an example of a configuration of the MV candidate list sorting section 102 of FIG. 4. The MV candidate list sorting section 102 in this case performs sorting of an MV candidate list using the method #1-1 and the method #1-2. In particular, the MV candidate list sorting section 102 first performs template matching with rough accuracy, detects MV candidates (overlapping MVs) same as MV candidates for which template matching has been executed already, and then skips template matching of the MV candidates (an executed template matching result (cost values) is diverted).

The MV candidate list sorting section 102 in this case includes, as depicted in FIG. 8, a second MV accuracy MV candidate list derivation section 121, an MV candidate list sorting section 122, and a template matching section 111 similarly as in the case of FIG. 6. However, the template matching section 111 includes an overlapping MV detection section 141 in addition to the components of the case of FIG. 6.

The overlapping MV detection section 141 acquires an MV candidate list of the second MV accuracy derived (generated) by the second MV accuracy MV candidate list derivation section 121. The overlapping MV detection section 141 decides whether or not an MV candidate of a processing target included in the MV candidate list of the second MV accuracy is same as an MV candidate that is included in the same MV candidate list of the second MV accuracy and for which template matching has been performed already. Then, the overlapping MV detection section 141 sets a test flag (ToBeTestFlag) and a cost reference index (CostRefIdx) to the MV candidate of the processing target according to a result of the decision, namely, according to a detection result of an overlapping MV.

The test flag (ToBeTestFlag) is flag information indicative of whether or not template matching is to be performed for the MV candidate. In the case where the test flag (ToBeTestFlag) is true (for example, 1), this indicates that template matching is to be performed. In the case where the test flag (ToBeTestFlag) is false (for example, 0), this indicates that template matching is not to be performed.

The cost reference index (CostRefIdx) is index information indicative of (an MV candidate of) a replication source of the cost. In other words, the cost reference index (CostRefIdx) indicates as which MV candidate the MV candidate of the processing target is same. It is to be noted that, in the case where an MV candidate (overlapping MV) same as the MV candidate of the processing target does not exist in the MV candidates for which template matching has been performed already, the value "−1" is set to the cost reference index.

Examples of setting of the test flag (ToBeTestFlag) and the cost reference index (CostRefIdx) are depicted in a table of FIG. 9. Referring to the table of FIG. 9, it is assumed that the MV candidates are processed in the index order (ascending order). In regard to an MV candidate A1' of the second MV accuracy whose index is "0," an overlapping MV does not exist because it is processed first. Accordingly, template matching is performed for the MV candidate A1'. Accordingly, for the MV candidate A1', the test flag is set to true (ToBeTestFlag=1). Further, since an overlapping MV does not exist, the value "−1" is set to the cost reference index (CostRefIdx=−1).

An MV candidate B1' of the second MV accuracy whose index is "1" is motion information different from that of the MV candidate A1' for which template matching has been performed before this. In short, an overlapping MV does not exist. Accordingly, template matching is performed for the MV candidate B1'. Accordingly, for the MV candidate B1', the test flag is set to true (ToBeTestFlag=1). Further, since an overlapping MV does not exist, the value "−1" is set to the cost reference index (CostRefIdx=−1).

In regard to an MV candidate B0' of the second MV accuracy whose index is "2," the motion information is same as that of the MV candidate A1' whose index is "0." In short, an overlapping MV exists. Accordingly, template matching for the MV candidate B0' is skipped (omitted). Accordingly, for this MV candidate B0', the test flag is set to false (ToBeTestFlag=0). Further, in this case, a template matching result regarding the MV candidate A1' whose index is "0" is re-utilized (substituted) as a template matching result regarding the MV candidate B0'. Accordingly, the value "0" is set to the cost reference index (CostRefIdx=0). In short, the value of the cost reference index indicates an index of an overlapping MV.

An MV candidate A0' of the second MV accuracy whose index is "3" does not match with any of the MV candidate A1', MV candidate B1', and MV candidate B0'. In short, an overlapping MV does not exist. Accordingly, for the MV candidate A0', template matching is performed. Accordingly, for the MV candidate A0', the test flag is set to true (ToBeTestFlag=1). Further, since an overlapping MV does not exist, the value "−1" is set to the cost reference index (CostRefIdx=−1).

An MV candidate X' of the second MV accuracy whose index is "numMVCand-1" indicates motion information same as that of the MV candidate A0' whose index is "3." In short, an overlapping MV exists. Accordingly, for the MV candidate X', template matching is skipped (omitted). Accordingly, for the MV candidate B0', the test flag is set to false (ToBeTestFlag=0). Further, in this case, a template matching result regarding the MV candidate A0' whose index is "3" is re-utilized (substituted) as a template matching result of the MV candidate X'. Accordingly, the value "3" is set to the cost reference index (CostRefIdx=3). In short, the value of the cost reference index indicates an index of an overlapping MV.

The overlapping MV detection section 141 performs such setting of a test flag (ToBeTestFlag) and a cost reference index (CostRefIdx) as described above, for example, in accordance with a pseudo code depicted in FIG. 10. The overlapping MV detection section 141 supplies information of the thus set test flag (ToBeTestFlag) and cost reference index (CostRefIdx) to the cost calculation section 133.

The cost calculation section 133 executes or skips (replicates a cost) template matching on the basis of the information mentioned to calculate a cost corresponding to each MV candidate.

By doing this, the MV candidate list sorting section 102 can suppress increase of the number of times of template matching (reduce the number of times) and suppress increase of the load of template matching. In short, the MV candidate list sorting section 102 can suppress increase of the hardware cost, increase of the processing time, increase of the power consumption, and so forth necessary for template matching. Further, increase of the load of sorting of the MV candidate list can be suppressed by this. In short, increase of the hardware cost, increase of the processing time, increase of the power consumption, and so forth necessary for sorting of the MV candidate list can be suppressed.

<Flow of MV Candidate List Sorting Process>

An example of a flow of the MV candidate list sorting process executed in step S102 of FIG. 5 by the MV candidate list sorting section 102 in this case (method #1-2 (and method #1-1)) is described with reference to flow charts of FIGS. 11 and 12.

Figure 11:
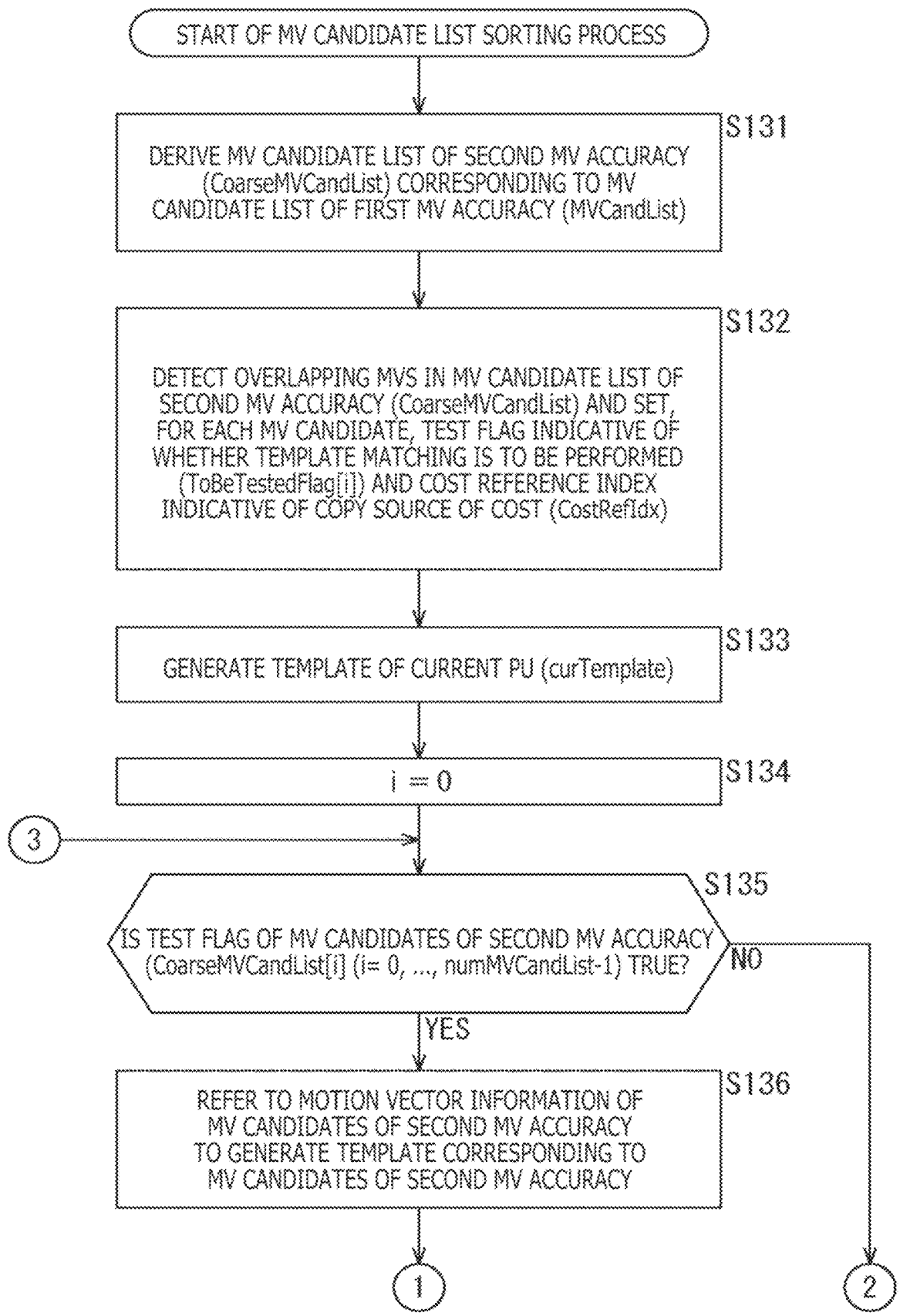
FIG. 11 is a flow chart illustrating an example of a flow of the MV candidate list sorting process.

After the MV candidate list sorting process is started, the second MV accuracy MV candidate list derivation section 121 derives, in step S131 of FIG. 11, an MV candidate list (CoarseMVCandList) of the second MV accuracy corresponding to an MV candidate list (MVCandList) of the first MV accuracy on the basis of the MV accuracy parameter (coarseMVPrec) indicative of the second MV accuracy.

In step S132, the overlapping MV detection section 141 performs detection of an overlapping MV in the MV candidate list (CoarseMVCandList) of the second MV accuracy and sets, for each MV candidate, a test flag (ToBeTestFlag[i]) indicative of whether template matching is to be performed and a cost reference index (CostRefIdx) indicative of a replication source of a cost. For example, the overlapping MV detection section 141 performs, for each MV candidate, setting of a test flag (ToBeTestFlag[i]) and a cost reference index (CostRefIdx) in accordance with such a pseudo code as depicted in FIG. 10.

In step S133, the current PU template generation section 131 generates a template (curTemplate) of the current PU.

In step S134, the reference block template generation section 132 sets an initial value (for example, "0") to the variable i.

In step S135, the reference block template generation section 132 decides whether or not the test flag (ToBeTestFlag[i]) of the MV candidate (CoarseMVCandList[i] (i=0, . . . , numMVCandList−1)) of the second MV accuracy of the processing target is true. In the case where it is decided that this test flag is true (for example, ToBeTestFlag[i]==1), the processing advances to step S136.

In step S136, the reference block template generation section 132 refers to the motion vector information of the MV candidate of the second MV accuracy of the processing target to generate a template of a reference block corresponding to the MV candidate of the second MV accuracy. After the process in step S136 ends, the processing advances to step S141 of FIG. 12.

Figure 12:
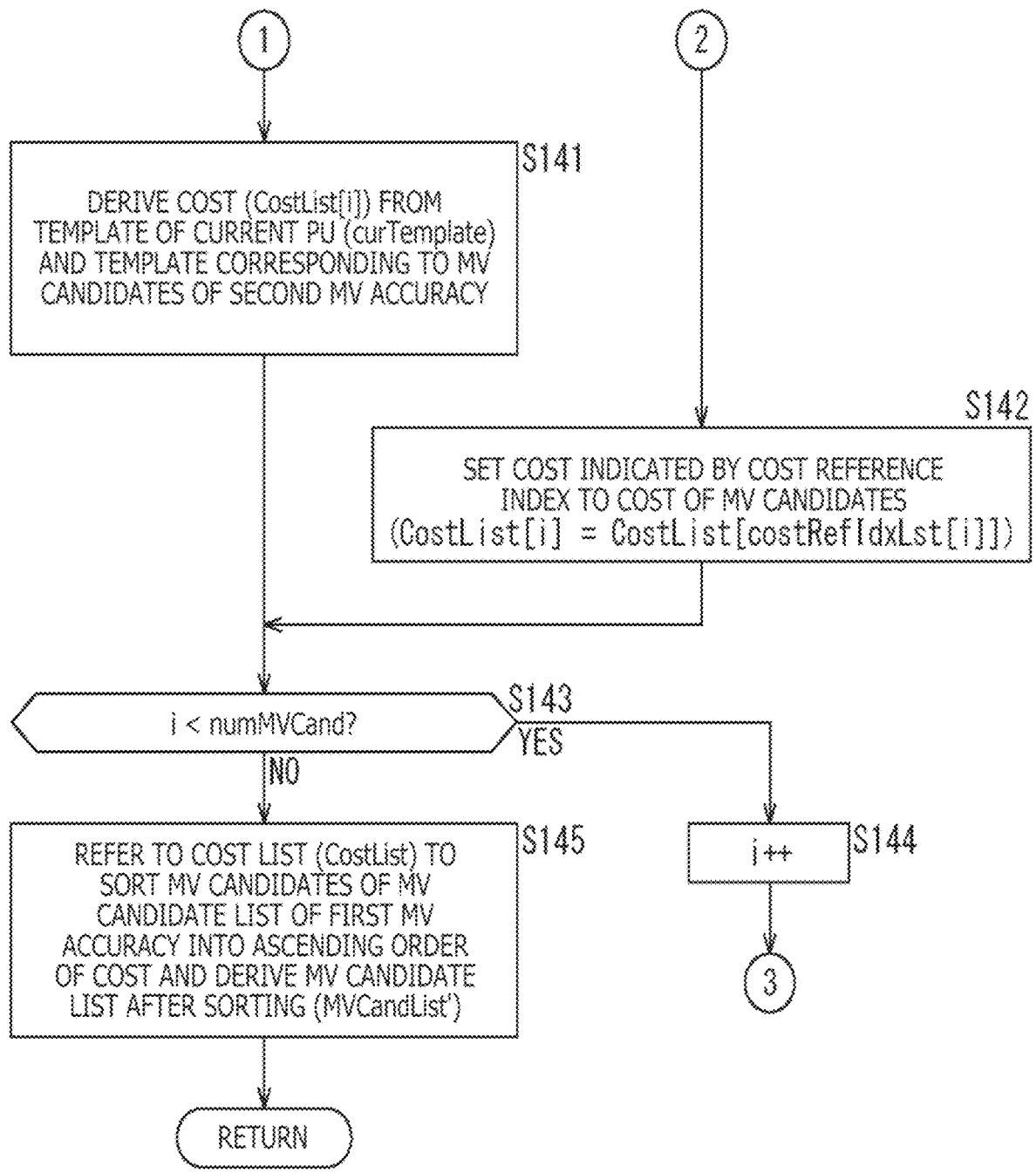
FIG. 12 is a flow chart, continued from FIG. 11, illustrating the example of the flow of the MV candidate list sorting process.

In step S141 of FIG. 12, the cost calculation section 133 derives a cost (CostList[i]) on the basis of the template of the current PU generated in step S133 of FIG. 11 and the template of the reference block corresponding to the MV candidate of the second MV accuracy of the processing target generated in step S136 of FIG. 11. After the cost is derived, the processing advances to step S143.

On the other hand, in the case where it is decided in step S135 of FIG. 11 that the test flag is false (for example, ToBeTestFlag[i]==0), the processing advances to step S142 of FIG. 12.

In step S142, the cost calculation section 133 sets the cost indicated by the cost reference index (CostRefIdx) set in step S132 of FIG. 11 to the cost of the MV candidate of the processing target. In short, the cost value of same motion information is re-utilized (substituted). Consequently, calculation of the cost value for the MV candidate of the processing target (template matching) can be omitted. After the process in step S142 ends, the processing advances to step S143.

In step S143, the reference block template generation section 132 decides whether or not the value of the variable i is smaller than a value (numMVCand) indicative of the number of MV candidates included in the MV candidate list (MVCandList) of the first MV accuracy. In the case where it is decided that the variable i is smaller than the value (numMVCand) (i<numMVCand), the processing advances to step S144.

In step S144, the reference block template generation section 132 increments the variable i (adds "+1" to the value of the variable i). After the process in step S144 ends, the processing returns to step S135 of FIG. 11, and the processes in the subsequent steps are repeated.

In short, the processes in steps S135 to S144 are executed for each MV candidate (for the cost (CostList[i]) corresponding to each MV candidate).

Then, in the case where it is decided in step S143 of FIG. 12 that the variable i is equal to or greater than the value (numMVCand) (i numMVCand), the processing advances to step S145.

In step S145, the MV candidate list sorting section 122 refers to the cost list (CostList) to sort the MV candidates of the MV candidate list of the first MV accuracy in the ascending order of the cost to derive an MV candidate list after sorting (MVCandList').

When the process in step S145 ends, the MV candidate list sorting process ends, and the processing returns to FIG. 5.

By performing the MV candidate list sorting process in such a manner as described above, the MV candidate list sorting section 102 can suppress increase of the number of times of template matching (reduce the number of times) and can suppress increase of the load of sorting of the MV candidate list.

<Method #1-3: Thinning of Template>

Figure 13:
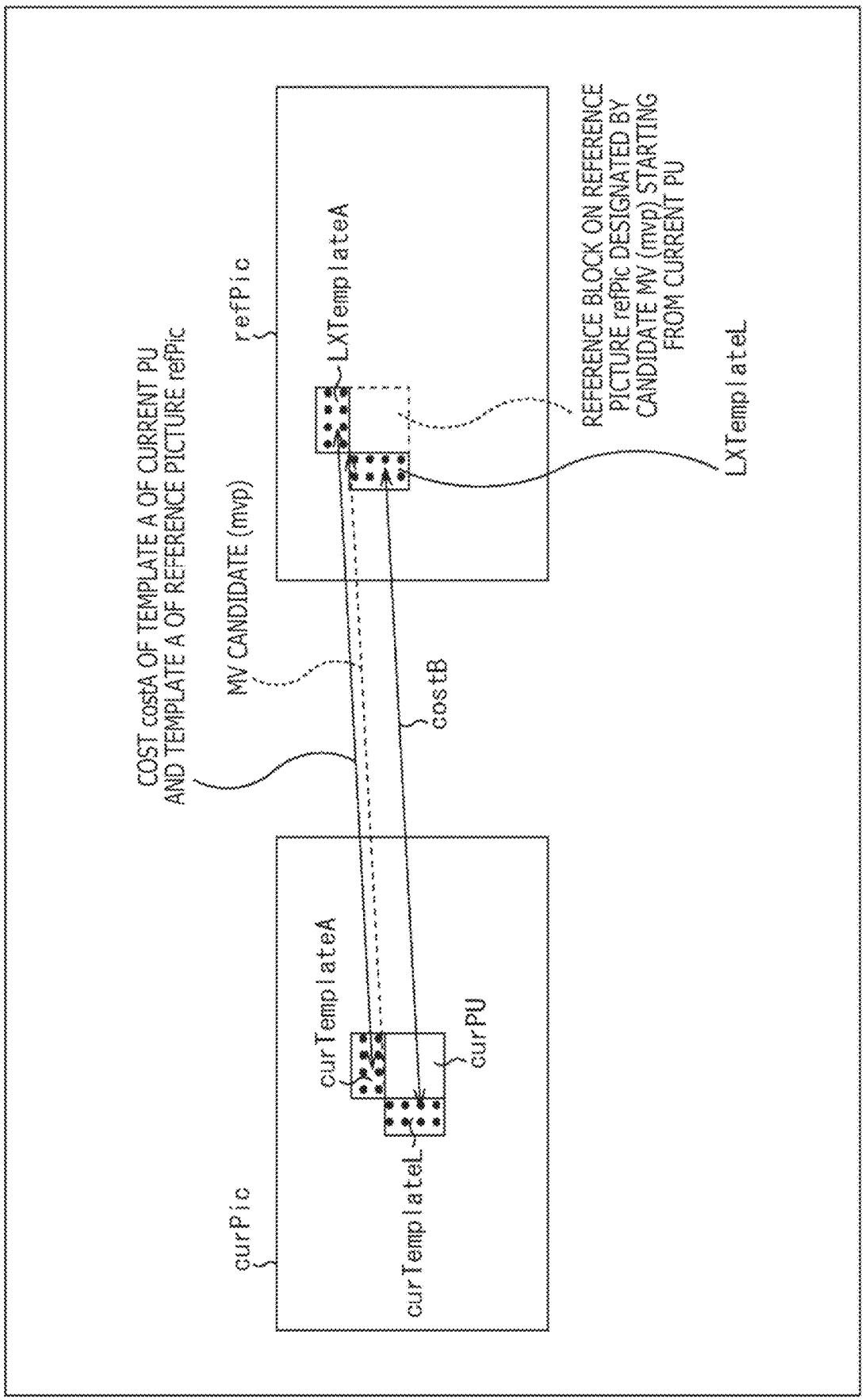
FIG. 13 is a view depicting an example of a manner of thinning of a template.

Now, a case in which the method #1-3 of FIG. 3 is applied is described. In the method #1-3, template matching is performed using a template from which some pixels are thinned out (FIG. 13).

By doing this, the number of pixels decreases in comparison with that of a template of a same size in the case where the method #1-3 is not applied, and therefore, increase of the calculation amount in template matching can be suppressed (the calculation amount can be reduced). Consequently, increase of the hardware cost, increase of the processing time, increase of the power consumption, and so forth necessary for template matching can be suppressed.

Further, the thinning rate is set according to the size of the current PU. Generally, as the block size increases, also the size of the template increases. In short, since the number of pixels of the template increases, also the calculation amount of template matching increases. Therefore, for example, as the block size increases, the thinning rate may be increased. By doing this, increase of the number of pixels of the template by increase of the block size (namely, increase of the calculation amount) can be suppressed.

In other words, for example, if the thinning rate is set such that the calculation amount is appropriate in a large block size, then the thinning rate for a small block size becomes excessively great and the number of pixels of the template becomes extremely small, resulting in the possibility that the thinning rate may be inappropriate for template matching. By setting the thinning rate according to the size of the current PU in such a manner as described above, the number of pixels of the template can be controlled so as to be appropriate also for a small block size.

It is to be noted that the control of the number of pixels of the template may be such that pixels are thinned out from the generate template or, in the case where the method #1-3 is not applied, some of pixels in an adjacent pixel group included in the template may be sampled (extracted) such that a template is generated using the sampled pixels.

In short, "thinning" in the present specification includes also the meaning of "extracting" and "sampling." For example, "to set the thinning rate according to the size of the current PU" includes also the meaning of "to set the extraction rate according to the size of the current PU" and "to set the sampling interval according to the size of the current PU." In this case, the magnitude of each parameter takes the increasing or decreasing direction of the number of pixels into consideration. For example, "to increase the thinning rate" is synonymous with "to decrease the extraction rate" and "to expand the sampling interval." In contrast, "to decrease the thinning rate" is synonymous with "to increase the extraction rate" and "to decrease the sampling interval."

It is to be noted that the thinning method of pixels (method of extraction (sampling)) may be freely decided. For example, the upper template may be thinned (extracted (sampled)) for each column and the left template may be thinned (extracted (sampled)) for each row (line).

<MV Candidate List Sorting Section>

Figure 14:
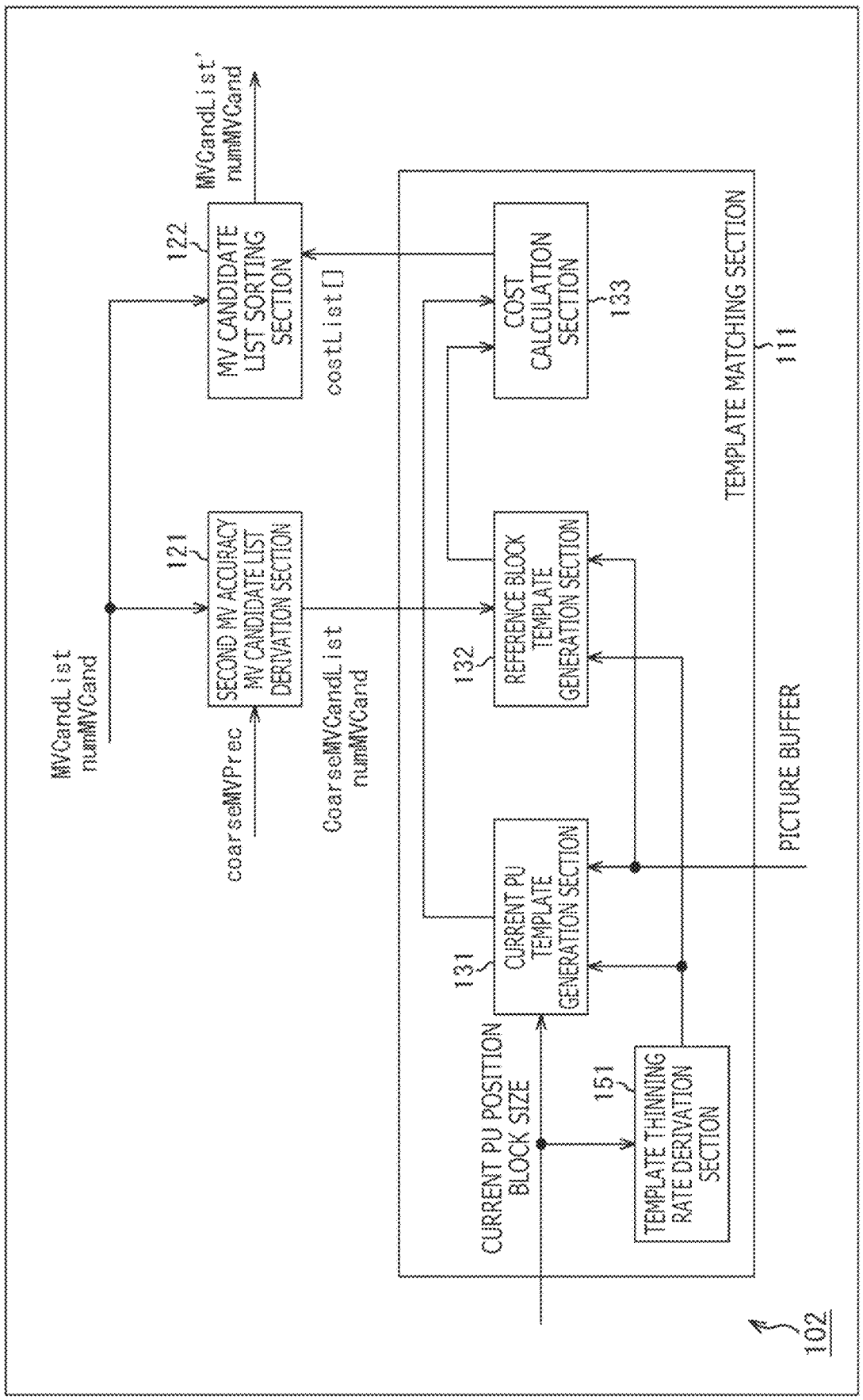
FIG. 14 is a block diagram depicting an example of principal components of the MV candidate list sorting section.

FIG. 14 is a block diagram depicting an example of a configuration of the MV candidate list sorting section 102 of FIG. 4. The MV candidate list sorting section 102 in this case performs sorting of an MV candidate list using the method #1-1 and the method #1-3. In particular, the MV candidate list sorting section 102 performs template matching with rough accuracy and then thins out some of pixels of the template at a thinning rate (ratio) according to the size of the current PU.

The MV candidate list sorting section 102 in this case includes, as depicted in FIG. 14, a second MV accuracy MV candidate list derivation section 121, an MV candidate list sorting section 122, and a template matching section 111 similarly as in the case of FIG. 6. However, the template matching section 111 includes a template thinning rate derivation section 151 in addition to the components of the case of FIG. 6.

<Template Thinning Rate Derivation Section>

The template thinning rate derivation section 151 derives thinning rates of the upper template and the left template according to the size of the current PU. The reason why thinning of the templates is performed is that it is intended to decrease the worst case of the number of reference points upon template matching to a level in template matching with a basic PU size and to fix it.

Figure 15:
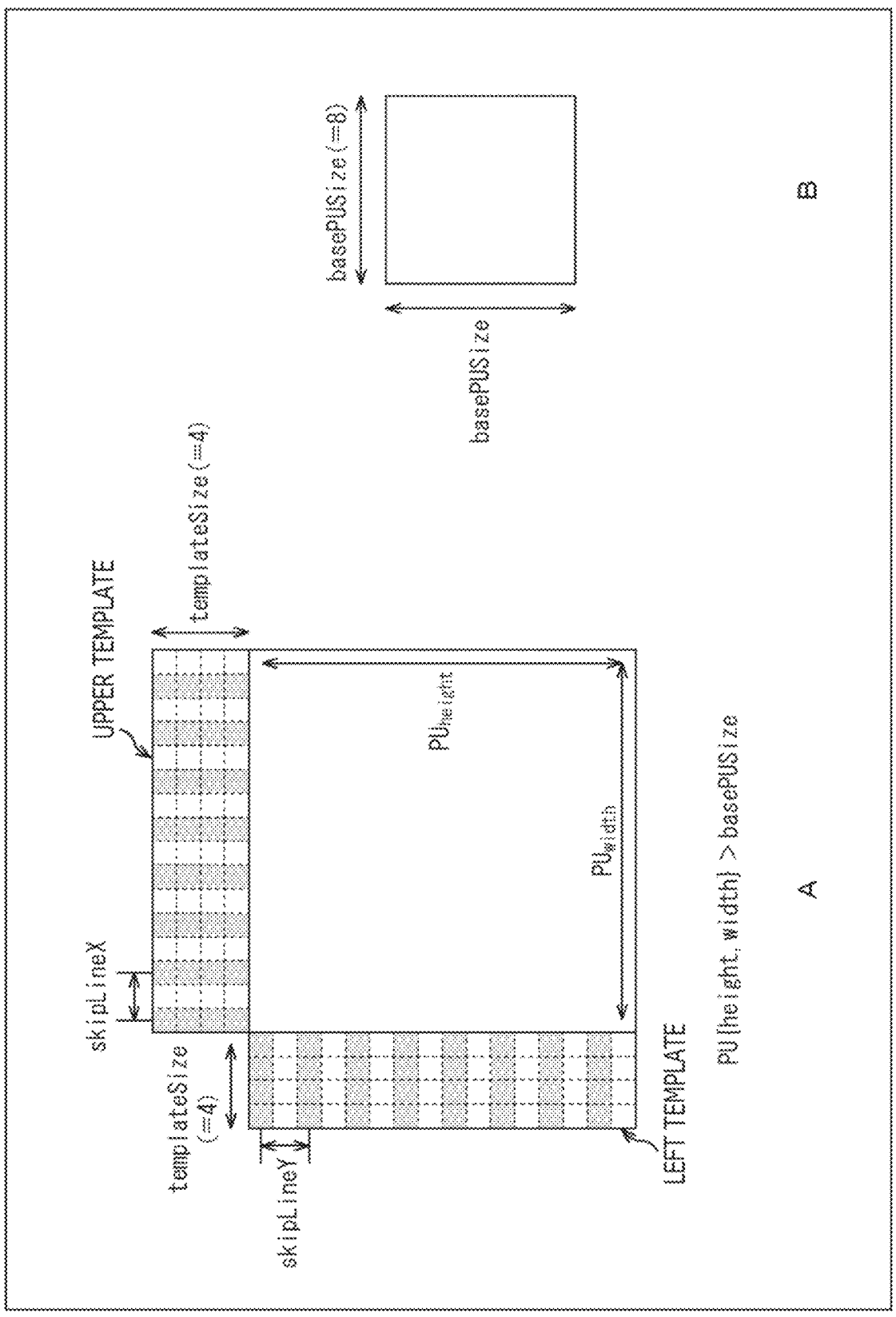
FIG. 15 is a view depicting an example of a manner of thinning of a template.

B of FIG. 15 depicts an example of the basic PU size (basePUSize). This basic PU size is determined in advance. For example, the basic PU size may be set by a standard or the like such that an encoder and a decoder share the information of the basis PU size. Further, it may be made possible for the basic PU size to be set (updated) by a user or the like. In this case, it is sufficient if information of the set basic PU size is supplied from the encoder side to the decoder side. For example, the information may be added (signaled) as metadata or the like to a bit stream of encoded data of an image. It is to be noted that, in the case of the example of B of FIG. 15, the basic PU size (BasePUSize) is "8." The magnitude of this basic PU size may be freely decided.

The template thinning rate derivation section 151 derives a template thinning rate (skipLineX, skipLineY) (sampling interval) on the basis of the block size (PUwidth, PUheight) of the current PU and the basic size of the PU (basePUSize). For example, it is assumed that, as depicted in A of FIG. 15, PUwidth, PUheight, skipLineX, skipLineY, and templateSize are to be set. The template thinning rate derivation section 151 derives the template thinning rate (skipLineX) relating to the upper template in such a manner as indicated by the following expression (17). Further, the template thinning rate derivation section 151 derives the template thinning rate (skipLineY) (sampling interval) relating to the left template in such a manner as indicated by the following expression (18).

[Math. 11]

$$\text{skipLine}X = PU_{width}/\min(\text{basePUSize}, PU_{width}) \tag{17}$$

$$\text{skipLine}Y = PU_{height}/\min(\text{basePUSize}, PU_{height}) \tag{18}$$

For example, if the basic size of the PU is 8 (basePUSize=8) and the size of the current PU is 16×4 (PUwidth=16, Puheight=4), then the template thinning rate (skipLineX) relating to the upper template is derived in the following manner using the expression (17).

$$\text{skipLine}X = 16/\min(8,16) = 16/8 = 2$$

Similarly, the template thinning rate (skipLineY) relating to the left template is derived in the following manner using the expression (18).

$$\text{skipLine}Y = 4/\min(8,4) = 4/4 = 1$$

In this case, it is indicated that the upper template generates a reference pixel for each two pixels in the x direction and the left template generates a reference pixel for each one pixel in the y direction.

Figure 16:
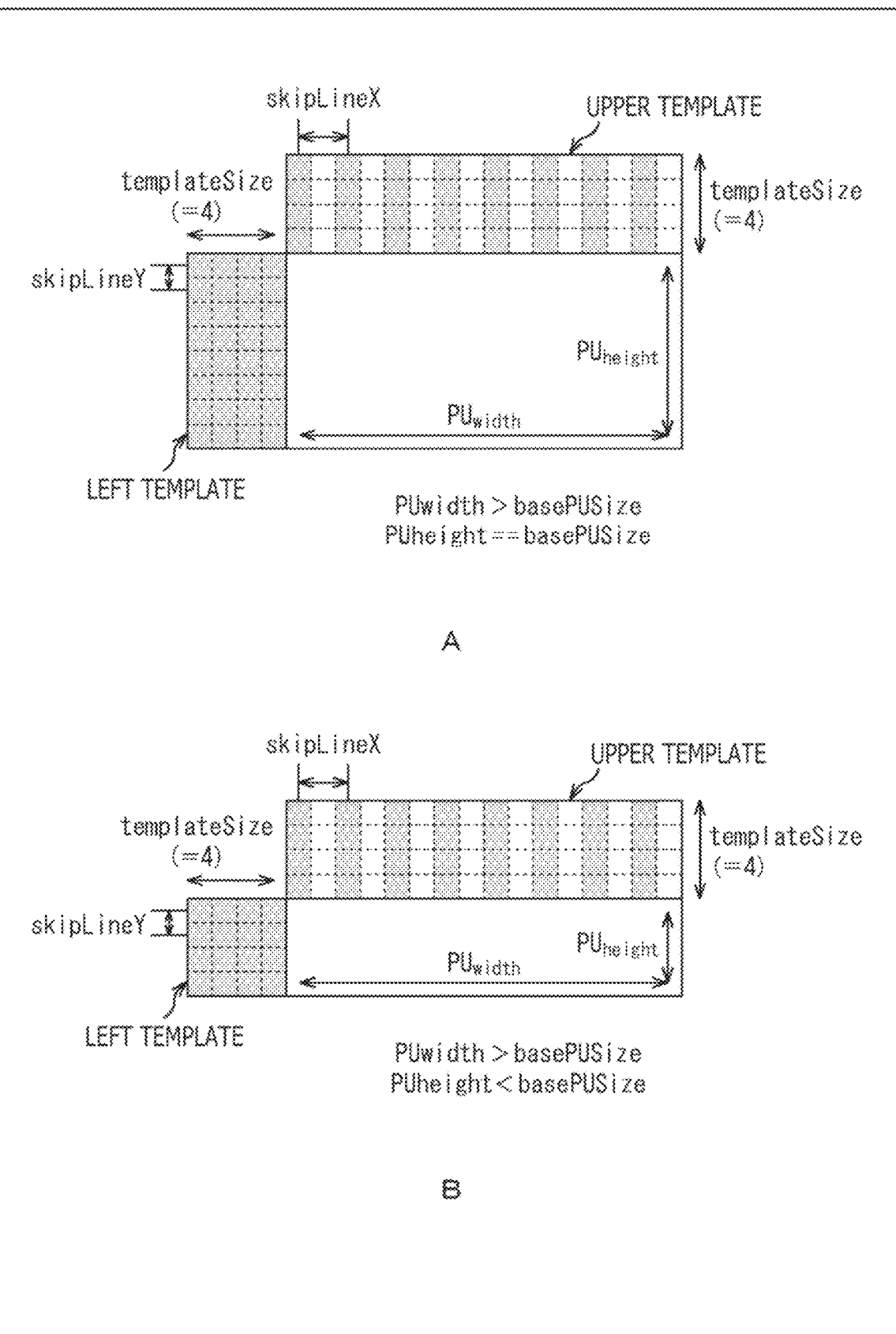
FIG. 16 is a view depicting examples of a manner of thinning of a template.

A of FIG. 15 depicts an example of a manner of thinning (manner of sampling) of pixels of a template. Gray portions of the upper template and the left template in the figure indicate sampled pixels. A of FIG. 16 depicts another example of a manner of thinning (manner of sampling) of pixels of a template. B of FIG. 16 depicts a further example of a manner of thinning (manner of sampling) of pixels of a template.

It is to be noted that the basic size of the PU (basePUSize) and the number of lines of pixels to be used in a template (templateSize) may have an equal value. Further, in the expression (17) and the expression (18) given hereinabove, min(basePUSize, PUwidth) and min(basePUSize, PUheight) may be basePUSize.

After the thinning rate is derived in such a manner as described above, the template thinning rate derivation section 151 supplies the derived template thinning rate to the current PU template generation section 131 and the reference block template generation section 132.

Current PU Template Generation Section

In this case, the current PU template generation section 131 refers to the template thinning rate supplied thereto to generate a template of the current PU (curTemplate).

In particular, with the upper left position (x0, y0) of the current PU set as a reference, the upper template of the current PU (curTemplateA) and the left template of the current PU (curTemplateL) are generated on the basis of the template thinning rate (skipLineX, skipLineY). For example, the upper template of the current PU is derived as indicated by the following expression (19). Further, the left template of the current PU is derived as indicated by the following expression (20).

[Math. 12]

$$curTemplateA=\{(x0+skipLineX* 1,y0-j-1)|i=0,\ldots,\min(basePUSize\ PU_{width})- 1,j=0,\ldots,templateSize-1\} \quad (19)$$

$$curTemplateL=\{(x0-i-1,y0+skipLineY*j)|i= 0,\ldots,templateSize-1,j=0,\ldots,\min(basePU- Size,PU_{height})-1\} \quad (20)$$

For example, a case is conceivable in which the upper template or the left template of the current PU cannot be utilized because the current PU is adjacent a picture boundary or in a like situation. In this case, it is sufficient if the template on the side that cannot be referred to is generated by setting a predetermined value to it. For example, if the bit depth of the input image is represented by bitDepth, then it is sufficient if '1<<(bitDepth-1)' or '(1<<(bitDepth-1))-1' is set to the predetermined value. It is to be noted that, in the expression (19) and the expression (20), the parameter templateSize indicates the number of lines of pixels used in the template.

The current PU template generation section 131 supplies the template of the current PU generated in such a manner as described above to the cost calculation section 133.

<Reference Block Template Generation Section>

The reference block template generation section 132 acquires an MV candidate list of the second MV accuracy derived by the second MV accuracy MV candidate list derivation section 121, pixel values decoded already from the picture buffer, and a template thinning rate supplied from the template thinning rate derivation section 151 and derives (generates), on the basis of them, a template of the reference block.

In particular, the reference block template generation section 132 generates, on the basis of the template thinning rate (skipLineX, skipLineY), an upper template (LXTemplateA) of the reference block and a left template (LXTemplateL) of the reference block determined by the current PU and the candidate MV (MVCandList[i]). It is to be noted that, in the case of bi-prediction, templates for both L0 and L1 are generated.

For example, the upper template (LXTemplateA) of the reference block is derived in such a manner as indicated by the following expression (21). Meanwhile, the left template (LXTemplateL) of the reference block is derived in such a manner as indicated by the following expression (22).

[Math. 13]

$$LXTemplateA=\{(x0+lx_{dx}+skipLineX*i,y0+lx_{dy}-j-1) |i=0,\ldots,\min(basePUSize,PU_{width})-1,j= 0,\ldots,templateSize-1\} \quad (21)$$

$$LXTemplateL=\{(x0+lx_{dx}-i,y0+lx_{dy}+skipLineY*j)|i= 0,\ldots,templateSize-1,j=0,\ldots,\min(basePU- Size,PU_{height})-1\} \quad (22)$$

For example, a case is conceivable in which the upper template or the left template of the reference block cannot be utilized because the reference block is adjacent a picture boundary or in a like situation. In this case, it is sufficient if the template on the side that cannot be referred to is generated by setting a predetermined value to it. It is to be noted that, in the expressions (21) and (22), $lx_{dx}$ indicates a motion vector in the x direction of LX prediction of the MV candidate (MVCandList[i]) and $lx_{dy}$ indicates a motion vector in the y direction of LX prediction of the MV candidate (MVCandList[i]).

Further, in the case where the coordinate position of a pixel group included in the template of the reference block is a sub-pel position, it is generated, for example, by linear interpolation from a pixel of an adjacent integer position. However, the reference block template generation section 132 derives (generates) a template of the reference block on the basis of the MV candidates of the second MV accuracy. Accordingly, for example, by setting the second MV accuracy to integer pixel accuracy, the reference block template generation section 132 can derive a point play of the reference block without performing such linear interpolation as described above. In short, the reference block template generation section 132 can derive (generate) a template of the reference block more easily than in the case where the derivation (generation) is based on MV candidates of the first MV accuracy. Accordingly, the calculation amount for template derivation of the reference block can be reduced. The reference block template generation section 132 supplies the generated template of the reference block to the cost calculation section 133.

<Cost Calculation Section>

The cost calculation section 133 performs template matching using a template generated in such a manner as described above (template in which some of pixels are thinned out). Accordingly, increase of the calculation amount of template matching can be suppressed (the calculation amount can be reduced). In short, increase of the hardware cost, increase of the processing time, increase of the power consumption, and so forth necessary for template matching can be suppressed. Further, increase of the load of sorting of the MV candidate list can be suppressed. In short, increase of the hardware cost, increase of the processing time, increase of the power consumption, and so forth necessary for sorting of the MV candidate list can be suppressed.

<Flow of MV Candidate List Sorting Process>

Figure 17:
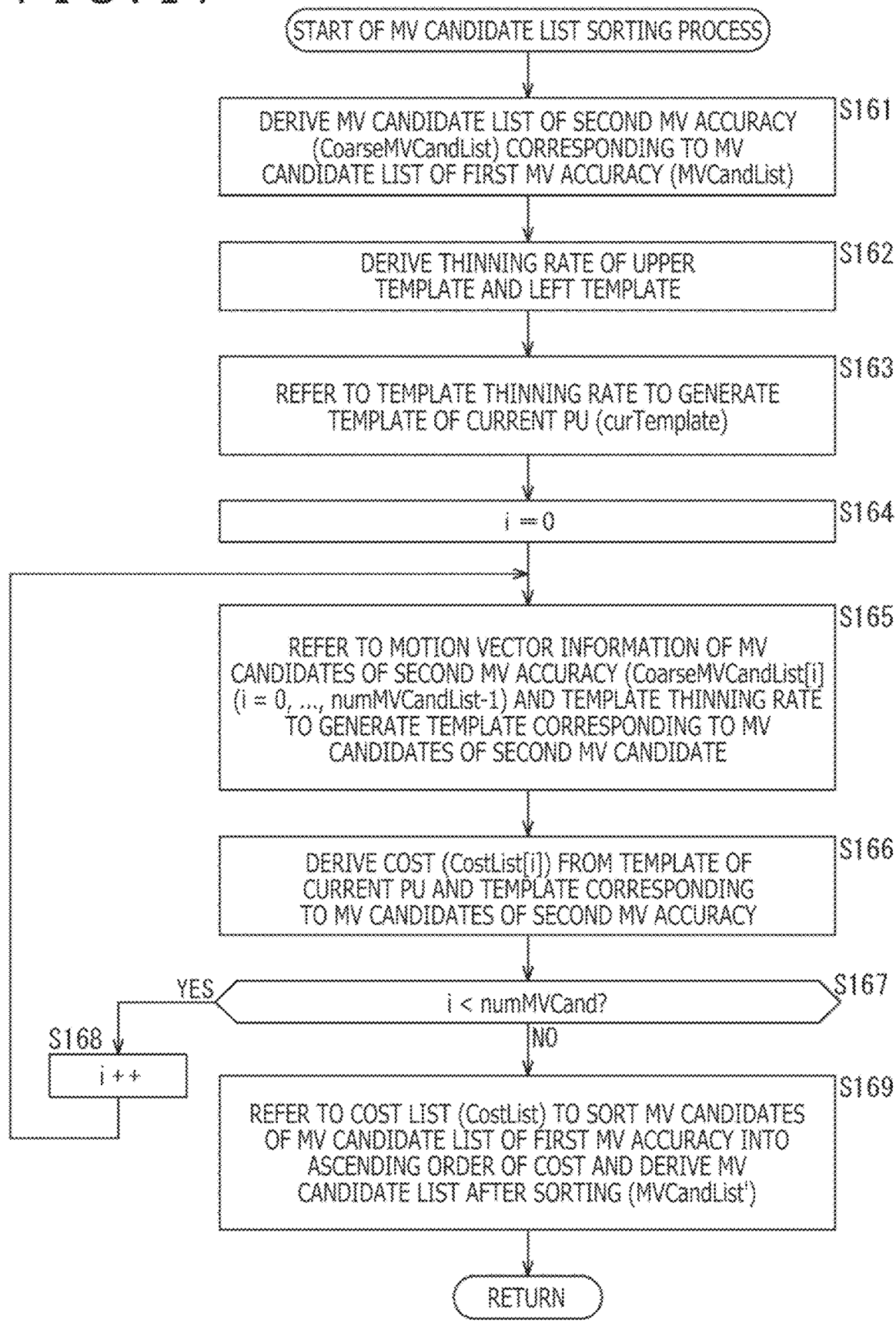
FIG. 17 is a flow chart illustrating an example of a flow of the MV candidate list sorting process.

An example of a flow of the MV candidate list sorting process executed in step S102 of FIG. 5 by the MV candidate list sorting section 102 in this case (method #1-3 (and method #1-1)) is described with reference to a flow chart of FIG. 17.

After the MV candidate list sorting process is started, the second MV accuracy MV candidate list derivation section 121 derives, in step S161, an MV candidate list (CoarseMVCandList) of the second MV accuracy corresponding to an MV candidate list (MVCandList) of the first MV accuracy on the basis of an MV accuracy parameter (coarseMVPrec) indicative of the second MV accuracy.

In step S162, the template thinning rate derivation section 151 derives a template thinning rate of the upper template and the left template as described hereinabove.

In step S163, the current PU template generation section 131 refers to the template thinning rates derived in step S162 to generate a template (curTemplate) of the current PU.

In step S164, the reference block template generation section 132 sets an initial value (for example, "0") to the variable i.

In step S165, the reference block template generation section 132 refers to the motion vector information of the MV candidate of the second MV accuracy (CoarseMVCandList[i] (i=0, . . . , numMVCandList−1)) and the template thinning rate calculated in step S162 to generate a template of the reference block corresponding to the MV candidate of the second MV accuracy.

In step S166, the cost calculation section 133 derives a cost (CostList[i]) on the basis of the template of the current PU generated in step S163 and the template of the reference block corresponding to the MV candidate of the second MV accuracy generated in step S165. In short, the cost calculation section 133 performs template matching using the template generated by reference to the template thinning rate derived in step S162 (template in which pixels are thinned out at the template thinning rate) and derives a cost.

In step S167, the reference block template generation section 132 decides whether or not the value of the variable i is smaller than a value (numMVCand) indicative of the number of MV candidates included in the MV candidate list (MVCandList) of the first MV accuracy. In the case where it is decided that the variable i is smaller than the value (numMVCand) (i<numMVCand), the processing advances to step S168.

In step S168, the reference block template generation section 132 increments the variable i (adds "+1" to the value of the variable i). After the process in step S168 ends, the processing returns to step S165 and the processes in the subsequent steps are repeated.

In short, the processes in steps S165 to S168 are executed for each MV candidate (for the cost (CostList[i]) corresponding to the MV candidate).

Then, in the case where it is decided in step S167 that the variable i is equal to or greater than the value (numMVCand) (i≥numMVCand), the processing advances to step S169.

In step S169, the MV candidate list sorting section 122 refers to the cost list (CostList) to sort the MV candidates of the MV candidate list of the first MV accuracy in the ascending order of the cost to derive an MV candidate list after sorting (MVCandList').

When the process in step S169 ends, the MV candidate list sorting process ends and the processing returns to FIG. 5.

By performing the MV candidate list sorting process in such a manner as described above, the MV candidate list sorting section 102 can suppress increase of the calculation amount of template matching (reduce the calculation amount) and can suppress increase of the load of sorting of the MV candidate list.

<Method #1-4: MV Candidate List Sorting Section>

Figure 18:
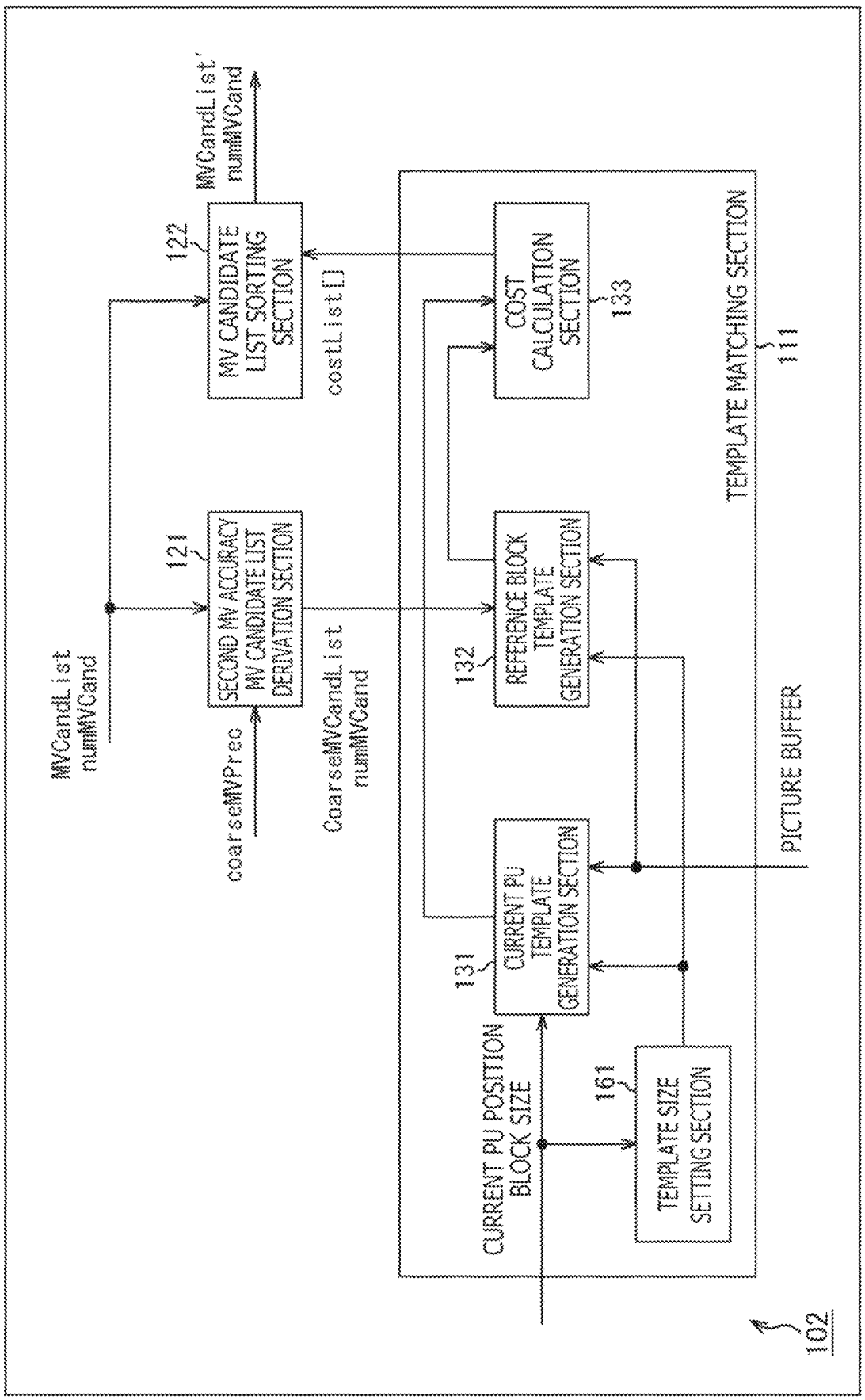
FIG. 18 is a block diagram depicting an example of principal components of the MV candidate list sorting section.

Now, a case in which the method #1-4 of FIG. 3 is applied is described. FIG. 18 is a block diagram depicting an example of a configuration of the MV candidate list sorting section 102 of FIG. 4. The MV candidate list sorting section 102 in this case performs sorting of an MV candidate list using the method #1-1 and the method #1-4. In particular, the MV candidate list sorting section 102 performs template matching with rough accuracy and then controls the template size according to the position of the current PU.

The MV candidate list sorting section 102 in this case includes, as depicted in FIG. 18, a second MV accuracy MV candidate list derivation section 121, an MV candidate list sorting section 122, and a template matching section 111 similarly as in the case of FIG. 6. However, the template matching section 111 includes a template size setting section 161 in addition to the components of the case of FIG. 6.

<Template Size Setting Section>

The template size setting section 161 sets a size of the upper template and the left template (template size).

By reducing an adjacent decoded pixel group (line buffer) necessary for encoding and decoding a current CTU, the circuit scale of hardware can be reduced. Therefore, in order to reduce the size of the line buffer of the CTU level for holding decoded pixels, the template size is set according to the position of the current PU in the CTU.

For example, the template size relating to the upper template (templateSizeY) is set in such a manner indicated by the following expression (23) on the basis of the CTU size (CTUSize) of the current CTU and the position (xPU, yPU) of the current PU in the picture. Further, the template size relating to the left template (templateSizeX) is set in such a manner as indicated by the following expression (24).

[Math. 14]

$$\text{templateSize}Y = (yPU \% \text{ CTUSize} == 0)?\text{templateSize1}:\text{templateSize2} \quad (23)$$

$$\text{templateSize}X = (xPU \% \text{ CTUSize} == 0)?\text{templateSize1}:\text{templateSize2} \quad (24)$$

Here, templateSize1 is a template size in the case where the current PU is positioned on a CTU boundary, and templateSize2 is a template size in the case where the current PU is not positioned on a CTU boundary. They have a relation of templateSize1<templateSize2.

Figure 19:
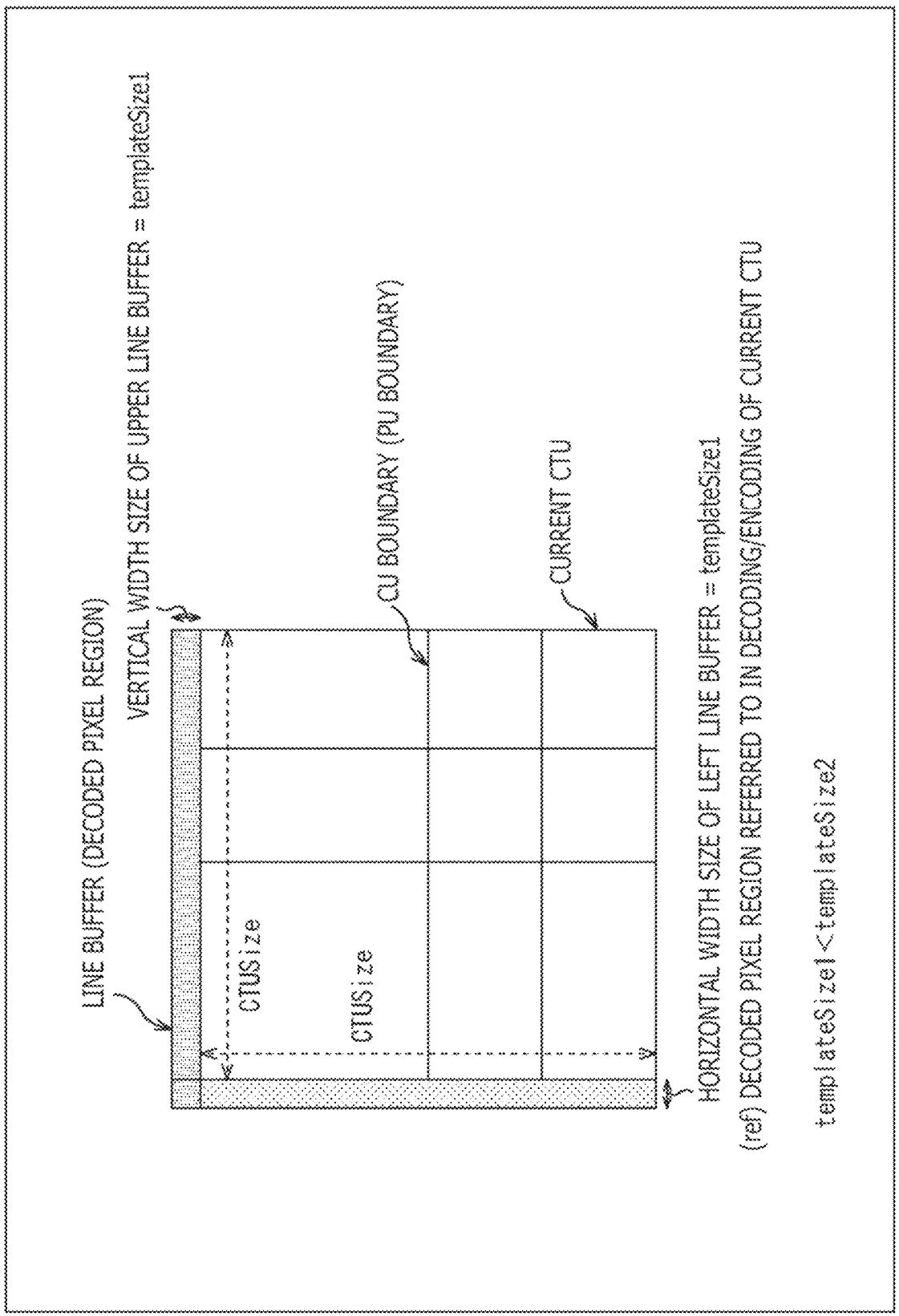
FIG. 19 is a view depicting an example of setting of a template size.

For example, it is assumed that nine CUs (PUs) are formed in the current CTU as depicted in FIG. 19. For example, it is assumed that the current CU (current PU) is a CU (PU) at the upper left end of the current CTU as in the example depicted in A of FIG. 20 (slanting line portion in the figure). In this case, the current CU (current PU) is in contact with a CTU boundary on the upper side and a CTU boundary on the left side of the current CTU. In short, both the upper template and the left template of this current CU (current PU) are positioned on the outer side of the current CTU. Accordingly, templateSizeX=templateSizeY=templateSize1 is set.

Figure 20:
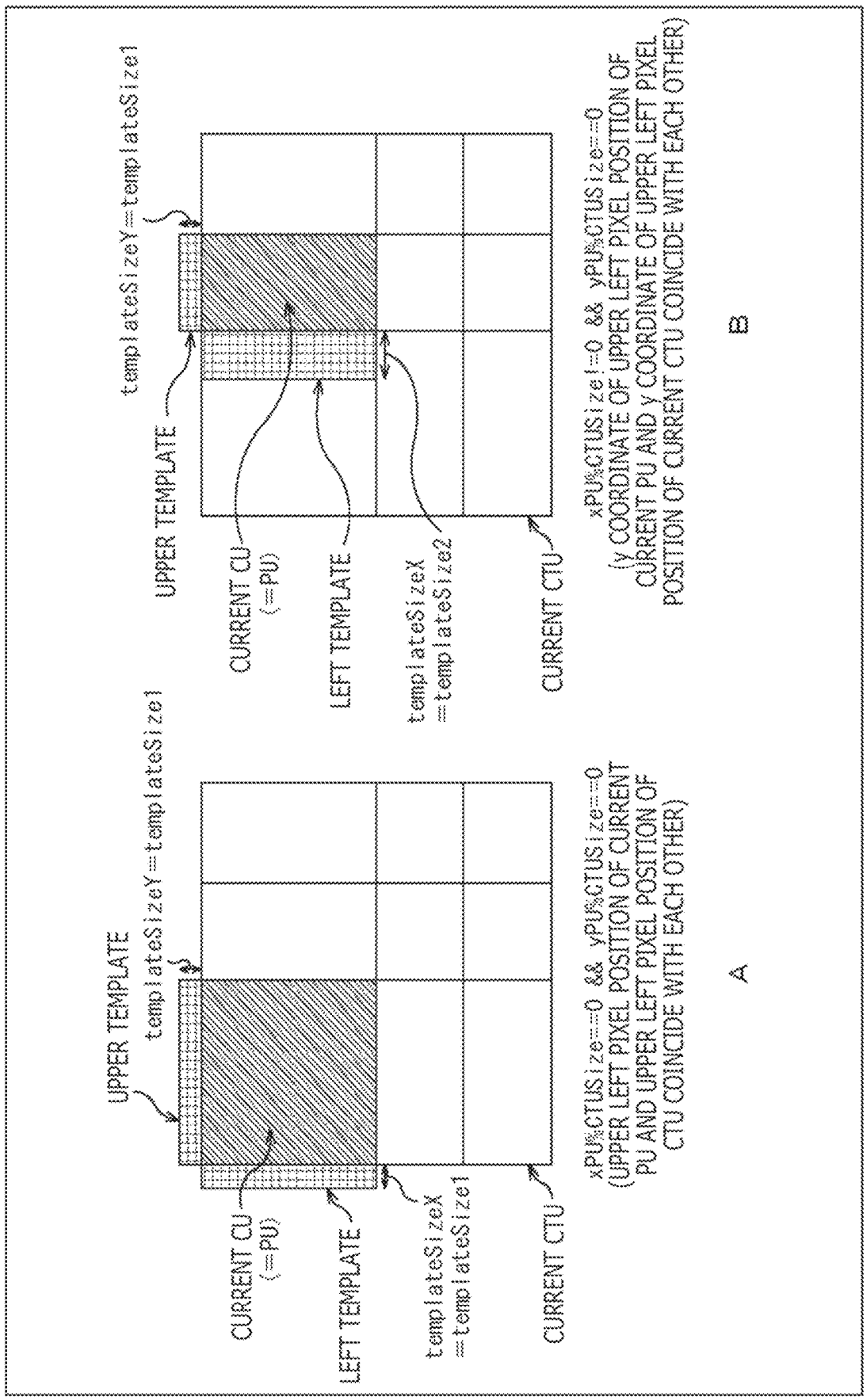
FIG. 20 is a view depicting examples of setting of a template size.

On the other hand, in the case of the example depicted in B of FIG. 20, the current CU (current PU) (slanting line portion in the figure) is in contact with a CTU boundary on the upper side of the current CTU. In short, the upper template of the current CU (current PU) is positioned on the outer side of the current CTU. Accordingly, templateSizeX=templateSize2 and templateSizeY=templateSize1 are set.

Figure 21:
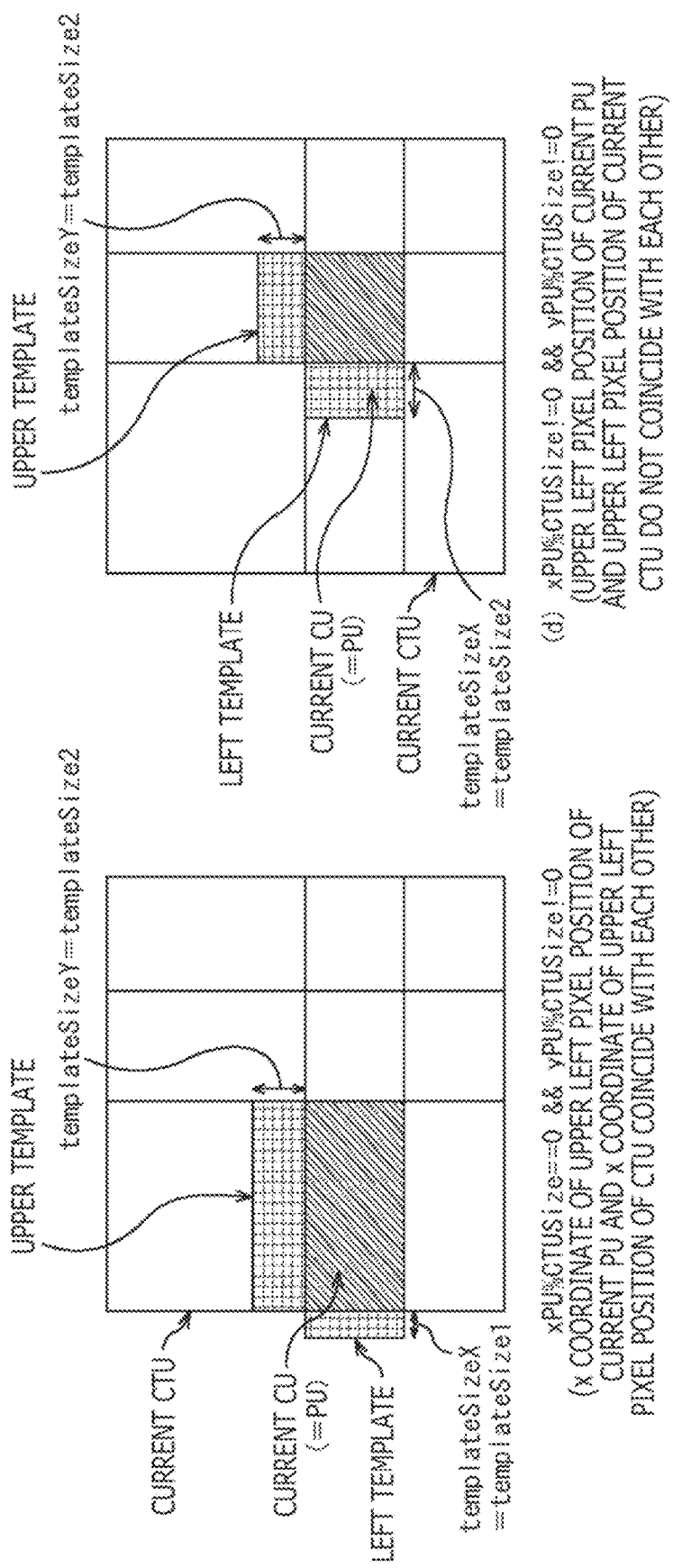
FIG. 21 is a view depicting examples of setting of a template size.

Further, in the case of the example depicted in A of FIG. 21, the current CU (current PU) (slanting line portion in the figure) is in contact with a CTU boundary on the left side of the current CTU. In short, the left template of the current CU (current PU) is positioned on the outer side of the current CTU. Accordingly, templateSizeX=templateSize1 and templateSizeY=templateSize2 are set.

Further, in the case of an example depicted in B of FIG. 21, the current CU (current PU) (slanting line portion in the figure) is not in contact with a CTU boundary of the current CTU. In short, the upper template and the left template of the current CU (current PU) are positioned on the inner side of the current CTU. Accordingly, templateSizeX=templateSizeY=templateSize2 is set.

The values of templateSize1 and templateSize2 may be freely decided as long as they have the relation of templateSize1<templateSize2. For example, in the case where dependency between adjacent CTUs is not excluded, by setting templateSize1=2 and templateSize2=4, increase of the line buffer can be suppressed (line buffer can be reduced). Further, for example, in the case where dependency between adjacent CTUs is excluded (in the case where independent decoding between slices (or tiles) is coped with), by setting templateSize1=0 and templateSize2=4 such that pixel reference of an adjacent CTU is not performed, not only increase of the line buffer can be suppressed (the line buffer can be reduced) but also independent decoding between slices (or tiles) can be implemented.

Similarly, also the size of a reference pixel region of intra prediction may be determined according to the position of the current PU in the CTU. By doing this, increase of the line buffer used to hold a reference pixel region of intra prediction can be suppressed (the line buffer can be reduced).

The template size setting section 161 supplies information of the template size set in such a manner as described above to the current PU template generation section 131 and the reference block template generation section 132.

<Current PU Template Generation Section>

The current PU template generation section 131 refers to a template size supplied from the template size setting section 161 to generate a template of the current PU.

In particular, with the upper left position (x0, y0) of the current PU set as a reference, the current PU template generation section 131 generates an upper template of the current PU (curTemplateA) and a left template of the current PU (curTemplateL) on the basis of a template size (templateSizeX, templateSizeY) set by the template size setting section 161. For example, the upper template is derived in such a manner as indicated by the following expression (25). Further, the left template is derived in such a manner as indicated by the following expression (26).

[Math. 15]

$$\text{curTemplate}A=\{(x0+i, y0-j-1) | i=0,\ldots, PU_{width}-1, j=0,\ldots, \text{templateSize}Y-1\} \quad (25)$$

$$\text{curTemplate}L=\{(x0-i-1, y0+j) | i=0,\ldots, \text{templateSize}X-1, j=0,\ldots, PU_{height}-1\} \quad (26)$$

For example, a case is conceivable in which the upper template or the left template of the current PU cannot be utilized because the current PU is adjacent a picture boundary or in a like situation. In this case, it is sufficient if the template on the side that cannot be referred to is generated by setting a predetermined value to it. It is to be noted that, in the expressions (25) and (26), the parameter templateSize indicates the number of lines of pixels used in the template. The current PU template generation section 131 supplies the template of the current PU generated in such a manner as described above to the cost calculation section 133.

<Reference Block Template Generation Section>

The reference block template generation section 132 acquires an MV candidate list of the second MV accuracy derived by the second MV accuracy MV candidate list derivation section 121, pixel values decoded already from the picture buffer, and a template size supplied from the template size setting section 161 and derives (generates) a template of a reference block on the basis of them.

In particular, the reference block template generation section 132 generates an upper template (LXTemplateA) of the reference block and a left template (LXTemplateL) of the reference block that are determined by the current PU and the MV candidate (MVCandList[i]) on the basis of the template size (templateSizeX, templateSizeY). It is to be noted that, in the case of bi-prediction, both of the templates of L0 and L1 are generated.

For example, the upper template of the reference block is derived as indicated by the following expression (27). Further, the left template of the reference block is derived as indicated by the following expression (28).

[Math. 16]

$$LX\text{Template}A=\{(x0+Lx_{dx}+i, y0+lx_{dy}-j-1) | i=0,\ldots, PU_{width}-1, j=0,\ldots, \text{templateSize}Y-1\} \quad (27)$$

$$LX\text{Template}L=\{(x0+lx_{dx}-i, y0+lx_{dy}+j) | i=0,\ldots, \text{templateSize}X-1, j=0,\ldots, PU_{height}-1\} \quad (28)$$

For example, a case is conceivable in which the upper template or the left template of the reference block cannot be utilized because the reference block is adjacent a picture boundary or in a like situation. In this case, it is sufficient if the template on the side that cannot be referred to is generated by setting a predetermined value to it. It is to be noted that, in the expressions (27) and (28), $lx_{dx}$ indicates a motion vector in the x direction of LX prediction of the MV candidate (MVCandList[i]) and $lx_{dy}$ indicates a motion vector in the y direction of LX prediction of the MV candidate (MVCandList[i]).

Further, in the case where the coordinate position of a pixel group included in the template of the reference block is a sub-pel position, it is generated, for example, by linear interpolation from a pixel of an adjacent integer position. However, the reference block template generation section 132 derives (generates) a template of the reference block on the basis of the MV candidates of the second MV accuracy. Accordingly, for example, by setting the second MV accuracy to integer pixel accuracy, the reference block template generation section 132 can derive a point play of the reference block without performing such linear interpolation as described above. In short, the reference block template generation section 132 can derive (generate) a template of the reference block more easily than in the case where the derivation (generation) is based on MV candidates of the first MV accuracy. Accordingly, the calculation amount for template derivation of the reference block can be reduced. The reference block template generation section 132 supplies the generated template of the reference block to the cost calculation section 133.

<Cost Calculation Section>

The cost calculation section 133 performs template matching using a template generated in such a manner as described above (template in which the template size is controlled according to the position of the current PU). Accordingly, increase of decoded pixels to be used in template generation can be suppressed (decoded pixels to be used in template generation can be reduced). In short, increase of the size of the line buffer for storing (retaining) the decoded pixels can be suppressed (the line buffer size can be reduced). In short, increase of the load of template matching can be suppressed. Further, by this, increase of the load of sorting of the MV candidate list can be suppressed.

<Flow of MV Candidate List Sorting Process>

Figure 22:
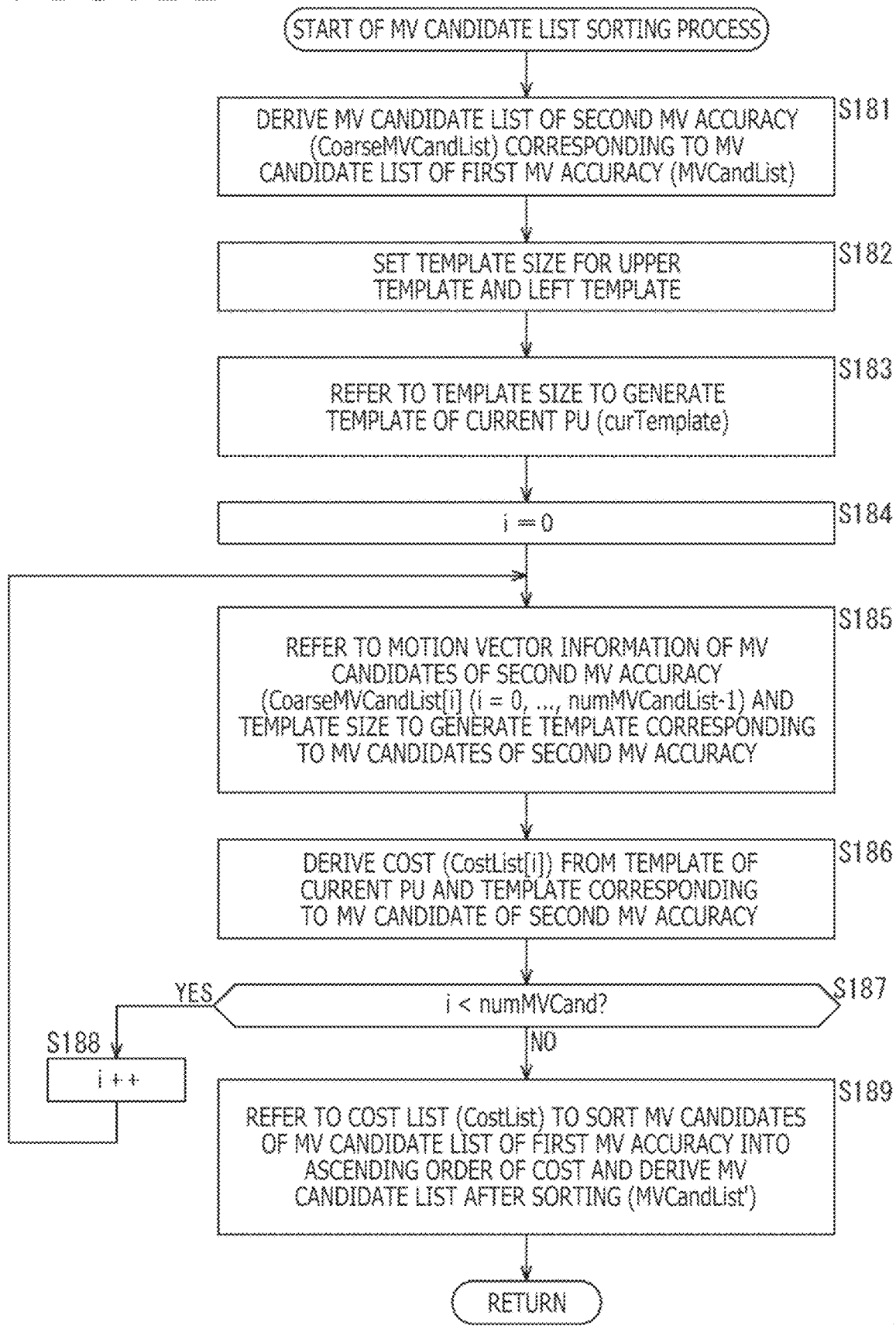
FIG. 22 is a flow chart illustrating an example of a flow of the MV candidate list sorting process.

An example of a flow of the MV candidate list sorting process executed in step S102 of FIG. 5 by the MV candidate list sorting section 102 in this case (method #1-4 (and method #1-1)) is described with reference to a flow chart of FIG. 22.

After the MV candidate list sorting process is started, the second MV accuracy MV candidate list derivation section 121 derives, in step S181, an MV candidate list (CoarseMVCandList) of the second MV accuracy corresponding to an MV candidate list (MVCandList) of the first MV accuracy on the basis of an MV accuracy parameter (coarseMVPrec) indicative of the second MV accuracy.

In step S182, the template size setting section 161 sets a template size of the upper template and the left template as described hereinabove.

In step S183, the current PU template generation section 131 refers to the template size set in step S182 to generate a template (curTemplate) of the current PU.

In step S184, the reference block template generation section 132 sets an initial value (for example, "0") to the variable i.

In step S185, the reference block template generation section 132 refers to motion vector information of the MV candidate of the second MV accuracy (CoarseMVCandList [i] (i=0, . . . , numMVCandList−1)) and the template size set in step S182 to generate a template of the reference block corresponding to the MV candidate of the second MV accuracy.

In step S186, the cost calculation section 133 derives a cost (CostList[i]) on the basis of the template of the current PU generated in step S163 and the template of the reference block corresponding to the MV candidate of the second MV accuracy generated in step S165. In short, the cost calculation section 133 performs template matching using the template of the template size set in step S182 (template size set according to the position of the current PU) to derive a cost.

In step S187, the reference block template generation section 132 decides whether or not the value of the variable i is smaller than a value (numMVCand) indicative of the number of MV candidates included in the MV candidate list (MVCandList) of the first MV accuracy. In the case where it is decided that the variable i is smaller than the value (numMVCand) (i<numMVCand), the processing advances to step S188.

In step S188, the reference block template generation section 132 increments the variable i (adds "+1" to the value of the variable i). After the process in step S188 ends, the processing returns to step S185 and the processes in the subsequent steps are repeated.

In short, the processes in steps S185 to S188 are executed for each MV candidate (for the cost (CostList[i]) corresponding to the MV candidate).

Then, in the case where it is decided in step S187 that the variable i is equal to or greater than the value (numMVCand) (i numMVCand), the processing advances to step S189.

In step S189, the MV candidate list sorting section 122 refers to the cost list (CostList) to sort the MV candidates of the MV candidate list of the first MV accuracy in the ascending order of the cost to derive an MV candidate list after sorting (MVCandList').

When the process in step S189 ends, the MV candidate list sorting process ends and the processing returns to FIG. 5.

By performing the MV candidate list sorting process in such a manner as described above, the MV candidate list sorting section 102 can suppress increase of the size of the line buffer used in template matching (reduce the line buffer size) and can suppress increase of the load of sorting of the MV candidate list.

<Method #1-5: MV Candidate List Sorting Section>

Figure 23:
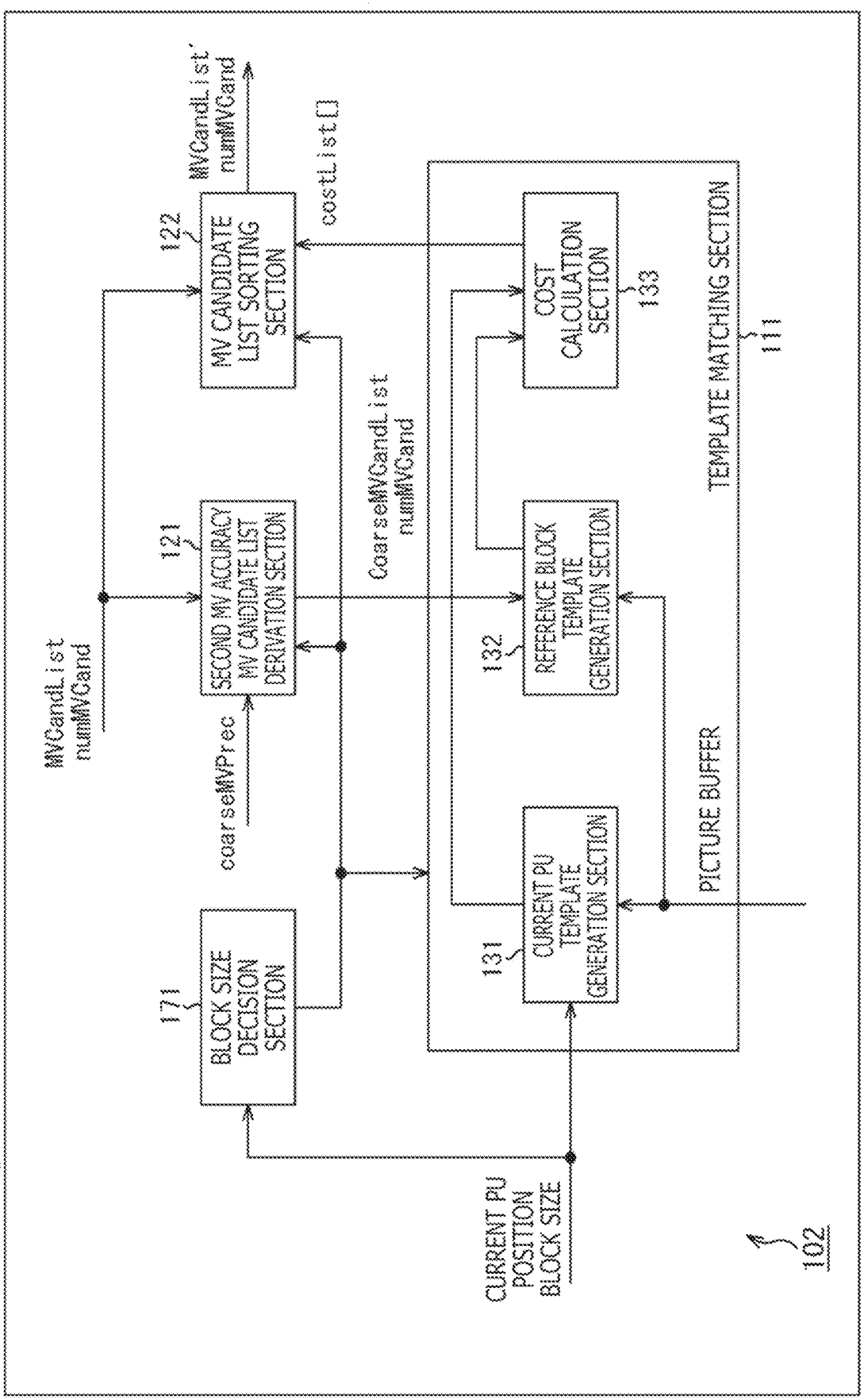
FIG. 23 is a block diagram depicting an example of principal components of the MV candidate list sorting section.

Now, a case in which the method #1-5 of FIG. 3 is applied is described. FIG. 23 is a block diagram depicting an example of a configuration of the MV candidate list sorting section 102 of FIG. 4. The MV candidate list sorting section 102 in this case performs sorting of an MV candidate list using the method #1-1 and the method #1-5. In particular, the MV candidate list sorting section 102 performs template matching with rough accuracy. Further, in the case where the size of the current PU is small, the sorting process for an MV candidate list is skipped (omitted).

The MV candidate list sorting section 102 in this case includes, as depicted in FIG. 18, a block size decision section 171 in addition to the components in the case of FIG. 6 (the second MV accuracy MV candidate list derivation section 121, the MV candidate list sorting section 122, and the template matching section 111).

<Block Size Decision Section>

The block size decision section 171 decides a block size of the current PU. The decision method of the block size may be freely set. For example, the block size decision section 171 decides on the basis of information indicative of a block size of the current PU whether or not the block size of the current PU is smaller than a predetermined threshold value. Then, in the case where it is decided that the block size of the current PU is smaller than the predetermined threshold value, the block size decision section 171 controls the second MV accuracy MV candidate list derivation section 121, the template matching section 111, and the MV candidate list sorting section 122 to skip (omit) their respective processing.

In short, the block size decision section 171 causes them to skip (omit) their sorting process of the MV candidate list.

If the block size of the current PU is small, then there is the possibility that the number of times of access to an adjacent decoded pixel group or a reference picture upon template matching may increase to increase the memory band necessary for processing. Therefore, in the case where the size of the current PU is smaller than the predetermined block size, the MV candidate list sorting section 102 omits the correction process of the MV candidate list by template matching. By such control as just described, increase of the memory band necessary for processing can be suppressed.

In other words, in the case where the block size of the current PU is equal to or greater than the predetermined threshold value, the block size decision section 171 causes the sorting process of the MV candidate list to be executed. For example, the block size decision section 171 decides the block size of the current PU as indicated by the following expression (29). It is to be noted that, in place of this expression (29), the following equation (30) may be used to decide the block size of the current PU.

[Math. 17]

$$\text{ret}=\min(PU_{width}, PU_{height})<TH1?\text{True}:\text{False} \quad (29)$$

$$\text{ret}=\min(\log 2PU\text{width}, \log 2PU\text{height})<TH1?\text{True}:\text{False} \quad (30)$$

Here, $PU_{width}$ indicates a horizontal width of the PU, and $PU_{height}$ indicates a vertical width of the PU. Meanwhile, log 2X represents a logarithm of X to base 2, and TH1 is a threshold value regarding a predetermined block size.

By performing such control as described above, in the case where the PU size is small, the MV correction process by template matching can be skipped, and therefore, increase of the memory band necessary for processing can be suppressed. In short, increase of the load of template matching and sorting of the MV candidate list can be suppressed.

<Flow of MV Candidate List Derivation Process>

Figure 24:
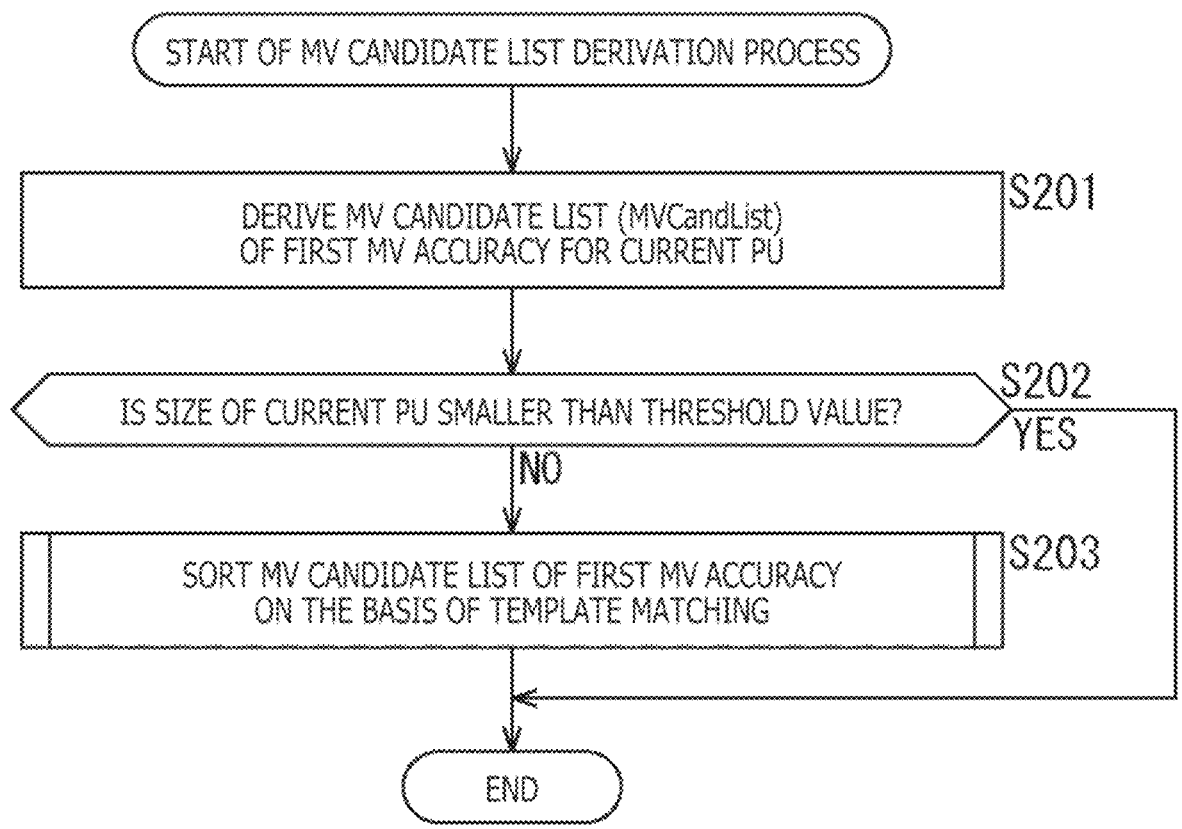
FIG. 24 is a flow chart illustrating an example of a flow of the MV candidate list derivation process.

An example of a flow of an MV candidate list derivation process executed by the MV candidate list derivation apparatus 100 in this case is described with reference to a flow chart of FIG. 24.

After the MV candidate list derivation process is started, the first MV accuracy MV candidate list derivation section 101 derives (generates) an MV candidate list (MVCandList) of the first MV accuracy for the current PU in step S201. It is to be noted that, at this time, the first MV accuracy MV candidate list derivation section 101 derives (generates) information (numMVCand) indicative of the number of MV candidates included in the MV candidate list of the first MV accuracy.

In step S202, the block size decision section 171 decides on the basis of the information indicative of the block size of the current PU whether or not the size of the current PU is smaller than a predetermined threshold value. In the case where it is decided that the size of the current PU is not smaller than the predetermined threshold value (is equal to or greater than the threshold value), the block size decision section 171 controls such that an MV candidate list sorting process is performed. In particular, the processing advances to step S203.

In step S203, the MV candidate list sorting section 102 (the second MV accuracy MV candidate list derivation section 121, the template matching section 111, and the MV candidate list sorting section 122) performs sorting of the MV candidates in the MV candidate list of the first MV accuracy derived in step S201 on the basis of template matching to derive (generate) an MV candidate list after sorting (MVCandList').

When the process in step S203 ends, the MV candidate list derivation process ends.

On the other hand, in the case where it is decided in step S202 that the size of the current PU is smaller than the predetermined threshold value, the block size decision section 171 controls such that the MV candidate list sorting process is skipped (omitted). In particular, the process in step S203 is skipped (omitted) and the MV candidate list derivation process ends.

As above, by executing the processes in the steps, increase of the memory band necessary for processing can be suppressed, and increase of the load of template matching and sorting of the MV candidate list can be suppressed.

<Method #1-6: MV Candidate List Sorting Section>

Figure 25:
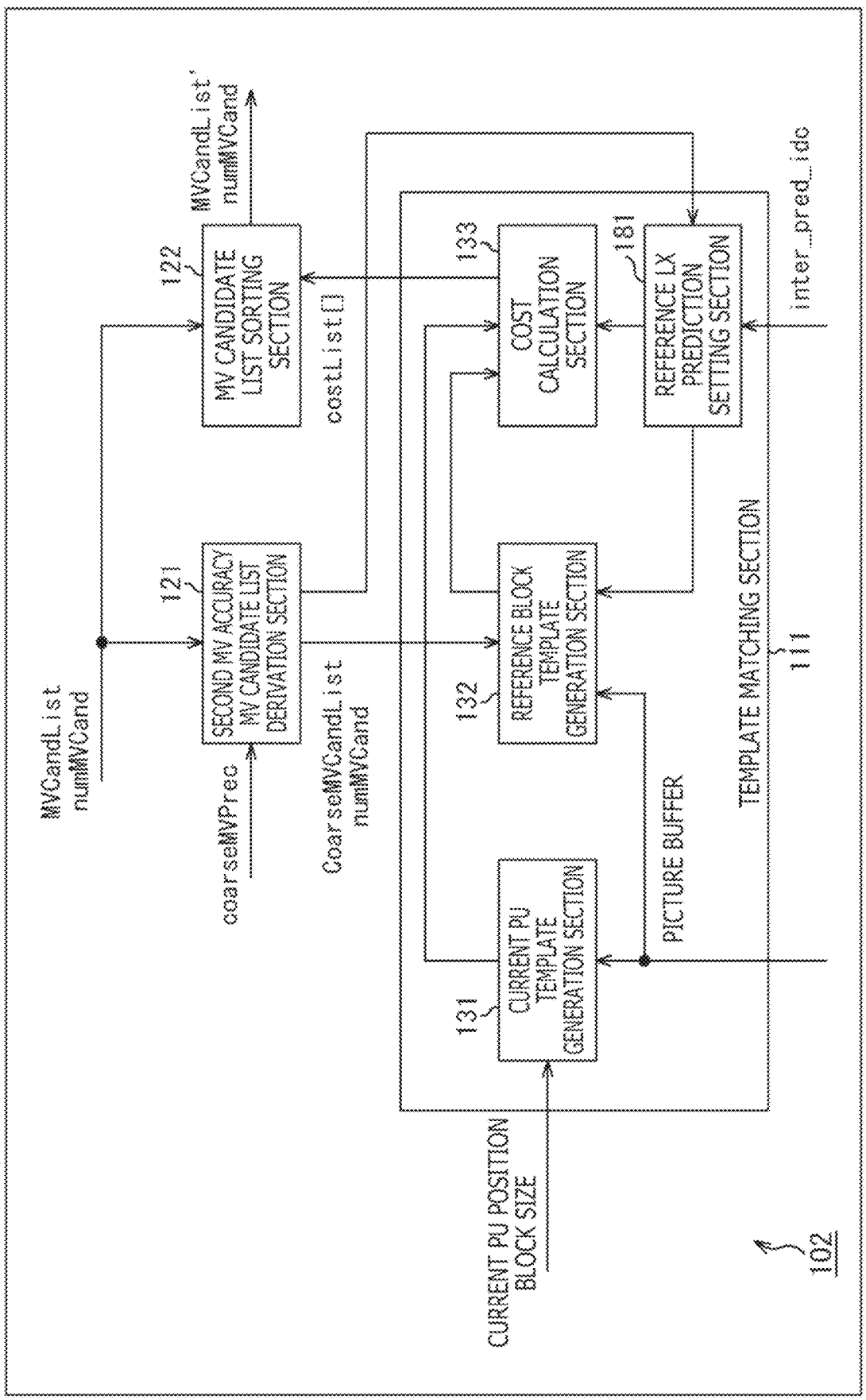
FIG. 25 is a block diagram depicting an example of principal components of the MV candidate list sorting section.

Now, a case in which the method #1-6 of FIG. 3 is applied is described. FIG. 25 is a block diagram depicting an example of a configuration of the MV candidate list sorting section 102 of FIG. 4. The MV candidate list sorting section 102 in this case performs sorting of an MV candidate list using the method #1-1 and the method #1-6. In particular, the MV candidate list sorting section 102 performs template matching with rough accuracy, reduces the number of prediction for MV candidates for which multiple prediction is to be performed, and performs template matching by single prediction.

The MV candidate list sorting section 102 in this case includes a second MV accuracy MV candidate list derivation section 121, an MV candidate list sorting section 122, and a template matching section 111 as depicted in FIG. 25 similarly as in the case of FIG. 6. However, the template matching section 111 includes a reference LX prediction setting section 181 in addition to the components in the case of FIG. 6.

<Reference LX prediction Setting Section>

The reference LX prediction setting section 181 refers to motion vector information of an MV candidate list CoarseMVCandList[i] of the second MV accuracy to set reference LX prediction to be used for template generation.

For example, the reference LX prediction setting section 181 selects LX prediction to be used for template generation on the basis of an inter-prediction identifier (inter_pred_idc) from within motion information of the MV candidate. The selected LX prediction is referred to also as reference LX prediction. A of FIG. 26 depicts an example of rules for selection of LX prediction.

Alternatively, for example, the reference LX prediction setting section 181 may select prediction that indicates a smaller one of time distances between the current picture (curPic) and reference pictures (refPicLX) to be referred to in individual LX prediction as the reference LX prediction. It is to be noted that, in the case where the time distances are equal to each other, the 'L0 prediction' may be set to the reference LX prediction, or the 'L1 prediction' may be set to the reference LX prediction. An example of a pseudo code of such control as just described is depicted in B of FIG. 26.

Here, getPoc(picX) is a function for acquiring a POC (Picture Ordering Count) of a certain picture picX, and abs(X) is a function for returning an absolute value of a variable X. Further, the 'L0 prediction' may be set to the reference LX prediction independently of the time distance.

The reference LX prediction setting section 181 supplies information indicative of the set reference LX prediction to the reference block template generation section 132 and the cost calculation section 133.

<Reference Block Template Generation Section>

The reference block template generation section 132 generates a template corresponding to the reference LX prediction supplied from the reference LX prediction setting section 181.

For example, the reference block template generation section 132 generates an upper template (LXTemplateA) of the reference block and a left template (LXTemplateL) of the reference block, which are determined by motion information corresponding to the reference LX prediction (refLXPred) of the current PU and the MV candidates (CoarseMVCandList[i]).

For example, in the case where the reference LX prediction (refLXPred) is the L0 prediction, the reference block template generation section 132 uses motion information corresponding to the L0 prediction to generate the upper template (L0TemplateA) of the reference block and the left template (L0TemplateL) of the reference block.

On the other hand, in the case where the reference LX prediction (refLXPred) is the L1 prediction, the reference block template generation section 132 uses motion information corresponding to the L1 prediction to generate the upper template (L1 TemplateA) of the reference block and the left template (L1 TemplateL) of the reference block.

The reference block template generation section 132 supplies the generated templates of the reference block to the cost calculation section 133.

<Cost Calculation Section>

The cost calculation section 133 performs template matching of the template of the current PU generated by the current PU template generation section 131 and the template corresponding to the reference LX prediction generated by the reference block template generation section 132 to derive (calculate) the cost (CostList[i]).

The cost of the template of the current PU and the template of the reference picture designated by the reference LX prediction of the MV candidate (MVCandList[i]) is derived, in the case of the LX prediction, by the following expression (31).

[Math. 18]

$$\cos t\_uni(LX) = \cos tA(LX) + \cos tL(LX) \quad (31)$$

Here, costA is a cost obtained from the upper template (curTemplateA) of the current PU and the upper template (LXTemplateA) of the reference block. Meanwhile, costL is a cost obtained from the left template (curTemplateL) of the current PU and the left template (LXTemplateL) of the reference block. Further, cost_uni(LX) is a cost obtained from the template of the current PU and the template of the reference block designated by motion information corresponding to the reference LX prediction part of the MV candidate and is calculated, for example, by SAD, as indicated by the following expression (32).

[Math. 19]

$$\cos t\_uni(LX) = \Sigma |\text{curTemplate}(pos) - \text{LXTemplate}(pos + lx_{mv})| \text{over pos} \quad (32)$$

It is to be noted that pos indicates a pixel position defined by a pair of (x, y) in the template, and $lx_{mv}$ is a motion vector corresponding to the reference LX prediction part of the MV candidate.

By doing the above, in the case where the MV candidate is by bi-prediction, the template to be generated actually can be restricted to one of the L0 prediction or the L1 prediction. Accordingly, increase of the calculation amount of template matching relating to the MV candidate of bi-prediction can be suppressed (the calculation amount can be reduced). In short, increase of the hardware cost, increase of the processing time, increase of the power consumption, and so forth necessary for template matching can be suppressed. Further, by this, increase of the load of sorting of the MV candidate list can be suppressed. In short, increase of the hardware cost, increase of the processing time, increase of the power consumption, and so forth necessary for sorting of the MV candidate list can be suppressed.

<Flow of MV Candidate List Sorting Process>

Figure 27:
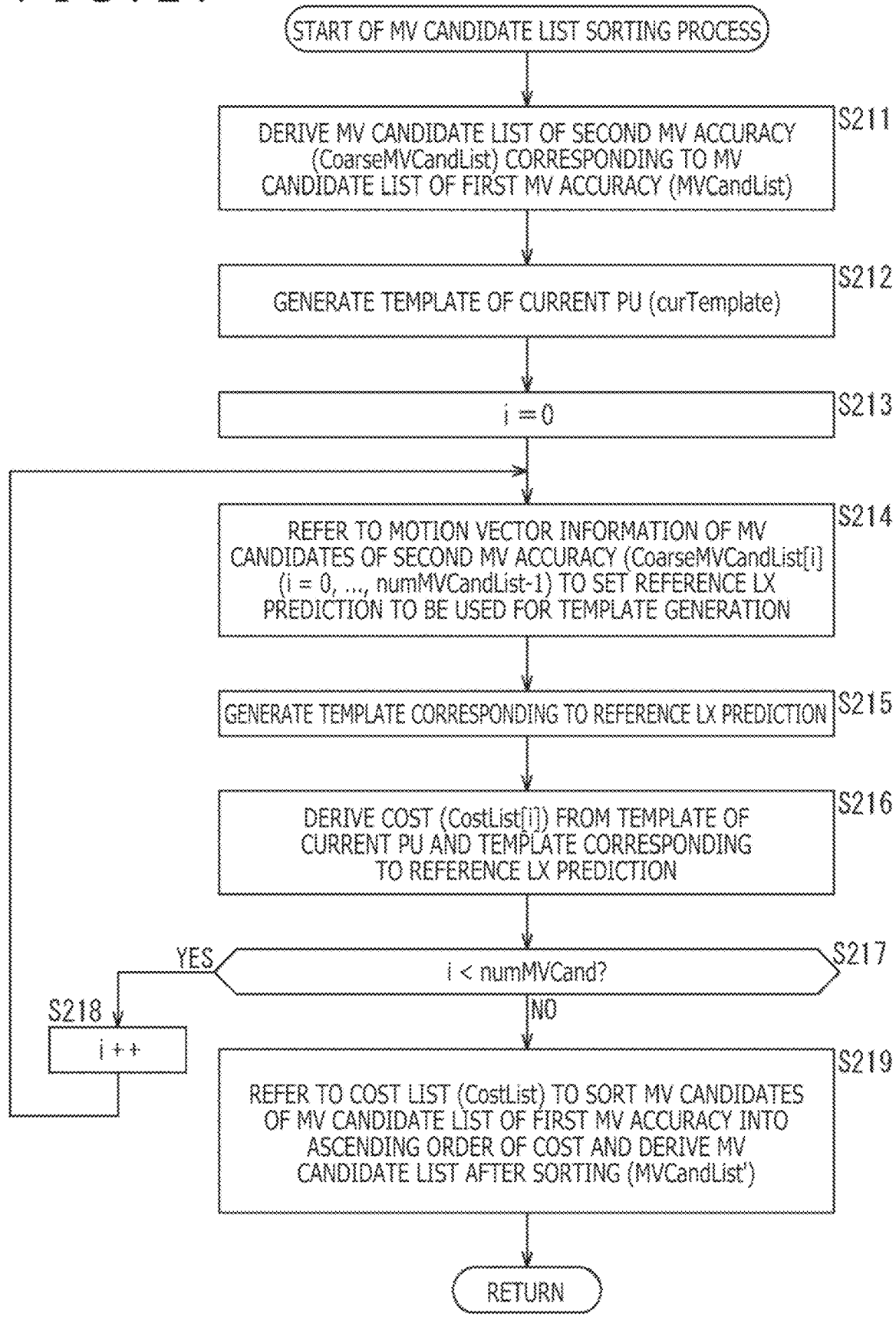
FIG. 27 is a flow chart illustrating an example of a flow of the MV candidate list sorting process.

An example of a flow of the MV candidate list sorting process executed in step S102 of FIG. 5 by the MV candidate list sorting section 102 in this case (method #1-6 (and method #1-1)) is described with reference to a flow chart of FIG. 27.

After the MV candidate list sorting process is started, the second MV accuracy MV candidate list derivation section 121 derives, in step S211, an MV candidate list of the second MV accuracy (CoarseMVCandList) corresponding to an MV candidate list of the first MV accuracy (MVCandList) on the basis of an MV accuracy parameter (coarseMVPrec) indicating the second MV accuracy.

In step S212, the current PU template generation section 131 generates a template (curTemplate) of the current PU.

In step S213, the reference block template generation section 132 sets an initial value (for example, "0") to the variable i.

In step S214, the reference LX prediction setting section 181 refers to the motion vector information of the MV candidate (CoarseMVCandList[i] (i=0, . . . , numMVCandList−1)) of the second MV accuracy to set reference LX prediction to be used for generation of a template.

In step S215, the reference block template generation section 132 generates a template corresponding to the reference LX prediction set in step S214.

In step S216, the cost calculation section 133 derives a cost (CostList[i]) on the basis of the template of the current PU generated in step S212 and the template of the reference block corresponding to the reference LX prediction generated in step S215. In short, the cost calculation section 133 performs template matching using the templates to derive a cost.

In step S217, the reference block template generation section 132 decides whether or not the value of the variable i is smaller than the value (numMVCand) indicative of the number of MV candidates included in the MV candidate list (MVCandList) of the first MV accuracy. In the case where it is decided that the variable i is smaller than the value (numMVCand) (i<numMVCand), the processing advances to step S218.

In step S218, the reference block template generation section 132 increments the variable i ("+1" is added to the value of the variable i). After the process in step S218 ends, the processing returns to step S214 and the processes in the subsequent steps are repeated.

In short, the processes in step S214 to step S218 are executed in regard to each MV candidate (the cost (CostList[i]) corresponding to the MV candidate).

Then, in the case where it is decided in step S217 that the variable i is equal to or greater than the value (numMVCand) (i numMVCand), the processing advances to step S219.

In step S219, the MV candidate list sorting section 122 refers to the cost list (CostList) to sort the MV candidates of the MV candidate list of the first MV accuracy in the ascending order of the cost to derive an MV candidate list after sorting (MVCandList').

When the process in step S219 ends, the MV candidate list sorting process ends, and the processing returns to FIG. 5.

As above, by performing the MV candidate list sorting process, the MV candidate list sorting section 102 can suppress increase of the calculation amount of template matching (reduce the calculation amount) and can suppress increase of the load of the sorting of the MV candidate list.

3. Second Embodiment

<Image Encoding Apparatus>

The present technology described above can be applied to any apparatus, device, and so forth. For example, the present technology (simplification of template matching (method #1)) described hereinabove can be applied to an image encoding apparatus that encodes image data. In short, at least one of the methods #1-1 to #1-6 described hereinabove can be applied to an image encoding apparatus that encodes image data.

Figure 28:
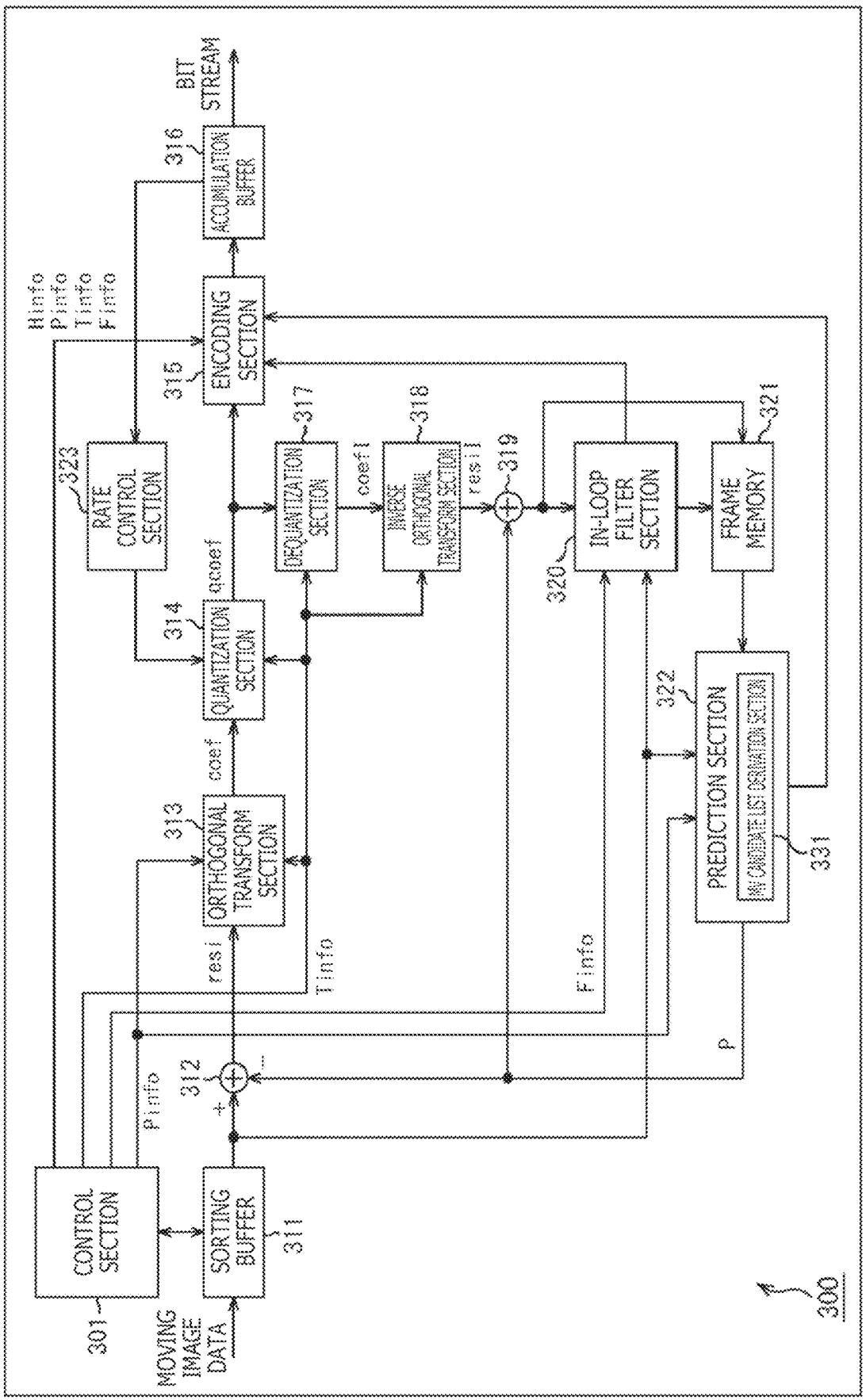
FIG. 28 is a block diagram depicting an example of principal components of an image encoding apparatus.

FIG. 28 is a block diagram depicting an example of a configuration of an image encoding apparatus that is a mode of the image processing apparatus to which the present technology is applied. The image encoding apparatus 300 depicted in FIG. 28 is an apparatus that encodes image data of a moving image. For example, the image encoding apparatus 300 incorporates the technologies described in NPL 1 to NPL 7 and encodes image data of a moving image by a method that complies with the standard described in any of the literature.

It is to be noted that FIG. 28 depicts main ones of processing sections, data flows, and so forth, but do not necessarily indicate all such processing sections or data flows in FIG. 28. In other words, in the image encoding apparatus 300, a processing section that is not indicated as a block in FIG. 28 may exist, or a process or a flow of data not depicted as an arrow mark in FIG. 28 may exist. This similarly applies also to the other figures illustrating processing sections and so forth in the image encoding apparatus 300.

As depicted in FIG. 28, the image encoding apparatus 300 includes a control section 301, a sorting buffer 311, a calculation section 312, an orthogonal transform section 313, a quantization section 314, an encoding section 315, an accumulation buffer 316, a dequantization section 317, an inverse orthogonal transform section 318, another calculation section 319, an in-loop filter section 320, a frame memory 321, a prediction section 322, and a rate control section 323.

<Control Section>

The control section 301 divides moving image data retained by the sorting buffer 311 into blocks of processing units (CU, PU, conversion block, or the like) on the basis of a block size of a processing unit designated from the outside or designated in advance. Further, the control section 301 determines encoding parameters to be supplied to the individual blocks (header information Hinfo, prediction mode information Pinfo, transform information Tinfo, filter information Finfo, and so forth), for example, on the basis of RDO (Rate-Distortion Optimization).

Details of the encoding parameters are hereinafter described above. After the control section 301 determines such encoding parameters, it supplies them to the blocks. Particulars are such as follows.

The header information Hinfo is supplied to the blocks.

The prediction mode information Pinfo is supplied to the encoding section 315 and the prediction section 322.

The transform information Tinfo is supplied to the encoding section 315, the orthogonal transform section 313, the quantization section 314, the dequantization section 317, and the inverse orthogonal transform section 318.

The filter information Finfo is supplied to the in-loop filter section 320.

<Sorting Buffer>

To the image encoding apparatus 300, fields (input images) of moving image data are inputted in a reproduction order (display order). The sorting buffer 311 acquires the input images in the reproduction order (display order) and retains (stores) them. The sorting buffer 311 sorts the input images into an encoding order (decoding order) or divides them into blocks of a processing unit under control of the control section 301. The sorting buffer 311 supplies the input images after the processing to the calculation section 312. Further, the sorting buffer 311 supplies the input images (original images) also to the prediction section 322 and the in-loop filter section 320.

<Calculation Section>

The calculation section 312 receives an image I corresponding to a block of the processing unit and a prediction image P supplied from the prediction section 322 as inputs thereto, subtracts the prediction image P from the image rec as indicated by the following expression (33) to derive a predicted residual resi, and supplies the predicted residual resi to the orthogonal transform section 313.

$$resi = rec - P \qquad (33)$$

<Orthogonal Transform Section>

The orthogonal transform section 313 receives the predicted residual resi supplied from the calculation section 312 and the transform information Tinfo supplied from the control section 301 as inputs thereto and performs orthogonal transform for the predicted residual resi on the basis of the transform information Tinfo to derive coefficient data coef. The orthogonal transform section 313 supplies the thus obtained coefficient data coef to the quantization section 314.

<Quantization Section>

The quantization section 314 receives the coefficient data coef supplied from the orthogonal transform section 313 and the transform information Tinfo supplied from the control section 301 as inputs thereto and scales (quantizes) the coefficient data coef on the basis of the transform information Tinfo. It is to be noted that the rate of the quantization is controlled by the rate control section 323. The quantization section 314 supplies coefficient data after the quantization obtained by such quantization, namely, quantization transform coefficients qcoef, to the encoding section 315 and the dequantization section 317.

<Encoding Section>

The encoding section 315 receives, as inputs thereto, the quantization transform coefficients qcoef supplied from the quantization section 314, various kinds of encoding parameters supplied from the control section 301 (header information Hinfo, prediction mode information Pinfo, transform information Tinfo, filter information Finfo, and so forth), information relating to a filter such as filter coefficients supplied from the in-loop filter section 320, and information relating to an optimum prediction mode supplied from the prediction section 322. The encoding section 315 variable-length-encodes (for example, arithmetically encodes) the quantization transform coefficients qcoef to generate bit strings (encoded data).

Further, the encoding section 315 derives residual information Rinfo from the quantization transform coefficient qcoef and encodes the residual information Rinfo to generate a bit string.

Furthermore, the encoding section 315 places information relating to a filter supplied from the in-loop filter section 320 into the filter information Finfo and places information relating to an optimum prediction mode supplied from the prediction section 322 into prediction mode information Pinfo. Then, the encoding section 315 encodes the various kinds of encoding parameters described above (header information Hinfo, prediction mode information Pinfo, transform information Tinfo, filter information Finfo, and so forth) to generate a bit string.

Further, the encoding section 315 multiplexes the bit strings of the various kinds of information generated in such a manner as described above to generate encoded data. The encoding section 315 supplies the encoded data to the accumulation buffer 316.

<Accumulation Buffer>

The accumulation buffer 316 temporarily retains the encoded data obtained by the encoding section 315. The accumulation buffer 316 outputs the encoded data retained therein, for example, as a bit stream or the like, to the outside of the image encoding apparatus 300 at a predetermined timing. For example, the encoded data is transmitted to the decoding side through any recording medium, any transmission medium, any information processing apparatus, or the like. In other words, the accumulation buffer 316 also serves as a transmission section that transmits the encoded data (bit stream).

<Dequantization Section>

The dequantization section 317 performs processing relating to dequantization. For example, the dequantization section 317 receives the quantization transform coefficients qcoef supplied from the quantization section 314 and the transform information Tinfo supplied from the control section 301 as inputs thereto and scales (dequantizes) the value of the quantization transform coefficients qcoef on the basis of the transform information Tinfo. It is to be noted that this dequantization is a reverse process to the quantization performed by the quantization section 314. The dequantization section 317 supplies coefficient data coefI obtained by such dequantization to the inverse orthogonal transform section 318.

<Inverse Orthogonal Transform Section>

The inverse orthogonal transform section 318 performs processing relating to inverse orthogonal transform. For example, the inverse orthogonal transform section 318 receives the coefficient data coefI supplied from the dequantization section 317 and the transform information Tinfo supplied from the control section 301 as inputs thereto and performs inverse orthogonal transform for the coefficient data coefI on the basis of the transform information Tinfo to derive residual data resiI. It is to be noted that this inverse orthogonal transform is a reverse process to the orthogonal transform performed by the orthogonal transform section 313. The inverse orthogonal transform section 318 supplies the residual data resiI obtained by such inverse orthogonal transform to the calculation section 319. It is to be noted that, since the inverse orthogonal transform section 318 is similar to an inverse orthogonal transform section on the decoding side (hereinafter described), in regard to description of the inverse orthogonal transform section 318, a description (hereinafter described) given for the decoding side can be applied.

<Calculation Section>

The calculation section 319 receives the residual data resiI supplied from the inverse orthogonal transform section 318 and the prediction image P supplied from the prediction section 322 as inputs thereto. The calculation section 319 adds the residual data resiI and the prediction image P corresponding to the residual data resiI to derive a locally decoded image Rlocal. The calculation section 319 supplies the derived locally decoded image Rlocal to the in-loop filter section 320 and the frame memory 321.

<In-Loop Filter Section>

The in-loop filter section 320 performs processing relating to an in-loop filter process. For example, the in-loop filter section 320 receives the locally decoded image Rlocal supplied from the calculation section 319, the filter information Finfo supplied from the control section 301, and the input image (original image) supplied from the sorting buffer 311 as inputs thereto. It is to be noted that any type of information may be inputted to the in-loop filter section 320, and information other than the information mentioned may be inputted to the in-loop filter section 320. For example, a prediction mode, motion information, a code amount target value, a quantization parameter QP, a picture type, information of a block (CU, CTU, or the like) or the like may be inputted to the in-loop filter section 320 as occasion demands.

The in-loop filter section 320 suitably performs a filter process for the locally decoded image Rlocal on the basis of the filter information Finfo. The in-loop filter section 320 uses also the input image (original image) and other input information in the filter process as occasion demands.

For example, the in-loop filter section 320 applies four in-loop filters of a bilateral filter, a deblocking filter (DBF), an adaptive offset filter (SAO (Sample Adaptive Offset)), and an adaptive loop filter (ALF) in this order. It is to be noted that which filter is to be applied or in what order such filters are to be applied can be freely decided and suitably selected.

Naturally, the filter process to be performed by the in-loop filter section 320 may be freely decided and is not limited to the examples described above. For example, the in-loop filter section 320 may apply a Wiener filter or the like.

The in-loop filter section 320 supplies the filter-processed locally decoded image Rlocal to the frame memory 321. It is to be noted that, in the case where information relating to a filter such as a filter coefficient is to be transmitted to the decoding side, the in-loop filter section 320 supplies the information relating to the filter to the encoding section 315.

<Frame Memory>

The frame memory 321 performs processing relating to storage of data relating to an image. For example, the frame memory 321 receives the locally decoded image Rlocal supplied from the calculation section 319 and the filter-processed locally decoded image Rlocal supplied from the in-loop filter section 320 as inputs thereto and retains (stores) them. Further, the frame memory 321 reconstructs a decoded image R for each picture unit using the locally decoded image Rlocal and retains the reconstructed decoded image R (stores the reconstructed decoded image R into a buffer in the frame memory 321). The frame memory 321 supplies the decoded image R (or part of the decoded image R) to the prediction section 322 in response to a request from the prediction section 322.

<Prediction Section>

The prediction section 322 performs processing relating to generation of a prediction image. For example, the prediction section 322 receives the prediction mode information Pinfo supplied from the control section 301, the input image (original image) supplied from the sorting buffer 311, and the decoded image R (or part of the decoded image R) read out from the frame memory 321 as inputs thereto. The prediction section 322 performs a prediction process of inter prediction or intra prediction using the prediction mode information Pinfo and the input image (original image), performs prediction referring to the decoded image R as a reference image, and performs a motion compensation process on the basis of a result of the prediction to generate a prediction image P. The prediction section 322 supplies the generated prediction image P to the calculation section 312 and the calculation section 319. Further, the prediction section 322 supplies information relating to a prediction mode selected by the processes described above, namely, information relating to an optimum prediction mode, to the encoding section 315 as occasion demands.

<Rate Control Section>

The rate control section 323 performs processing relating to rate control. For example, the rate control section 323 controls the rate of a quantization operation of the quantization section 314 on the basis of the code amount of encoded data accumulated in the accumulation buffer 316 such that overflow or underflow may not occur.

<Application of Present Technology>

In the image encoding apparatus 300 having such a configuration as described above, the prediction section 322 performs processing to which the present technology described above is applied. As depicted in FIG. 28, the prediction section 322 includes an MV candidate list derivation section 331.

The prediction section 322 encodes motion information obtained by inter prediction of a current block using motion information of a different block. For example, the prediction section 322 encodes a motion vector of the current block using a prediction motion vector derived from a motion vector of a different block or encodes the motion vector of the current block using a merge index representative of merge of a motion vector of a different block. At this time, the prediction section 322 causes the MV candidate list derivation section 331 to derive an MV candidate list, selects an MV candidate from within the MV candidate list in accordance with a predetermined rule, and uses the selected MV candidate to perform encoding of such a motion vector.

The MV candidate list derivation section 331 is a processing section corresponding to the MV candidate list derivation apparatus 100 described hereinabove in connection with the first embodiment, and has a configuration and performs operation similar to those of the MV candidate list derivation apparatus 100. In short, as described in <1. Template Matching> and <2. First Embodiment>, the MV candidate list derivation section 331 derives an MV candidate list, performs template matching in a simplified fashion by at least one of the method #1-1 to the method #1-6, calculates a cost, and performs sorting of the MV candidate list on the basis of the cost.

The prediction section 322 performs encoding of a motion vector using the MV candidate list after the sorting. In particular, the prediction section 322 performs inter prediction to generate a prediction image and encodes motion vectors to be used in generation of a prediction image using a motion vector candidate list in which elements are sorted.

Since the MV candidate list derivation section 331 performs sorting of the MV candidate list in this manner, the prediction section 322 can perform encoding of motion vectors more preferably in response to a change in characteristics of each sequence or block. Accordingly, reduction of the encoding efficiency can be suppressed (the encoding efficiency can be improved).

Further, since the MV candidate list derivation section 331 applies at least one of the method #1-1 to the method #1-6 to derive an MV candidate list as described above, template matching that is performed in an MV candidate list sorting process can be simplified. Accordingly, the prediction section 322 can suppress increase of the load of encoding of motion vectors (can reduce the load).

<Flow of Image Encoding Process>

Figure 29:
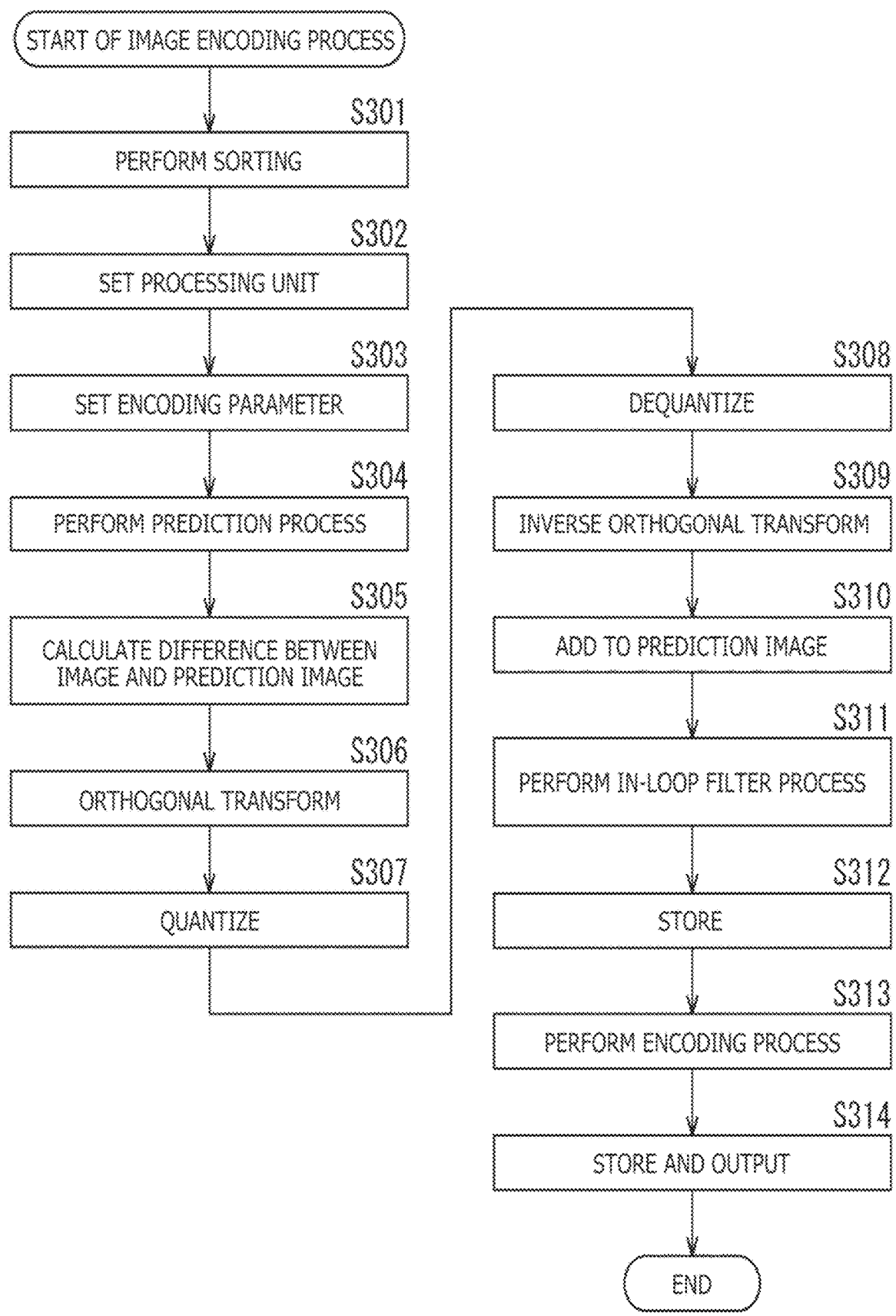
FIG. 29 is a flow chart illustrating an example of a flow of an image encoding process.

In the following, an example of a flow of an image encoding process executed by such an image encoding apparatus 300 as described above is described with reference to a flow chart of FIG. 29.

After the image encoding process is started, in step S301, the sorting buffer 311 sorts frames of moving image data inputted thereto from a display order to an encoding order under control of the control section 301.

In step S302, the control section 301 sets a processing unit to the input image retained by the sorting buffer 311 (performs block division).

In step S303, the control section 301 determines (sets) an encoding parameter for the input mage retained by the sorting buffer 311.

In step S304, the prediction section 322 performs a prediction process to generate a prediction image of the optimum prediction mode and so forth. For example, in this prediction process, the prediction section 322 performs intra prediction to generate a prediction image and so forth of an optimum intra-prediction mode, performs inter prediction to generate a prediction image and so forth of an optimum inter-prediction mode, and selects an optimum prediction mode between them on the basis of a cost function value and so forth.

In step S305, the calculation section 312 calculates a difference between the input image and the prediction image of the optimum mode selected by the prediction process in step S304. In short, the calculation section 312 generates a predicted residual resi between the input image and the prediction image. The predicted residual resi calculated in this manner has a data amount reduced in comparison with the original image data. Accordingly, the data amount can be compressed in comparison with that in an alternative case in which the image is encoded as it is.

In step S306, the orthogonal transform section 313 performs an orthogonal transform process for the predicted residual resi generated by the process in step S305 to derive coefficient data coef.

In step S307, the quantization section 314 quantizes the coefficient data coef obtained by the process in step S306 using the quantization parameter calculated by the control section 301 or the like to derive quantization transform coefficients qcoef.

In step S308, the dequantization section 317 dequantizes the quantization transform coefficients qcoef generated by the process in step S307 with a characteristic corresponding to that of the quantization in step S307 to derive coefficient data coefI. It is to be noted that, since this dequantization process is similar to a dequantization process (hereinafter described) that is performed on the decoding side, description (hereinafter given) provided in regard to the decoding side can be applied to the dequantization process in step S308.

In step S309, the inverse orthogonal transform section 318 inverse-orthogonal-transforms the coefficient data coefI obtained by the process in step S308 by a method corresponding to that of the orthogonal transform process in step S306 to derive residual data resiI. It is to be noted that, since this inverse orthogonal transform process is similar to an inverse orthogonal transform process (hereinafter described) that is performed on the decoding side, description (hereinafter given) provided in regard to the decoding side can be applied to the inverse orthogonal transform process in step S309.

In step S310, the calculation section 319 adds the prediction image obtained by the prediction process in step S304 to the residual data resiI derived by the process in step S309 to generate a decoded image that is decoded locally.

In step S311, the in-loop filter section 320 performs an in-loop filter process for the locally decoded image derived by the process in step S310.

In step S312, the frame memory 321 stores the locally decoded image derived by the process in step S310 and the locally decoded image filter-processed in step S312.

In step S313, the encoding section 315 encodes the quantization transform coefficients qcoef obtained by the process in step S307. For example, the encoding section 315 encodes the quantization transform coefficients qcoef that are information relating to the image by arithmetic encoding or the like to generate encoded data. Further, at this time, the encoding section 315 encodes various kinds of encoding parameters (header information Hinfo, prediction mode information Pinfo, transform information Tinfo, and so forth). Furthermore, the encoding section 315 derives residual information RInfo from the quantization transform coefficients qcoef and encodes the residual information RInfo.

In step S314, the accumulation buffer 316 accumulates the encoded data obtained in this manner and outputs them, for example, as a bit stream, to the outside of the image encoding apparatus 300. This bit stream is transmitted to the decoding side, for example, through a transmission line or a recording medium. Further, the rate control section 323 performs rate control as occasion demands.

When the process in step S314 ends, the image encoding process ends.

The present technology described hereinabove is applied to the process in step S304 of the image encoding process of such a flow as described above. In particular, in derivation of an MV candidate list to be used in encoding of a motion vector in a prediction process, at least one of the method #1-1 to the method #1-6 is applied and template matching is performed in a simplified fashion and then sorting of the MV candidate list is performed as described hereinabove in <1. Template Matching> and <2. First Embodiment>.

By doing this, increase of the load of template matching can be suppressed. In other words, by executing the image encoding process, increase of the load of encoding of a motion vector in a prediction process can be suppressed.

4. Third Embodiment

<Image Decoding Apparatus>

Further, the present technology (simplification of template matching (method #1)) can be applied also to an image decoding apparatus that decodes encoded data of image data. In short, at least one of the methods #1-1 to #1-6 described hereinabove can be applied to an image decoding apparatus that decodes encoded data of image data.

Figure 30:
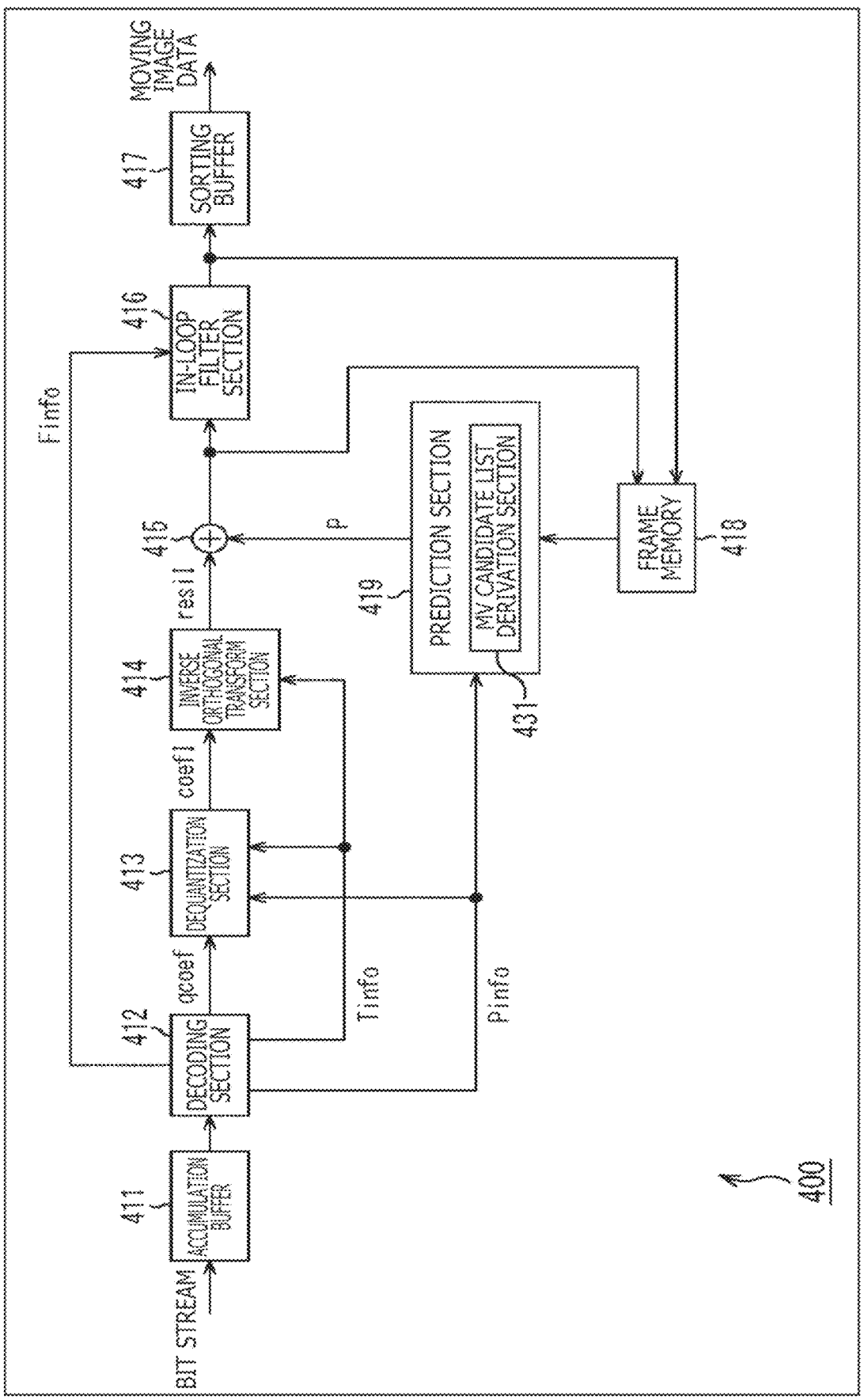
FIG. 30 is a block diagram depicting an example of principal components of an image decoding apparatus.

FIG. 30 is a block diagram depicting an example of a configuration of an image decoding apparatus that is a mode of the image processing apparatus to which the present technology is applied. The image decoding apparatus 400 depicted in FIG. 30 is an apparatus that decodes encoded data in which a predicted residual between an image and a prediction image of the image is encoded as in AVC or HEVC. For example, the image decoding apparatus 400 implements the technologies described in NPL 1 to NPL 7 and decodes encoded data of image data of a moving image by a method that complies with the standard described in any of the literature. For example, the image decoding apparatus 400 decodes encoded data (bit stream) generated by the image encoding apparatus 300 described hereinabove.

It is to be noted that FIG. 30 depicts main ones of processing sections, data flows, and so forth, but do not necessarily indicate all such processing sections or data flows in FIG. 30. In other words, in the image decoding apparatus 400, a processing section that is not indicated as a block in FIG. 30 may exist, or a process or a flow of data not depicted as an arrow mark in FIG. 30 may exist. This similarly applies to the other figures illustrating processing sections and so forth in the image decoding apparatus 400.

Referring to FIG. 30, the image decoding apparatus 400 includes an accumulation buffer 411, a decoding section 412, a dequantization section 413, an inverse orthogonal transform section 414, a calculation section 415, an in-loop filter section 416, a sorting buffer 417, a frame memory 418, and a prediction section 419. It is to be noted that the prediction section 419 includes an intra-prediction section and an inter-prediction section not depicted. The image decoding apparatus 400 is an apparatus for generating moving image data by decoding encoded data (bit stream).

<Accumulation Buffer>

The accumulation buffer 411 acquires a bit stream inputted to the image decoding apparatus 400 and retains (stores) the bit stream. The accumulation buffer 411 supplies the accumulated bit stream to the decoding section 412 at a predetermined timing or in the case where predetermined conditions are satisfied.

<Decoding Section>

The decoding section 412 performs processing relating to decoding of an image. For example, the decoding section 412 receives a bit stream supplied from the accumulation buffer 411 as an input thereto and variable-length-decodes a syntax value of each syntax element from a bit string of the bit stream in accordance with a definition of a syntax table to derive parameters.

The syntax elements and the parameters derived from the syntax values of the syntax elements include, for example, information such as header information Hinfo, prediction mode information Pinfo, transform information Tinfo, residual information Rinfo, and filter information Finfo. In short, the decoding section 412 parses (analyzes and acquires) such information from the bit stream. The information mentioned is described below.

<Header Information Hinfo>

The header information Hinfo includes header information such as, for example, VPS (Video Parameter Set)/SPS (Sequence Parameter Set)/PPS (Picture Parameter set)/SH (Slice Header). The header information Hinfo includes information that prescribes, for example, an image size (horizontal width PicWidth, vertical width PicHeight), a bit depth (luminance bitDepthY, color difference bitDepthC), a color difference array type ChromaArrayType, a maximum value MaxCUSize/minimum value MinCUSize of the CU size, a maximum depth MaxQTDepth/minimum depth MinQTDepth of 4-tree division (also called Quad-tree split), a maximum depth MaxBTDepth/minimum depth MinBTDepth of binary tree division (also called Binary-tree split), a maximum value MaxTSSize of a transform skip block (also called maximum transform skip block size), an on-off flag (also called validity flag) of each encoding tool, and so forth.

For example, as the on-off flag of an encoding tool included in the header information Hinfo, on-off flags relating to transform and quantization processes described below are available. It is to be noted that an on-off flag of an encoding tool can be interpreted also as a flag indicative of whether or not a syntax relating to the encoding tool exists in the encoding data. Further, in the case where the value of the on-off flag is 1 (true), this indicates that the encoding tool is usable, but in the case where the value of the on-off flag is 0 (false), this indicates that the encoding tool is not usable. It is to be noted that the interpretations of the flag values may be reversed.

A cross-component prediction validity flag (ccp_enabled_flag) is flag information indicative of whether or not cross-component prediction (CCP, also called CC prediction) is usable. For example, in the case where this flag information is "1" (true), this indicates that the cross-component prediction is usable, but in the case where the flag information is "0" (false), this indicates that the cross-component prediction is not usable. It is to be noted that the CCP is also called cross-component linear prediction (CCLM or CCLMP).

<Prediction Mode Information Pinfo>

The prediction mode information Pinfo includes, for example, information of size information PBSize (prediction block size) of a processing target PB (prediction block), intra-prediction mode information IPinfo, motion prediction information MVinfo, and so forth.

The intra-prediction mode information IPinfo includes, for example, prev_intra_luma_pred_flag, mpm_idx, and rem_intra_pred_mode in JCTVC-W1005, 7.3.8.5 Coding Unit syntax, a luminance intra-prediction mode IntraPredModeY derived from the syntax, and so forth.

The intra-prediction mode information IPinfo further includes, for example, a cross-component prediction flag (ccp_flag (cclmp_flag)), a multiple class linear prediction mode flag (mclm_flag), a color difference sample position type identifier (chroma_sample_loc_type_idx), a color difference MPM identifier (chroma_mpm_idx), and a luminance intra-prediction mode (IntraPredModeC) derived from the syntax of them, and so forth.

The cross-component prediction flag (ccp_flag (cclmp_flag)) is flag information indicative of whether or not cross-component linear prediction is to be applied. For example, when ccp_flag==1, this indicates that the cross-component prediction is to be applied, but when ccp_flag==0, this indicates that the cross-component prediction is not to be applied.

The multiple class linear prediction mode flag (mclm_flag) is information regarding a mode of linear prediction (linear prediction mode information). More particularly, the multiple class linear prediction mode flag (mclm_flag) is flag information indicative of whether or not a multiple class linear prediction mode is to be established. For example, in the case where the multiple class linear prediction mode flag (mclm_flag) is "0," this indicates one class mode (single class mode) (for example, CCLMP), but in the case where the multiple class linear prediction mode flag (mclm_flag) is "1," this indicates a two-class mode (multiple class mode) (for example, MCLMP).

The color difference sample position type identifier (chroma_sample_loc_type_idx) is an identifier for identifying a type of a pixel position of a color difference component (also called color difference sample position type). For example, in the case where a color difference array type (ChromaArrayType) that is information relating to a color format indicates a 420 type, the color difference sample position type identifier is allocated by such an allocation method as indicated by the following expression (34).

$$\text{chroma\_sample\_loc\_type\_idx==0:Type2}$$

$$\text{chroma\_sample\_loc\_type\_idx==1:Type3}$$

$$\text{chroma\_sample\_loc\_type\_idx==2:Type1}$$

$$\text{chroma\_sample\_loc\_type\_idx==3:Type0} \quad (34)$$

It is to be noted that the color difference sample position type identifier (chroma_sample_loc_type_idx) is (placed into and) transmitted as information (chroma_sample_loc_info( )) relating to a pixel position of the color difference component.

The color difference MPM identifier (chroma_mpm_idx) is an identifier representative of which prediction mode candidate in a color difference intra-prediction mode candidate list (intraPredModeCandListC) is to be designated as the color difference intra-prediction mode.

The motion prediction information MVinfo includes information of, for example, merge_idx, merge flag, inter_pred_idc, ref_idx_LX, mvp_lX_flag, X={0,1}, mvd, and so forth (for example, refer to JCTVC-W1005, 7.3.8.6 Prediction Unit Syntax).

Naturally, any type of information may be included in the prediction mode information Pinfo, and information other than the information described above may be included in the prediction mode information Pinfo.

<Transform Information Tinfo>

The transform information Tinfo includes, for example, the following information. Naturally, any type of information may be included in the transform information Tinfo, and information other than the information mentioned below may be included in the transform information Tinfo.

Horizontal width size TBWSize and vertical width TBHSize of the processing target transform block (or logarithm log 2TBWSize (or log 2TrWidth), log 2TBHSize (or log 2TrHeight) of each TBWSize (or TrWidth), TBHSize (or TrHeight) to base 2 may be used)

Transform skip flag (ts_flag): a flag indicative of whether or not (inverse) primary transform and (inverse) secondary transform are to be skipped.

Scan identifier (scanIdx)

Quantization parameter (qp)

Quantization matrix (scaling_matrix (for example, JCTVC-W1005, 7.3.4 Scaling list data syntax))

<Residual Information Rinfo>

The residual information Rinfo (for example, refer to JCTVC-W1005, 7.3.8.11 Residual Coding syntax) includes, for example, the following syntaxes.

cbf (coded_block_flag): residual data presence/absence flag last_sig_coeff_x_pos: last non-zero coefficient X coordinate last_sig_coeff_y_pos: last non-zero coefficient Y coordinate coded_sub_block_flag: sub block non-zero coefficient presence/absence flag sig_coeff_flag: non-zero coefficient presence/absence flag gr1_flag: flag indicative of whether or not the level of the non-zero coefficient is higher than 1 (also called GR1 flag)

gr2_flag: flag indicative of whether or not the level of the non-zero coefficient is higher than 2 (also called GR2 flag)

sign_flag: sign indicative of the positive/negative of the non-zero coefficient (also called sign mark)

coeff_abs_level_remaining: residual level of the non-zero coefficient (also called non-zero coefficient residual level)

Naturally, any type of information may be included in the residual information Rinfo, and other information than the information mentioned may be included in the residual information Rinfo.

<Filter Information Finfo>

The filter information Finfo includes, for example, control information relating to filter processes indicated below.

Control information relating to a deblocking filter (DBF)

Control information relating to a pixel adaptive offset (SAO)

Control information relating to an adaptive loop filter (ALF)

Control information relating to other linear and non-linear filters

More particularly, the filter information Finfo includes, for example, information that designates a picture to which each filter is to be applied or a region in the picture, filter On/Off control information of a CU unit, filter On/Off information relating to a boundary of a slice or a tile, and so forth. Naturally, any type of information may be included in the filter information Finfo, and information other than the information mentioned may be included in the filter information Finfo.

Returning to the description of the decoding section 412, the decoding section 412 refers to the residual information Rinfo to derive quantization transform coefficients qcoef of coefficient positions in each transform block. The decoding section 412 supplies the quantization transform coefficients qcoef to the dequantization section 413.

Further, the decoding section 412 supplies the parsed header information Hinfo, prediction mode information Pinfo, quantization transform coefficients qcoef, transform information Tinfo, and filter information Finfo to the associated blocks. Particulars are such as follows.

The header information Hinfo is supplied to the dequantization section 413, the inverse orthogonal transform section 414, the prediction section 419, and the in-loop filter section 416.

The prediction mode information Pinfo is supplied to the dequantization section 413 and the prediction section 419.

The transform information Tinfo is supplied to the dequantization section 413 and the inverse orthogonal transform section 414.

The filter information Finfo is supplied to the in-loop filter section 416.

Naturally, the foregoing example is an example and this example is not restrictive. For example, each encoding parameter may be supplied to any processing section. Further, other information may be supplied to any processing section.

<Dequantization Section>

The dequantization section 413 performs processing relating to dequantization. For example, the dequantization section 413 receives transform information Tinfo and a quantization transform coefficient qcoef supplied from the decoding section 412 as inputs thereto and scales (dequantizes) the values of the quantization transform coefficient qcoef on the basis of the transform information Tinfo to derive coefficient data coefI after dequantization.

It is to be noted that this dequantization is performed as an inverse process to the quantization by the quantization section 314. Further, this dequantization is a process similar to that of the dequantization by the dequantization section 317. In short, the dequantization section 317 performs a process (dequantization) similar to that of the dequantization section 413.

The dequantization section 413 supplies the derived coefficient data coefI to the inverse orthogonal transform section 414.

<Inverse Orthogonal Transform Section>

The inverse orthogonal transform section 414 performs processing relating to inverse orthogonal transform. For example, the inverse orthogonal transform section 414 receives coefficient data coefI supplied from the dequantization section 413 and transform information Tinfo supplied from the decoding section 412 as inputs thereto and performs an inverse orthogonal transform process for the coefficient data coefI on the basis of the transform information Tinfo to derive residual data resiI.

It is to be noted that this inverse orthogonal transform is performed as an inverse process to the orthogonal transform by the orthogonal transform section 313. Further, this inverse orthogonal transform is a process similar to that of the inverse orthogonal transform by the inverse orthogonal transform section 318. In short, the inverse orthogonal transform section 318 performs a process (inverse orthogonal transform) similar to that of the inverse orthogonal transform section 414.

The inverse orthogonal transform section 414 supplies derived residual data resiI' to the calculation section 415.

<Calculation Section>

The calculation section 415 performs processing relating to addition of information relating to an image. For example, the calculation section 415 receives residual data resiI supplied from the inverse orthogonal transform section 414 and a prediction image P supplied from the prediction section 419 as inputs thereto. The calculation section 415 adds the residual data resiI and the prediction image P (prediction signal) corresponding to the residual data resiI as indicated, for example, by the following expression (35) to derive a locally decoded image Rlocal.

$$Rlocal = resiI + P \quad (35)$$

The calculation section 415 supplies the derived locally decoded image Rlocal to the in-loop filter section 416 and the frame memory 418.

<In-Loop Filter Section>

The in-loop filter section 416 performs processing relating to an in-loop filter process. For example, the in-loop filter section 416 receives a locally decoded image Rlocal supplied from the calculation section 415 and filter information Finfo supplied from the decoding section 412 as inputs thereto. It is to be noted that any type of information may be inputted to the in-loop filter section 416, and information other than the information mentioned may be inputted to the in-loop filter section 416.

The in-loop filter section 416 suitably performs a filter process for the locally decoded image Rlocal on the basis of the filter information Finfo.

For example, the in-loop filter section 416 applies four in-loop filters of a bilateral filter, a deblocking filter (DBF), an adaptive offset filter (SAO (Sample Adaptive Offset)), and an adaptive loop filter (ALF) in this order. It is to be noted that which filter is to be applied or in what order such filters are to be applied can be freely decided and suitably selected.

The in-loop filter section 416 performs a filter process corresponding to the filter process performed by the encoding side (for example, the in-loop filter section 320 of the image encoding apparatus 300). Naturally, the filter process to be performed by the in-loop filter section 416 may be freely decided and is not limited to the example described above. For example, the in-loop filter section 416 may apply a Wiener filter or the like.

The in-loop filter section 416 supplies the locally decoded image Rlocal filter-processed thereby to the sorting buffer 417 and the frame memory 418.

<Sorting Buffer>

The sorting buffer 417 receives a locally decoded image Rlocal supplied from the in-loop filter section 416 as an input thereto and retains (stores) it. The sorting buffer 417 reconstructs a decoded image R for each picture unit using the locally decoded image Rlocal and retains (stores) it (into the buffer). The sorting buffer 417 sorts the obtained decoded images R from a decoding order into a reproduction order. The sorting buffer 417 outputs the group of the sorted decoded images R as moving image data to the outside of the image decoding apparatus 400.

<Frame Memory>

The frame memory 418 performs processing relating to storage of data relating to an image. For example, the frame memory 418 receives a locally decoded image Rlocal supplied from the calculation section 415 as an input thereto, reconstructs a decoded image R for each picture unit, and stores the reconstructed decoded images R into a buffer in the frame memory 418.

Further, the frame memory 418 receives an in-loop processed locally decoded image Rlocal supplied from the in-loop filter section 416 as an input thereto, reconstructs a decoded image R for each picture unit, and stores the reconstructed decoded images R into the buffer in the frame memory 418. The frame memory 418 suitably supplies the decoded images R (or part of the decoded images R) stored therein as a reference image to the prediction section 419.

It is to be noted that the frame memory 418 may store header information Hinfo, prediction mode information Pinfo, transform information Tinfo, filter information Finfo, and so forth relating to generation of a decoded image.

<Prediction Section>

The prediction section 419 performs processing relating to generation of a prediction image. For example, the prediction section 419 receives prediction mode information Pinfo supplied from the decoding section 412 as an input thereto, and performs prediction by a prediction method designated by the prediction mode information Pinfo to derive a prediction image P. Upon such derivation, the prediction section 419 utilizes decoded images R (or part of the decoded images R) before filtering or after filtering stored in the frame memory 418 and designated by the prediction mode information Pinfo as a reference image. The prediction section 419 supplies the derived prediction image P to the calculation section 415.

<Application of Present Technology>

In the image decoding apparatus 400 having such a configuration as described above, the prediction section 419 performs a process to which the present technology described above is applied. As depicted in FIG. 30, the prediction section 419 includes an MV candidate list derivation section 431.

The prediction section 419 restores a motion vector to be used for generation (motion compensation) of a prediction image. For example, the prediction section 419 adds, to a difference motion vector transmitted thereto from the encoding side, a prediction motion vector derived from a motion vector of another block different from a current block or merges a motion vector of a different block, thereby to restore a motion vector of the current block. At this time, the prediction section 419 causes the MV candidate list derivation section 431 to derive an MV candidate list, selects an MV candidate in accordance with a predetermined rule from within the MV candidate list, and performs restoration of such a motion vector as described above using the selected MV candidate. The prediction section 419 performs motion compensation using the restored motion vector to generate a prediction image.

The MV candidate list derivation section 431 is a processing section corresponding to the MV candidate list derivation apparatus 100 described hereinabove in connection with the first embodiment, and has a similar configuration and performs similar processing to those of the MV candidate list derivation apparatus 100. In short, as described hereinabove in <1. Template Matching> and <2. First Embodiment>, the MV candidate list derivation section 431 derives an MV candidate list, performs template matching in a simplified fashion by at least any one of the method #1-1 to the method #1-6, calculates a cost, and performs sorting of the MV candidate list on the basis of the cost.

The prediction section 419 performs restoration of a motion vector using the MV candidate list after sorting. In particular, the prediction section 419 restores a motion vector to be used for generation of a prediction image using the motion vector candidate list in which the elements are sorted.

Since the MV candidate list derivation section 431 performs sorting of the MV candidate list in this manner, the prediction section 419 can correctly decode a motion vector encoded more preferably in response to a change in characteristics for each sequence or block (can restore a motion vector). Accordingly, reduction of the encoding efficiency can be suppressed (encoding efficiency can be improved).

Further, since the MV candidate list derivation section 431 derives an MV candidate list applying at least any one of the method #1-1 to the method #1-6 as described above, template matching that is performed in the MV candidate list sorting process can be simplified.

Accordingly, the prediction section 419 can suppress increase of the load of restoration of a motion vector (reduce the load).

<Flow of Image Decoding Process>

Figure 31:
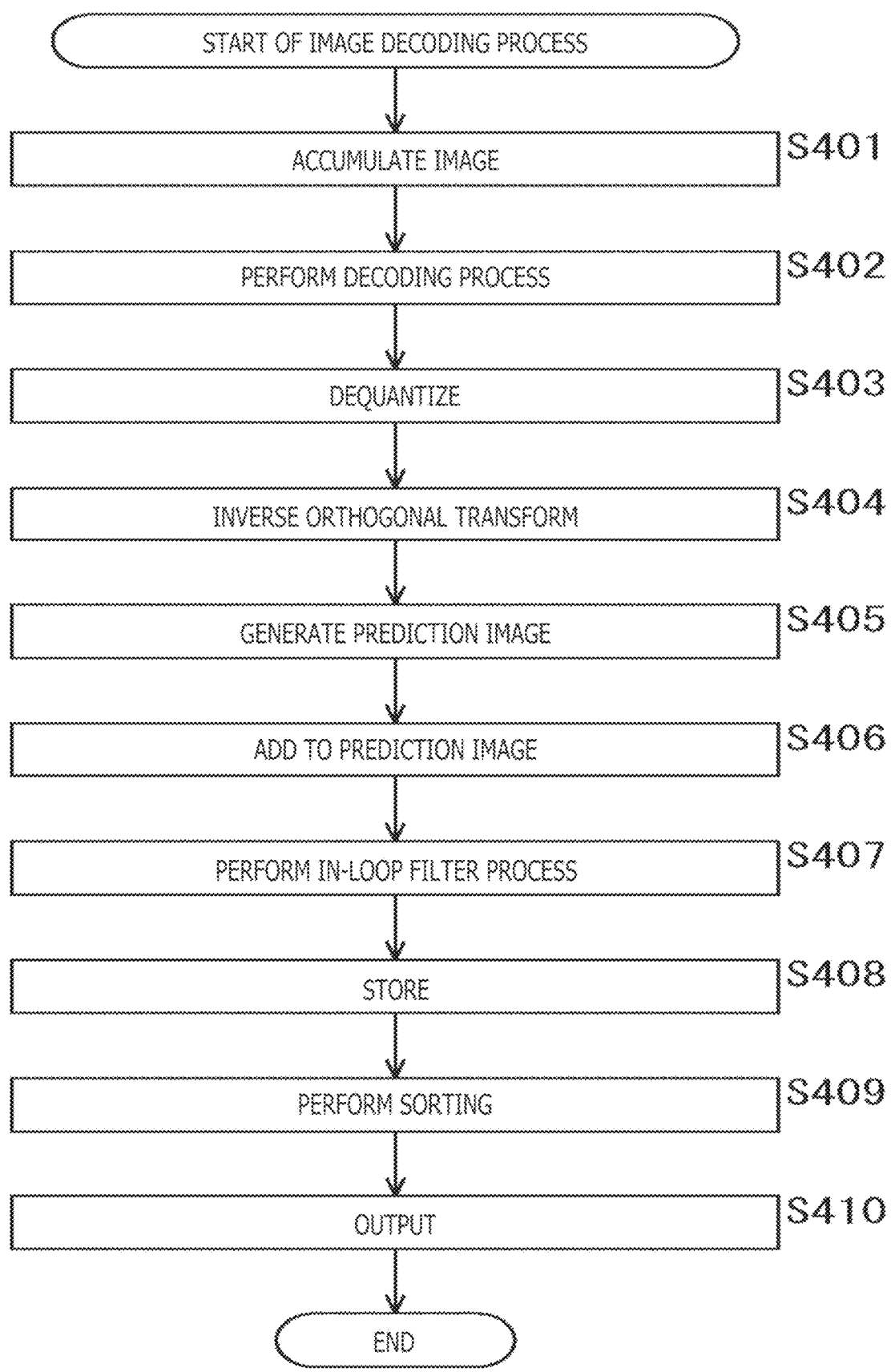
FIG. 31 is a flow chart illustrating an example of a flow of an image decoding process.

Now, an example of a flow of an image decoding process executed by such an image decoding apparatus 400 as described above is described with reference to a flow chart of FIG. 31.

After the image decoding process is started, the accumulation buffer 411 acquires and retains (accumulates) encoded data (bit stream) supplied from the outside of the image decoding apparatus 400 in step S401.

In step S402, the decoding section 412 decodes the encoded data (bit stream) to obtain quantization transform coefficients qcoef. Further, by this decoding, the decoding section 412 parses (analyzes and acquires) various kinds of encoding parameters from the encoded data (bit stream).

In step S403, the dequantization section 413 performs dequantization, which is an inverse process to the quantization performed on the encoding side, for the quantization transform coefficients qcoef obtained by the process in step S402 and obtains coefficient data coefI thereby.

In step S404, the inverse orthogonal transform section 414 performs an inverse orthogonal transform process, which is an inverse process to the orthogonal transform process performed on the encoding side, for the coefficient data coefI obtained by the process in step S403 and obtains residual data resiI.

In step S405, the prediction section 419 executes a prediction process by a prediction method designated from the encoding side on the basis of the information parsed in step S402 and refers to the reference image stored in the frame memory 418 or the like to generate a prediction image P.

In step S406, the calculation section 415 adds the residual data resiI obtained by the process in step S404 and the prediction image P obtained by the process in step S405 to derive a locally decoded image Rlocal.

In step S407, the in-loop filter section 416 performs an in-loop filter process for the locally decoded image Rlocal obtained by the process in step S406.

Further, in step S408, the frame memory 418 stores as least one of the locally decoded image Rlocal obtained by the process in step S406 or the filter-processed locally decoded image Rlocal obtained by the process in step S407.

In step S409, the sorting buffer 417 derives a decoded image R using the filter-processed locally decoded image Rlocal obtained by the process in step S407 and sorts the order of the group of the decoded images R from a decoding order to a reproduction order.

In step S410, the sorting buffer 417 outputs the group of the decoded images R sorted to the reproduction order as a moving image to the outside of the image decoding apparatus 400.

When the process in step S410 ends, the image decoding process ends.

The present technology described hereinabove is applied to the process in step S405 of the image decoding process of such a flow as described above. In particular, in derivation of an MV candidate list to be used for restoration of a motion vector in a prediction process, as described hereinabove in <1. Template Matching> and <2. First Embodiment>, at least any one of the method #1-1 to the method #1-6 is applied to perform template matching in a simplified fashion to perform sorting of an MV candidate list.

By doing this, increase of the load of template matching can be suppressed. In short, by executing this image decoding process, increase of the load of restoration of a motion vector in a prediction process can be suppressed.

5. Fourth Embodiment

<Application to Modification MV Candidate Derivation>

In the foregoing description, examples in which the present technology is applied to template matching in sorting of an MV prediction list are described. However, the present technology can be applied to template matching in any processing. In short, the application of the present technology is not limited to the examples described above, namely, to template matching in sorting of an MV prediction list.

Figure 32:
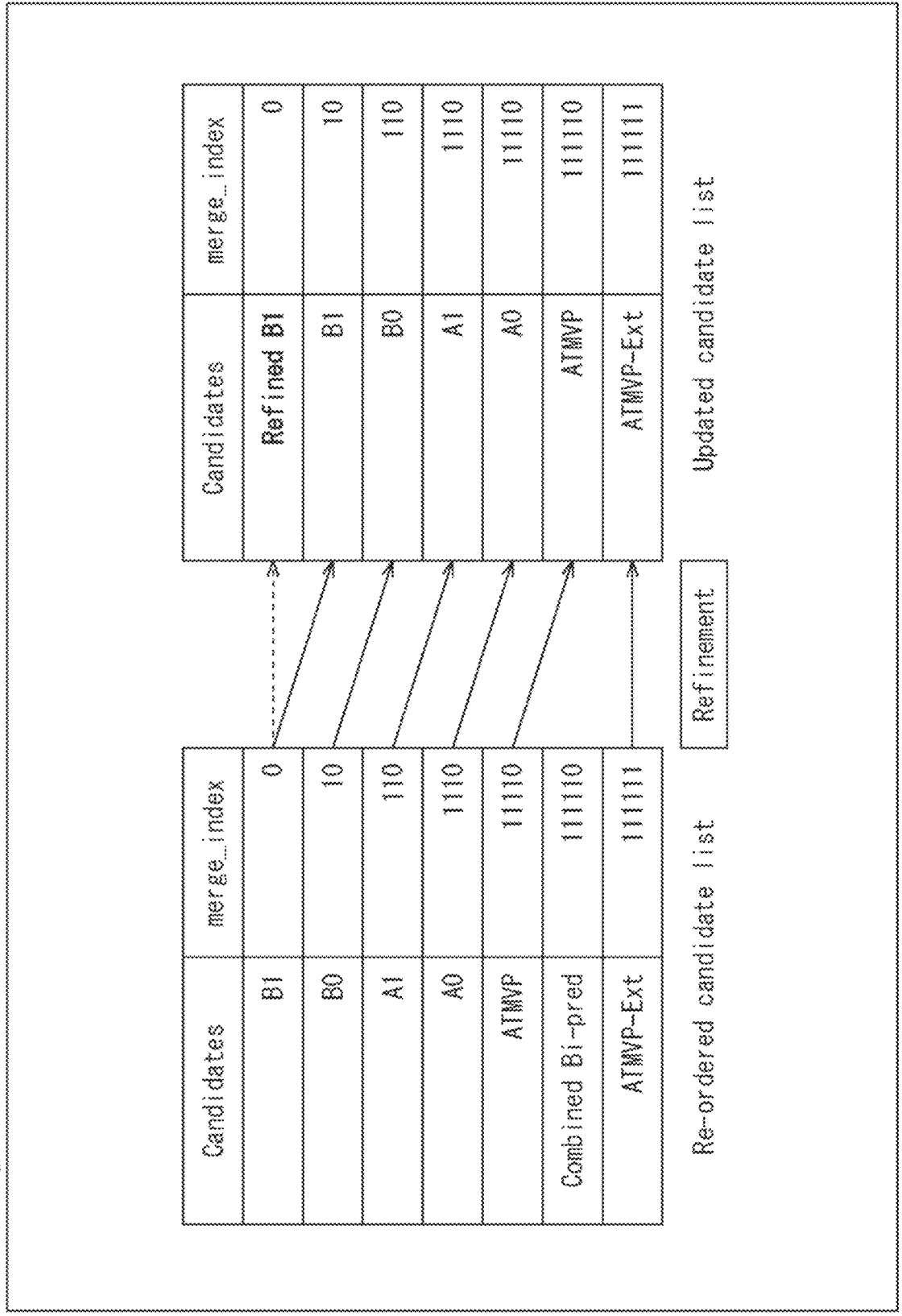
FIG. 32 is a view depicting an example of modification MV candidate derivation.

For example, it is proposed in NPL 1 that, setting a top MV candidate of an MV candidate list (MVCandList') after sorting as an initial position, a modification MV candidate obtained by a decoder side motion search (decoder side ME) is further added as a top MV candidate of the MV candidate list (modification MV derivation process) (FIG. 32). In the case of the example of FIG. 32, on the basis of a top MV candidate (B1) of an MV candidate list after sorting (Reordered candidate list) depicted on the left in the figure, a modification MV candidate (Refine B1) is added (Refinement) to derive an updated MV candidate list (Updated candidate list) depicted on the right in the figure.

It is to be noted that, in the case of motion information in which a top MV candidate and a modification MV of the top MV candidate indicate same motion information, a modification MV candidate obtained by the decoder side ME by setting a second MV candidate from the top in the MV candidate list as an initial value is added as a top MV candidate.

When a modification MV candidate is derived, a search MV list of predetermined MV accuracy in which an MV candidate of a modification target is made an initial position is set, and motion information of a search point at which the cost is in the minimum among search points corresponding to individual pieces of motion information of the search MV list is selected as a modification MV candidate.

This search MV list is set, for example, by setting an MV offset list of motion vectors of predetermined MV accuracy for an MV candidate of a modification target in advance and adding such MV offsets to the initial position.

Figure 33:
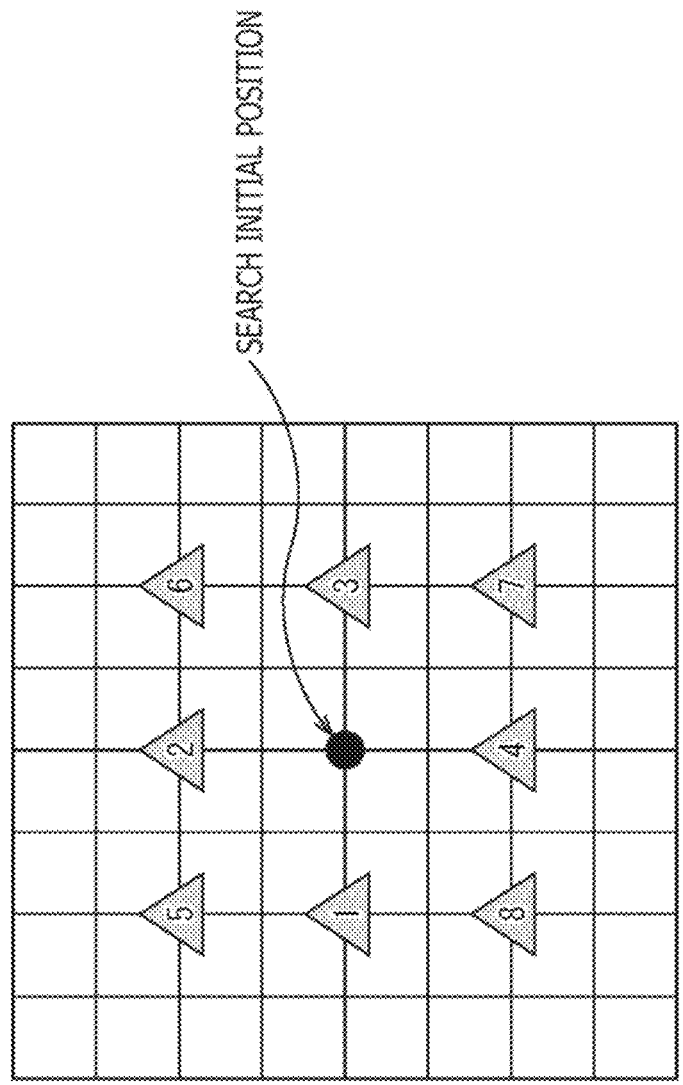
FIG. 33 is a view depicting an example of an MV offset list.

For example, the position of predetermined MV accuracy (for example, $\frac{1}{2}$^{max_mv_prec}-pel accuracy) with reference to such a search initial position as depicted in FIG. 33 is set as an MV offset, and a list (MV offset list (MVOffsetList0)) is defined in the following manner in advance. However, it is assumed that the values of the motion vectors are represented in a form scaled by $2\hat{} \{max\_mv\_prec\}$ times.

MVOffsetIdx: 0, 1, 2, 3, 4, 5, 6, 7, 8
MVOffsetList0
={(0,0), (−1,0), (0,−1), (+1,0), (0,+1), (−1, −1), (+1, −1), (+1,+1), (−1,+1)}

In this case, MVOffsetIdx includes totaling nine MV offsets of 0 to 8. However, the configuration of the MV offset may be freely decided and is not limited to the example described above. For example, MVOffsetIdx may include MV offsets of 0 to 4, or the MVOffsetidx may include MV offsets of 0 and 5 to 8.

The MV offset list MVOffsetList(target_mv_prec) of the $\frac{1}{2}$ {target_mv_prec}-pel accuracy are derived as indicated by the following expression (36) on the basis of the MV offset list MVOffsetList0 of the $\frac{1}{2}$ {max_mv_prec}-pel accuracy and a parameter target_mv_prec indicative of desired accuracy of a motion vector.

[Math. 20]

$$MVOffsetList(target\_mv\_prec)=MVOffsetList0<< (max\_mv\_prec-target\_mv\_prec) \quad (36)$$

For example, if max_mv_prec=4 ($\frac{1}{16}$-pel accuracy) and target_mv_prec=2 ($\frac{1}{2}$-pel accuracy), then MVOffsetList (target_mv_prec) is derived as indicated by the following expression (37).

[Math. 21]

$$\begin{aligned}MVOffsetList(2) &= MVOffsetList0 \ll (max\_mv\_prec?target\_mv\_prec) \quad (37)\\ &= MVOffsetList0 \ll (4-1)\\ &= MVOffsetList0 \ll 3\\ &= \begin{Bmatrix}(0,0), (-8,0), (0,-8), (+8,0), (0,+8),\\ (-8,-8), (+8,-8), (+8,+8), (-8,+8)\end{Bmatrix}\end{aligned}$$

In particular, an MV offset list having MV offsets having values equal to (1<<(max_mv_prec-target_mv_prec)) times the values of MVOffsetList0 is obtained.

However, upon such derivation of a modification MV candidate, in the case where a modification MV candidate is acquired by the decoder side ME using a certain MV candidate in the MV candidate list as an initial position, if search for a sub-pel position is included, then since it is necessary to generate a template for each sub-pel position by the MC to perform template matching, there is the possibility that the calculation amount may increase.

<Simplification of Template Matching>

Therefore, also in derivation of modification MV candidates, template matching is simplified similarly to the methods #1 of the table of FIG. 3. By doing this, increase of the load of template matching can be suppressed (load can be reduced). For example, by simplifying template matching to be performed in the modification MV candidate derivation process, increase of the load of the modification MV candidate derivation process can be suppressed (load can be reduced). By suppressing increase of the load, for example, increase of the hardware cost, increase of the processing time, increase of the power consumption, and so forth can be suppressed.

<Application of Method #1-1>

As a method of simplification of template matching, for example, template matching may be performed with rough accuracy as in the method #1-1 of the table of FIG. 3.

For example, for motion vector candidates of accuracy rougher than that of a motion vector candidate list, template matching between a template of a current block and a template of a search point may be performed and a cost may be derived. Then, on the basis of the derived costs of the motion vector candidates, modification motion vector candidates may be derived, and the motion vector candidate list may be updated using the derived modification motion vector candidates.

For example, an image processing apparatus may include a template matching section that performs, for motion vector candidates of accuracy rougher than that of a motion vector candidate list, template matching between a template of a current block and a template of a search point and derives a cost, and an update section that derives modification motion vector candidates on the basis of the costs of the motion vector candidates derived by the template matching section and updates the motion vector candidate list using the derived modification motion vector candidates.

This makes it possible to simplify calculation to be performed in template matching and suppress increase of the load.

Especially, in the case where MV candidates indicate sub-pel positions, it is necessary to generate a template of the sub-pel position by motion compensation, and there is the possibility that the calculation amount increases. In the case where an MV candidate list has decimal pixel accuracy in this manner, by performing template matching, for example, in integer pixel accuracy, increase of the calculation amount for template generation (motion compensation) can be suppressed. In short, increase of the load of template matching can be suppressed.

At this time, a motion vector candidate list of integer pixel accuracy corresponding to the motion vector candidate list of the decimal pixel accuracy may be derived. For example, the image processing apparatus may further include a derivation section that derives a motion vector candidate list of integer pixel accuracy corresponding to the motion vector candidate list of the decimal pixel accuracy such that the template matching section performs, for each motion vector candidate of the motion vector candidate list of the integer pixel accuracy derived by the derivation section, template matching between the template of the current block and the template of the search point and derives the cost and the update section derives modification motion vector candidates on the basis of the costs of the motion vector candidates derived by the template matching section and updates the motion vector candidate list of the decimal pixel accuracy using the derived modification motion vector candidates.

This makes it possible to easily perform template matching in integer accuracy.

For example, the derivation section may convert each MV candidate of decimal pixel accuracy into that of integer pixel accuracy to generate an MV candidate list of the integer pixel accuracy corresponding to the MV candidate list of the decimal pixel accuracy and perform template matching using the MV candidate list of the integer pixel accuracy. This make is possible to derive a motion vector candidate list of the integer pixel accuracy corresponding to the motion vector candidate list of the decimal pixel accuracy.

<Application of Method #1-2>

As an alternative, template matching of an overlapping MV candidate (overlapping MV) may be skipped (omitted) similarly as in the method #1-2 of the table of FIG. 3. For example, in the image processing apparatus, the template matching section may skip template matching for a motion vector candidate same as a motion vector candidate for which template matching has already been performed. By doing this, increase of the number of times of template matching can be suppressed (the number of times can be reduced). In short, increase of the load of template matching can be suppressed.

<Application of Method #1-3>

Further, some of pixels of a template may be thinned out, for example, similarly as in the method #1-3 of the table of FIG. 3. For example, some of pixels of a template may be thinned out at a thinning rate (ratio) according the size of the current PU. For example, in the image processing apparatus, the template matching section may perform template matching between a template of a current block at a sampling interval according to the size of the current block and a template of a search point at a sampling interval according to the size of the current block to derive a cost.

In other words, from a decoded pixel group adjacent the current PU (pixel group in a predetermined region adjacent the current PU), pixels may be sampled at intervals according to the size of the current PU (in short, pixels may be extracted at a ratio (extraction rate) according to the size of the current PU from the adjacent decoded pixel group) such that a template configured from the sampled pixels is generated.

By generating a template in this manner, the number of pixels of the template decreases, and therefore, increase of the calculation amount of template matching can be suppressed (the calculation amount can be reduced).

In short, increase of the load of template matching can be suppressed.

<Application of Method #1-4>

Incidentally, in the case where a current PU is adjacent a CTU boundary, it is necessary to secure a line buffer of a CTU level by a size of a template to be referred to in template matching, and there is the possibility that the memory size may increase.

Therefore, in the case where a current PU is adjacent a CTU boundary, the number of lines of the template may be reduced, for example, similarly as in the method #1-4 of the table of FIG. 3. In other words, a template may be generated with a size according to the position of the current PU (namely, the template size may be set according to the position of the current PU).

For example, in the image processing apparatus, the template matching section may perform template matching between a template of a current block of a size according to the position of the current block and a template of a search point of the size according to the position of the current block and derive a cost.

By generating a template in this manner, increase of decoded pixels to be used for template generation can be suppressed (decoded pixels to be used for template generation can be reduced). In particular, increase of the size of the line buffer for storing (retaining) the decoded pixels can be suppressed (the line buffer size can be reduced). In short, increase of the load of template matching can be suppressed.

<Application of Method #1-5>

On the other hand, in the case where the size of the current PU is small, upon template matching, there is the possibility that the number of times of access to an adjacent decoded pixel group or a reference picture may increase, resulting in increase of the memory band to be used (in short, the load may increase).

Therefore, for example, in the case where the size of the current PU is small (for example, in the case where the size of the current PU is smaller than a predetermined threshold value) similarly as in the method #1-5 of the table of FIG. 3, the modification MV candidate derivation process (namely, the update process of the MV candidate list) described hereinabove may be skipped (omitted).

For example, in the image processing apparatus, in the case where the current block is smaller than a predetermined threshold value, the template matching section and the update section may skip the process.

By performing the control in this manner, template matching for a current PU whose load is large and whose size is small (modification MV candidate derivation process) can be skipped. In short, increase of the load of template matching can be suppressed.

<Application of Method #1-6>

Further, in the case of multiple prediction, since it is necessary to generate a template of a search point for each prediction, there is the possibility that the load may increase. Therefore, for MV candidates for which multiple prediction is to be performed, the number of prediction may be reduced to perform template matching by single prediction similarly as in the method #1-6 of the table of FIG. 3. For example, in the image processing apparatus, the template matching section may set single prediction for motion vector candidates for multiple prediction, perform template matching between a template of a current block as a motion vector candidate of the single prediction and a template of a search point, and then derive a cost.

By doing this, increase of the number of templates generated can be suppressed (the number of templates generated can be reduced), and therefore, increase of the calculation amount in template matching can be suppressed (calculation amount can be reduced).

<Combination of Methods>

It is to be noted that the method #1-1 to the method #1-6 described above can be applied singly and also a plurality of ones of them can be applied in combination. For example, the method #1-1 may be used in combination with any one of the methods #1-2 to #1-6. Further, for example, a plurality of ones of the methods #1-2 to #1-6 may be combined. Naturally, the number of methods to be combined may be freely decided, and three or more methods may be combined.

<MV Candidate List Derivation Apparatus>

Figure 34:
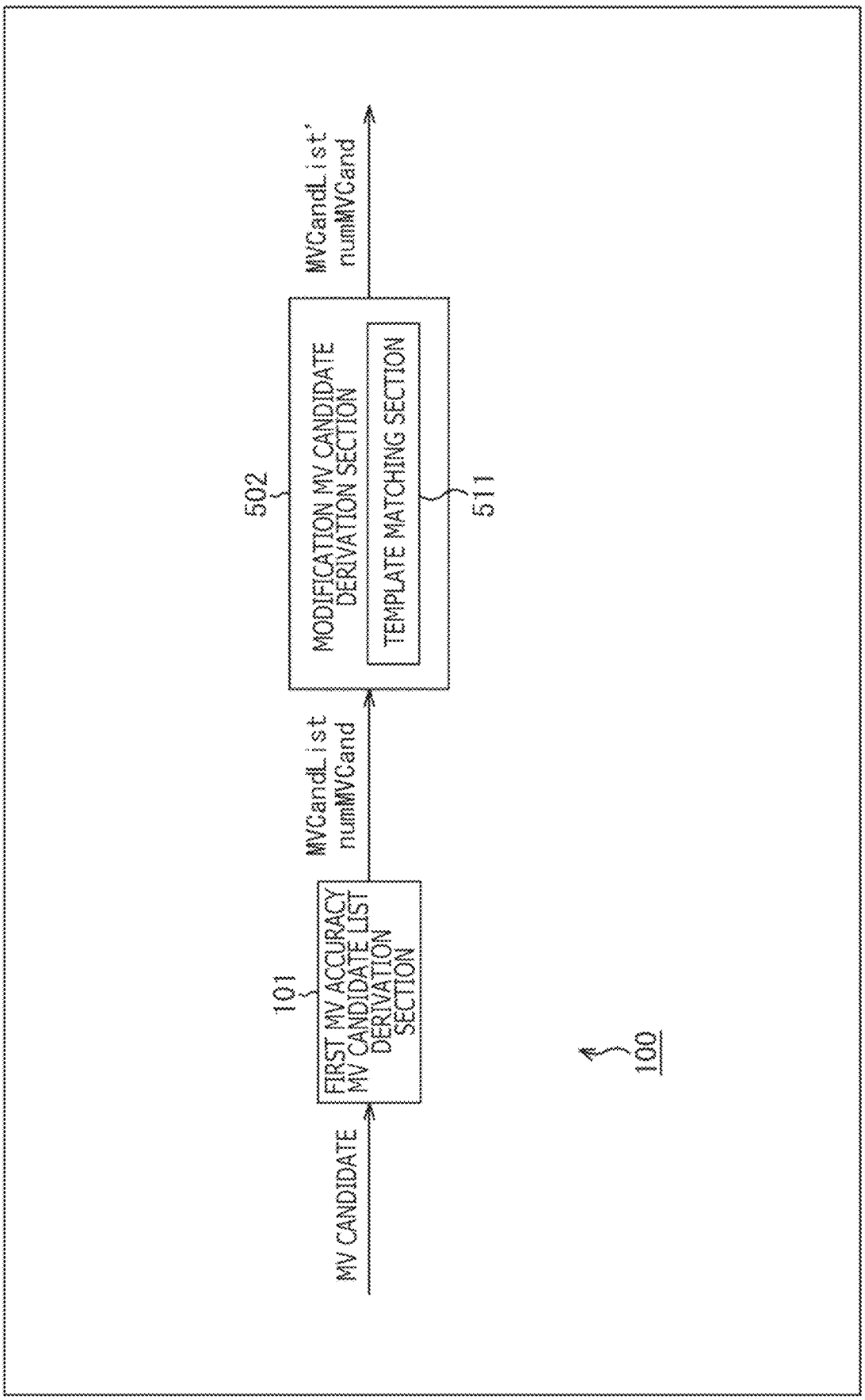
FIG. 34 is a block diagram depicting an example of principal components of the MV candidate list derivation apparatus.

FIG. 34 is a block diagram depicting an example of a configuration of an MV candidate list derivation apparatus that is a mode of an image processing apparatus to which the present technology is applied. As depicted in FIG. 34, the MV candidate list derivation apparatus 100 in this case includes a first MV accuracy MV candidate list derivation section 101 similarly as in the case of FIG. 4. However, the MV candidate list derivation apparatus 100 includes a modification MV candidate derivation section 502 in place of the MV candidate list sorting section 102 in the case of FIG. 4. The MV candidate list derivation apparatus 100 performs derivation of an MV candidate list, derivation of a modification MV candidate, and update of the MV candidate list using the modification MV candidate.

The first MV accuracy MV candidate list derivation section 101 derives (generates) an MV candidate list (MVCandList) of the first MV accuracy and information (numMVCand) indicative of the number of MV candidates included in the MV candidate list of the first MV accuracy as described hereinabove in connection with the first embodiment. The first MV accuracy MV candidate list derivation section 101 supplies the generated MV candidate list of the first MV accuracy and information indicative of the number of MV candidates included in the MV candidate list of the first MV accuracy to the modification MV candidate derivation section 502.

The modification MV candidate derivation section 502 derives modification MV candidates using the MV candidate list of the first MV accuracy supplied from the first MV accuracy MV candidate list derivation section 101 and updates the MV candidate list of the first MV accuracy using the modification MV candidates. The modification MV candidate derivation section 502 includes a template matching section 511 and performs derivation of the modification MV candidates utilizing template matching by the template matching section 511. The modification MV candidate derivation section 502 outputs the MV candidate list (MVCandList') after update as a derived MV candidate list. Further, at this time, the modification MV candidate derivation section 502 outputs also the information (numMVCand) indicative of the number of MV candidates included in the MV candidate list of the first MV accuracy (MV candidate list after update).

The template matching section 511 performs template matching (for modification MV candidate derivation) in a simplified fashion.

Accordingly, the template matching section 511 can suppress increase of the load of template matching and the modification MV candidate derivation section 502 can suppress increase of the load of modification MV candidate derivation as described hereinabove in <Simplification of Template Matching>. Accordingly, the MV candidate list derivation apparatus 100 can suppress increase of the load of MV candidate list derivation.

<Flow of MV Candidate List Derivation Process>

Figure 35:
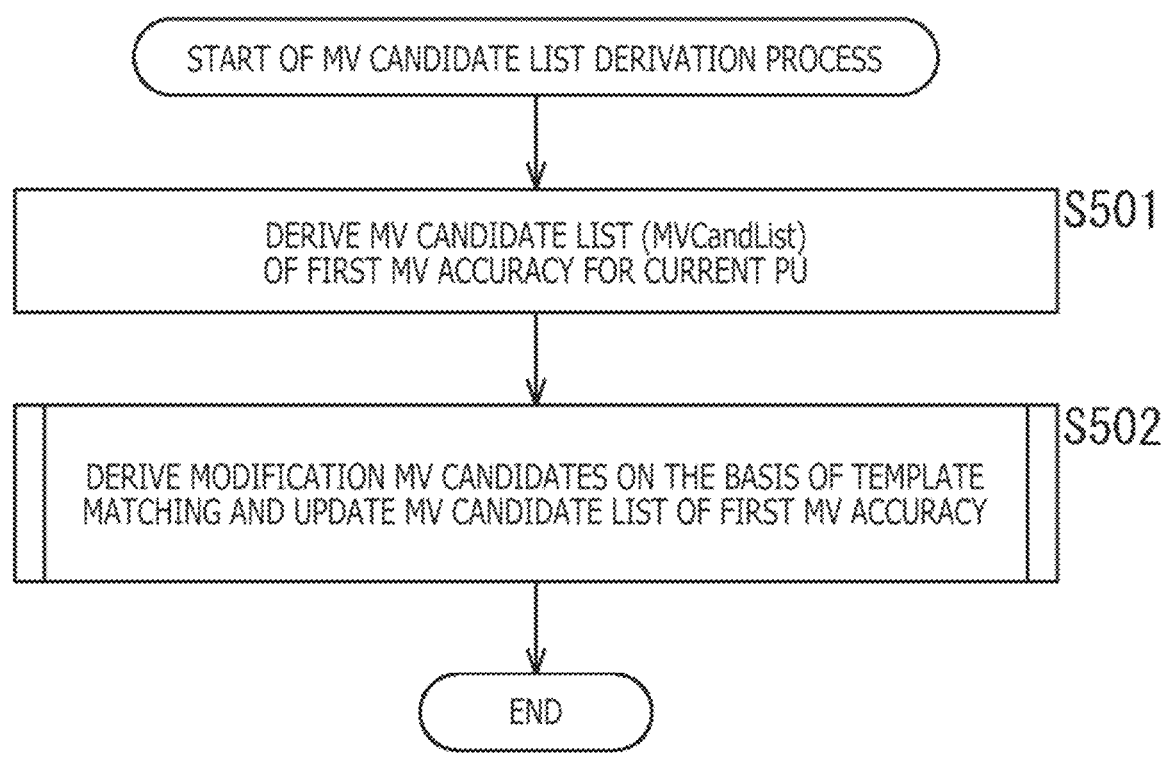
FIG. 35 is a flow chart illustrating an example of a flow of the MV candidate list derivation process.

An example of a flow of the MV candidate list derivation process executed by the MV candidate list derivation apparatus 100 is described with reference to a flow chart of FIG. 35.

After the MV candidate list derivation process in this case is started, the first MV accuracy MV candidate list derivation section 101 derives (generates) an MV candidate list (MVCandList) of the first MV accuracy for a current PU in step S501. It is to be noted that, at this time, the first MV accuracy MV candidate list derivation section 101 derives (generates) information (numMVCand) indicative of the number of MV candidates included in the MV candidate list of the first MV accuracy.

In step S502, the modification MV candidate derivation section 502 derives modification MV candidates on the basis of template matching and updates the MV candidate list of the first MV accuracy derived in step S501 to derive (generate) an MV candidate list after update (MVCandList').

When the process in step S502 ends, the MV candidate list derivation process ends.

By executing the processes in the steps in such a manner as described above, increase of the load of template matching can be suppressed as described hereinabove in <Simplification of Template Matching>. In short, increase of the load of modification MV candidate derivation can be suppressed. In other words, increase of the load of MV candidate list derivation can be suppressed.

<Method #1-1: Application to Modification MV Candidate Derivation Section>

Figure 36:
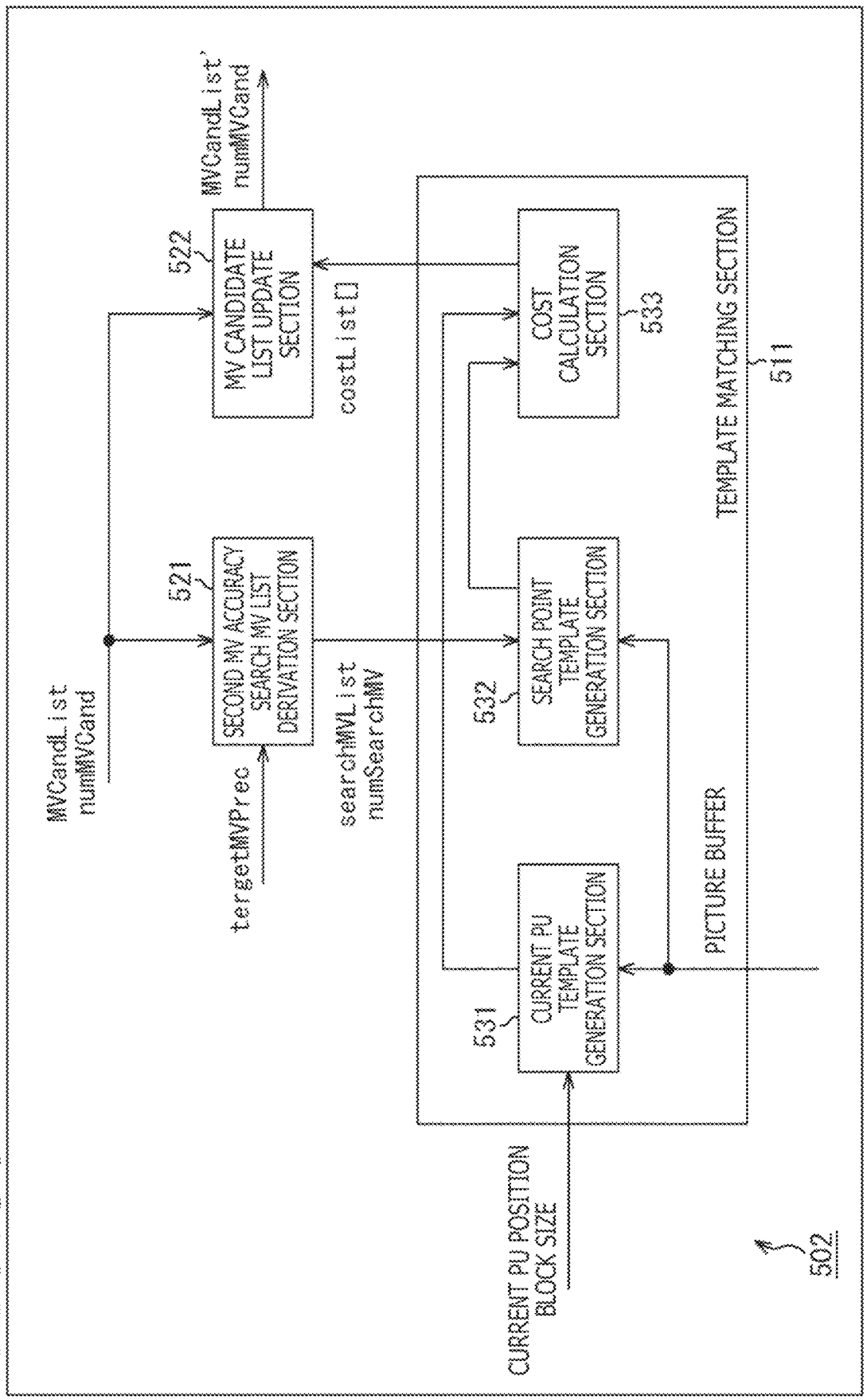
FIG. 36 is a block diagram depicting an example of principal components of a modification MV candidate derivation section.

Now, a case in which the modification MV candidate derivation section 502 performs derivation of modification MV candidates by the method #1-1 of FIG. 3. FIG. 36 is a block diagram depicting an example of a configuration of the modification MV candidate derivation section 502 of FIG. 34. As depicted in FIG. 36, the modification MV candidate derivation section 502 in this case includes a second MV accuracy search MV list derivation section 521, an MV candidate list update section 522, and a template matching section 511.

<Second MV Accuracy Search MV List Derivation Section>

The second MV accuracy search MV list derivation section 521 acquires an MV candidate list (MVCandList) of the first MV accuracy supplied from the first MV accuracy MV candidate list derivation section 101 and information (numMVCand) indicative of the number of MV candidates included in the MV candidate list of the first MV accuracy. The second MV accuracy search MV list derivation section 521 derives (generates) a search MV list of the second MV accuracy (searchMVList) corresponding to the acquired MV candidate list (MVCandList) of the first MV accuracy.

The first MV accuracy and the second MV accuracy are such as described hereinabove in connection with the first embodiment.

An MV accuracy parameter (targetMVPrec) indicative of the second MV accuracy is inputted to the second MV accuracy search MV list derivation section 521. The second MV accuracy search MV list derivation section 521 derives (generates), on the basis of the inputted MV accuracy parameter (targetMVPrec), a search MV list (searchMVList) of the second MV accuracy indicated by the MV accuracy parameter (targetMVPrec) corresponding to the MV candidate list of the first MV accuracy supplied from the first MV accuracy MV candidate list derivation section 101. It is to be noted that the second MV accuracy may be a fixed value or may be set by a user or the like.

Further, the second MV accuracy search MV list derivation section 521 supplies the derived search MV list (searchMVList) of the second MV accuracy to (a search point template generation section 532 of) the template matching section 111 together with the information (numSearchMV) indicative of the number of search MVs included in the search MV list.

<Derivation of Search MV List of Second MV Accuracy>

For example, the second MV accuracy search MV list derivation section 521 defines in advance an offset list MVOffsetList (target_mv_prec) of motion vectors of predetermined MV accuracy (=½^target_mv_prec-pel accuracy) for an MV candidate of a modification target and adds values of the offsets to an initial position (to-be-refined-mv) to derive (generate) a search MV list (searchMVList) as indicated by the following expression (38).

[Math. 22]

$$\text{searchMVList} = \text{to-be-refined-mv} + \text{MVOffsetList(target\_mv\_prec)} \quad (38)$$

Figure 37:
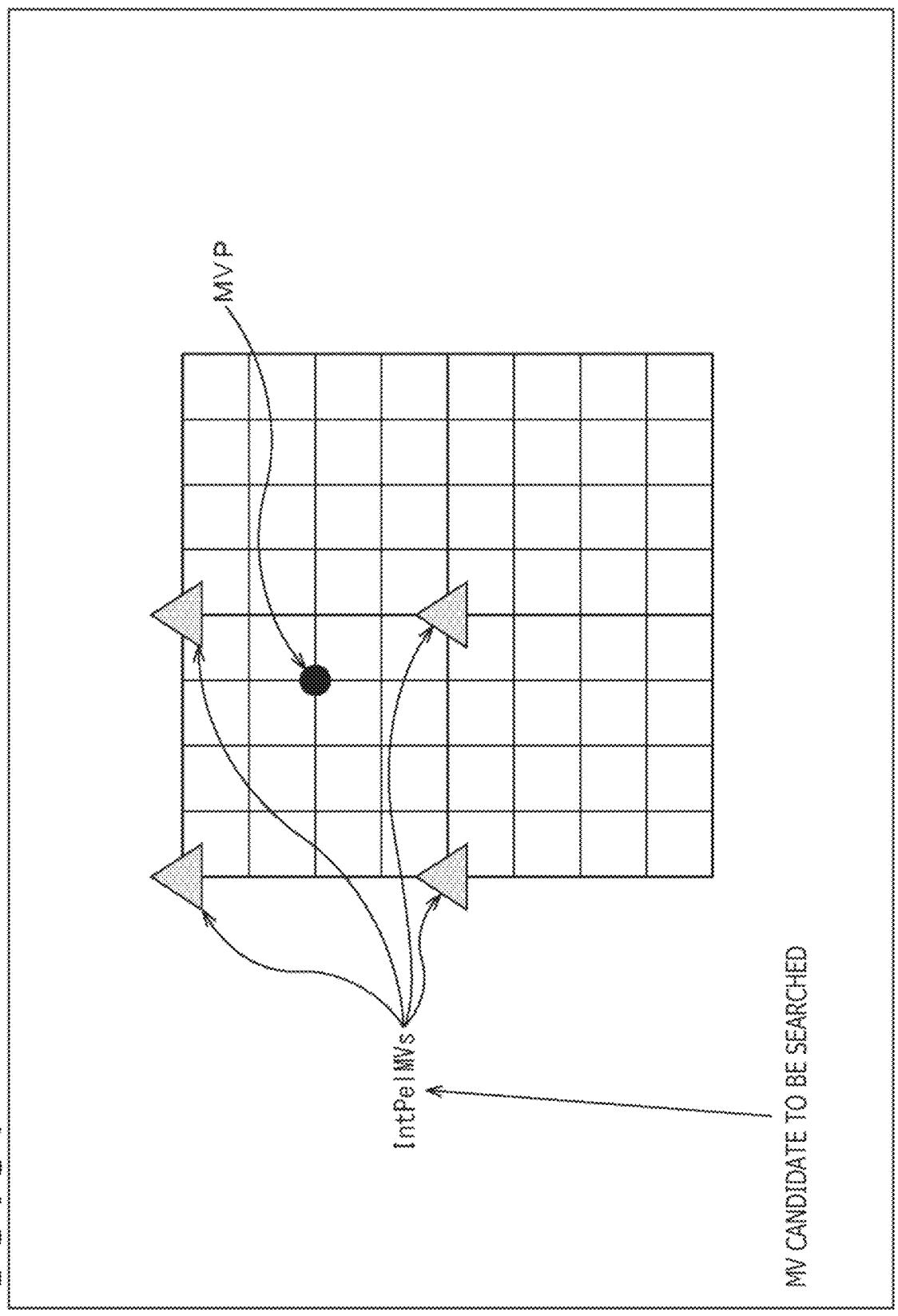
FIG. 37 is a view depicting an example of the MV offset list.

The MV offset list is such as described hereinabove with reference to FIG. 33. Here, by setting target_mv_prec=0, a search MV list (searchMVList) of 1-pel MV accuracy can be derived as depicted in FIG. 37. For example, positions are narrowed down to a position indicated by the MVP and a recent certain integer pixel (int-pel) position (IntPelMVs). By doing this, Decoder-side ME can be carried out without the necessity for an MC of sub-pel accuracy except an initial position of the MVP. In short, since template matching of sub-pel accuracy can be omitted, the template matching process in modification MV candidate derivation can be omitted.

<Template Matching Section>

The template matching section 111 performs template matching using the search MV list of the second MV accuracy derived by the second MV accuracy search MV list derivation section 521 to derive (calculate) a cost.

As depicted in FIG. 36, the template matching section 111 includes a current PU template generation section 531, a search point template generation section 532, and a cost calculation section 533.

<Current PU Template Generation Section>

The current PU template generation section 531 is a processing section similar to the current PU template generation section 131, and has a similar configuration and performs similar processing. For example, the current PU template generation section 531 generates a template of the current PU (curTemplate). The current PU template generation section 531 supplies the generated template of the current PU (curTemplate) to the cost calculation section 533.

<Search Point Template Generation Section>

The search point template generation section 532 acquires a search MV list of the second MV accuracy derived by the second MV accuracy search MV list derivation section 521 and pixel values decoded already from a picture buffer and derives (generates) a template of a search point on the basis of them. For example, the search point template generation section 532 generates a template corresponding to motion information of each search MV (searchMVList[i]) of the search MV list of the second MV accuracy. The search point template generation section 532 supplies the generated template of each search point to the cost calculation section 533.

<Cost Calculation Section>

The cost calculation section 533 is a processing section similar to the cost calculation section 133, and has a similar configuration and performs similar processing. For example, the cost calculation section 533 uses a template of the current PU supplied from the current PU template generation section 531 and a template of the search point supplied from the search point template generation section 532 to derive (calculate) their cost. The cost calculation section 533 supplies the calculated costs as a cost list (costList) to the MV candidate list update section 522.

<MV Candidate List Update Section>

The MV candidate list update section 522 receives as inputs thereto an MV candidate list (MVCandList) of the first MV accuracy supplied from the first MV accuracy MV candidate list derivation section 101 and a cost list (CostList) of template matching corresponding to each search MV of a search MV list (searchMVList) of the second MV accuracy supplied from the cost calculation section 533. The MV candidate list update section 522 refers to the cost list to select a search MV that indicates a minimum cost as a modification MV candidate and updates the MV candidate list (MVCandList) of the first MV accuracy using the modification MV candidate (by inserting the modification MV candidate, for example).

In this manner, the second MV accuracy search MV list derivation section 521 generates a search MV list of the second MV accuracy rougher (of lower accuracy) than the first MV accuracy corresponding to an MV candidate list of the first MV accuracy, and the template matching section 111 performs template matching using the search MV list of the second MV accuracy to calculate a cost. The MV candidate list update section 522 derives a modification MV candidate on the basis of such costs obtained by the template matching and updates the MV candidate list of the first MV accuracy using (inserting, for example) the modification MV candidate.

Accordingly, the modification MV candidate derivation section 502 can suppress increase of the load of template matching and can thereby suppress increase of the load of modification MV candidate derivation (update of the MV candidate list).

<Flow of Modification MV Candidate Derivation Process>

An example of a flow of the modification MV candidate derivation process executed in step S502 of FIG. 35 by the modification MV candidate derivation section 502 in this case (method #1-1) is described with reference to flow charts of FIGS. 38 and 39.

After the modification MV candidate derivation process is started, the current PU template generation section 531 generates a template (curTemplate) of the current PU in step S511.

In step S512, the second MV accuracy search MV list derivation section 521 selects an MV candidate (to-be-refined-mv) of a modification target from within the MV candidate list (MVCandList) of the first MV accuracy as indicated by the following expression (39).

$$\text{to-be-refined-mv} = \text{MVCandList[tgt\_idx]} \tag{39}$$

In step S513, the second MV accuracy search MV list derivation section 521 sets a search MV list (searchMVList) of 1-pel accuracy setting the MV candidate of the modification target as an initial position.

In step S514, the search point template generation section 532 sets an initial value (for example, "0") to a variable i.

In step S515, the search point template generation section 532 generates a template corresponding to motion information of the search MV (searchMVList[i]).

In step S516, the cost calculation section 533 derives a cost (CostList[i]) from the template of the current PU and the template corresponding to the search point (searchPoints [i]).

In step S517, the search point template generation section 532 decides whether or not the value of the variable i is smaller than a value (numSearchMV) indicative of the number of MV candidates included in the search MV list (searchMVList). In the case where it is decided that the variable i is smaller than the value (numSearchMV) (i<numSearchMV), the processing advances to step S518.

In step S518, the search point template generation section 532 increments the variable i (adds "+1" to the value of the variable i). After the process in step S518 ends, the processing returns to step S515 and the processes in the subsequent steps are repeated.

In short, the processes in steps S515 to S518 are executed for each search MV (cost (CostList[i]) corresponding to the search MV).

Figure 39:
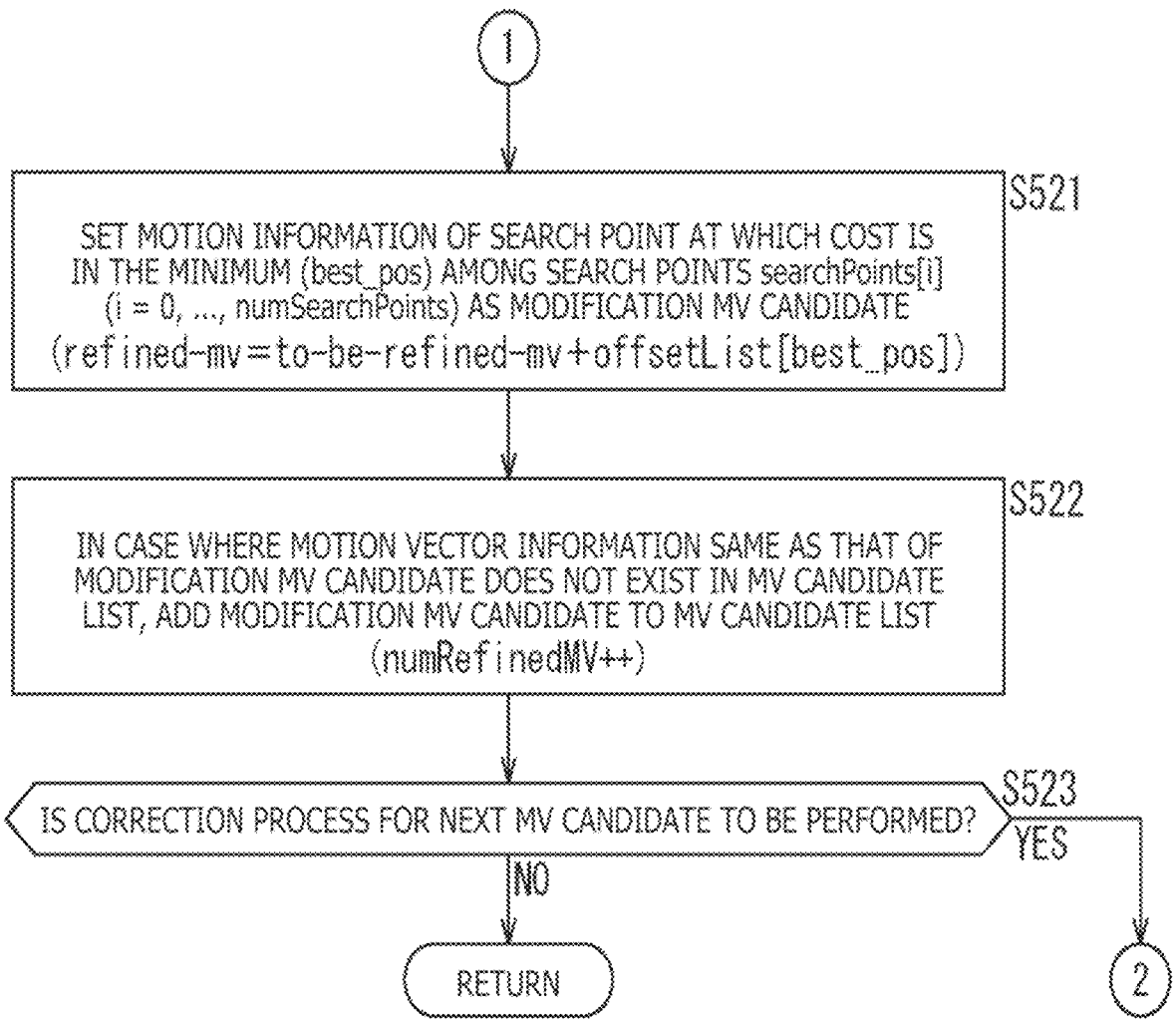
FIG. 39 is a flow chart, continued from FIG. 38, illustrating the example of the flow of the modification MV candidate derivation process.

Then, in the case where it is decided in step S517 that the variable i is equal to or greater than the value (numSearchMV) (i≥numSearchMV), the processing advances to step S521 of FIG. 39.

In step S521 of FIG. 39, the MV candidate list update section 522 sets motion information of a search point (best_pos) that indicates a minimum cost among the search points (searchPoints[i] (i=0, . . . , numSearch Points)) as a modification MV candidate.

In step S522, in the case where motion vector information same as that of the modification MV candidate does not exist in the MV candidate list, the MV candidate list update section 522 adds the modification MV candidate to the MV candidate list (numRefinedMV++).

In step S523, the MV candidate list update section 522 decides whether or not the processing is to advance to a correction process for a next MV candidate. For example, the MV candidate list update section 522 compares the number of modification MV candidates (numRefinedMV) added to the MV candidate list with a maximum number maxNumRefinedMV for modification MV candidates defined in advance, and advances the processing, in the case where the modification MV candidate number numRefinedMV is equal to or smaller than maxNumRefinedMV, to a correction process for a next MV candidate. In this case, the processing returns to step S512 of FIG. 38. Otherwise, the modification MV candidate derivation process is ended.

Figure 38:
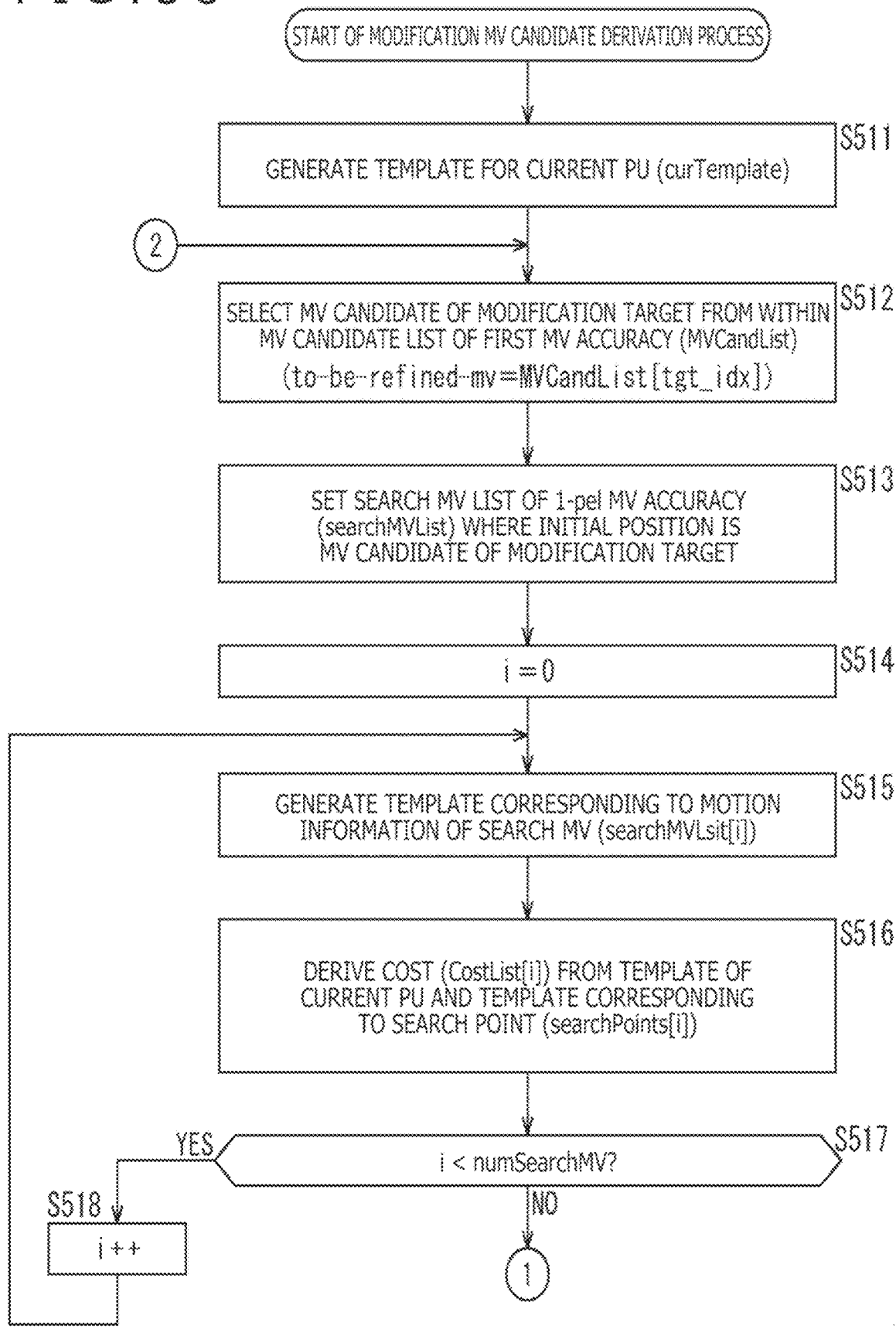
FIG. 38 is a flow chart illustrating an example of a flow of a modification MV candidate derivation process.

In short, the second MV accuracy search MV list derivation section 521 sets a search MV list of the second MV accuracy (for example, integer pixel accuracy) in the process in step S513 of FIG. 38. Accordingly, the template matching (step S516) can be simplified, and increase of the load can be suppressed. In short, the modification MV candidate derivation section 502 can suppress increase of the load of modification MV candidate derivation.

<Method #1-2: Application to Modification MV Candidate Derivation Section>

Figure 40:
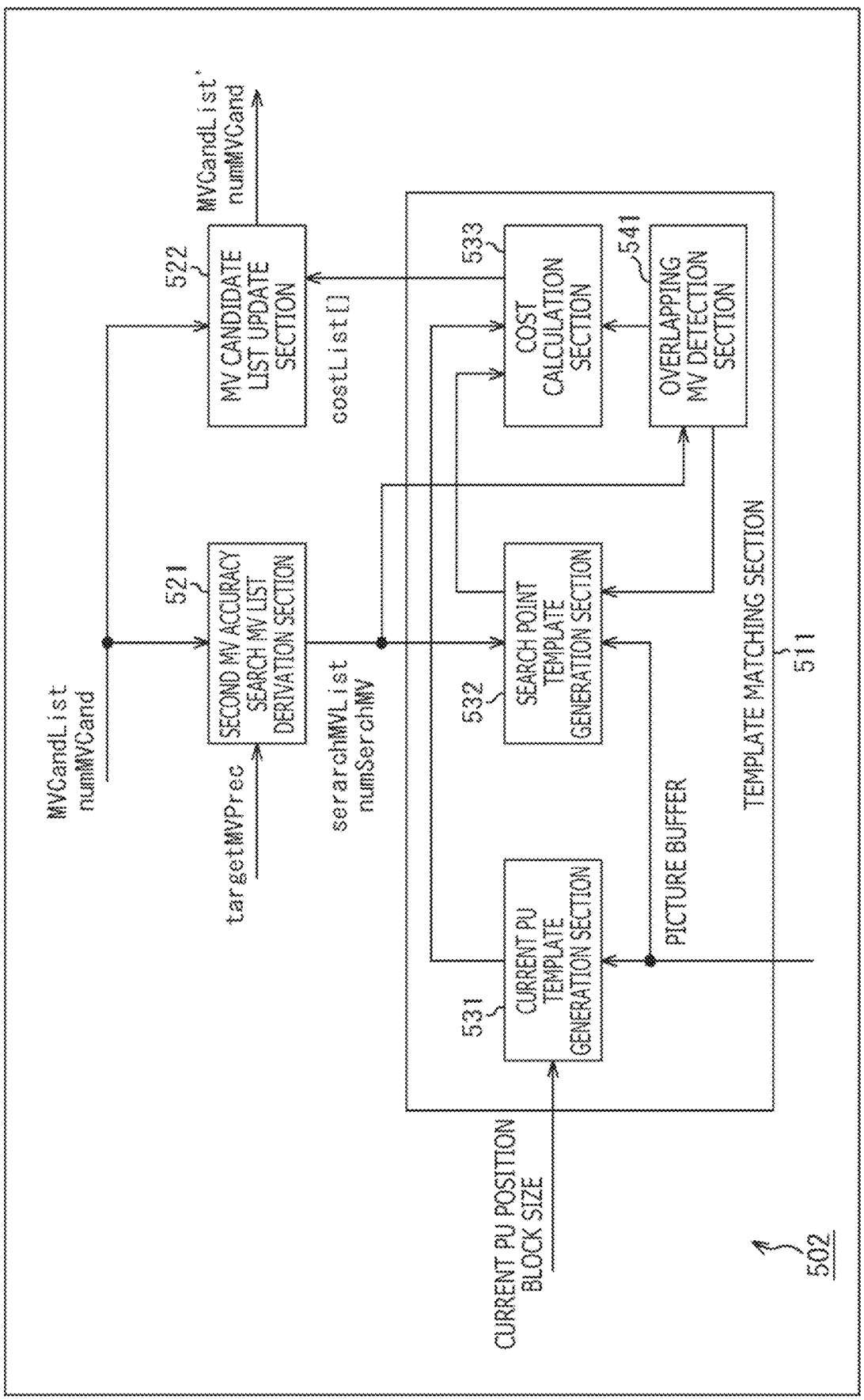
FIG. 40 is a block diagram depicting an example of principal components of the modification MV candidate derivation section.

Now, a case in which the method #1-2 of FIG. 3 is applied is described. FIG. 40 is a block diagram depicting an example of a configuration of the modification MV candidate derivation section 502 of FIG. 34. The modification MV candidate derivation section 502 in this case performs derivation of modification MV candidates using the method #1-1 and the method #1-2. In particular, the modification MV candidate derivation section 502 first performs template matching with rough accuracy, detects search MVs (overlapping MVs) same as search MVs for which template matching has been executed already, and then skips template matching of the search MVs (an executed template matching result (cost values) is diverted).

The modification MV candidate derivation section 502 in this case includes, as depicted in FIG. 40, a second MV accuracy search MV list derivation section 521, an MV candidate list update section 522, and a template matching section 511 similarly as in the case of FIG. 36. However, the template matching section 511 includes an overlapping MV detection section 541 in addition to the components of the case of FIG. 36.

The overlapping MV detection section 541 acquires a search MV list of the second MV accuracy derived (generated) by the second MV accuracy search MV list derivation section 521. The overlapping MV detection section 541 decides, by a method similar to that in the case of the overlapping MV detection section 141, whether or not a search MV of a processing target included in the search MV list of the second MV accuracy is same as a search MV that is included in the same search MV list of the second MV accuracy and for which template matching has been performed already. Then, the overlapping MV detection section 541 sets a test flag (ToBeTestFlag) and a cost reference index (CostRefIdx) to the search MV of the processing target according to a result of the decision, namely, according to a detection result of an overlapping MV, by a method similar to that of the case of the overlapping MV detection section 141.

The overlapping MV detection section 541 supplies information of the set test flag (ToBeTestFlag) and cost reference index (CostRefIdx) to the cost calculation section 533.

The cost calculation section 533 executes or skips template matching (replicates a cost) on the basis of the information mentioned to calculate a cost corresponding to each search MV.

By doing this, the modification MV candidate derivation section 502 can suppress increase of the number of times of template matching (reduce the number of times), and can suppress increase of the load of template matching. In short, the modification MV candidate derivation section 502 can suppress increase of the hardware cost, increase of the processing time, increase of the power consumption, and so forth necessary for template matching. Further, increase of the load of modification MV candidate derivation can be suppressed by this. In short, increase of the hardware cost, increase of the processing time, increase of the power consumption, and so forth necessary for modification MV candidate derivation can be suppressed.

<Flow of Modification MV Candidate Derivation Process>

An example of a flow of the modification MV candidate derivation process executed in step S502 of FIG. 35 by the modification MV candidate derivation section 502 in this case (method #1-2 (and method #1-1)) is described with reference to flow charts of FIGS. 41 and 42.

Figure 41:
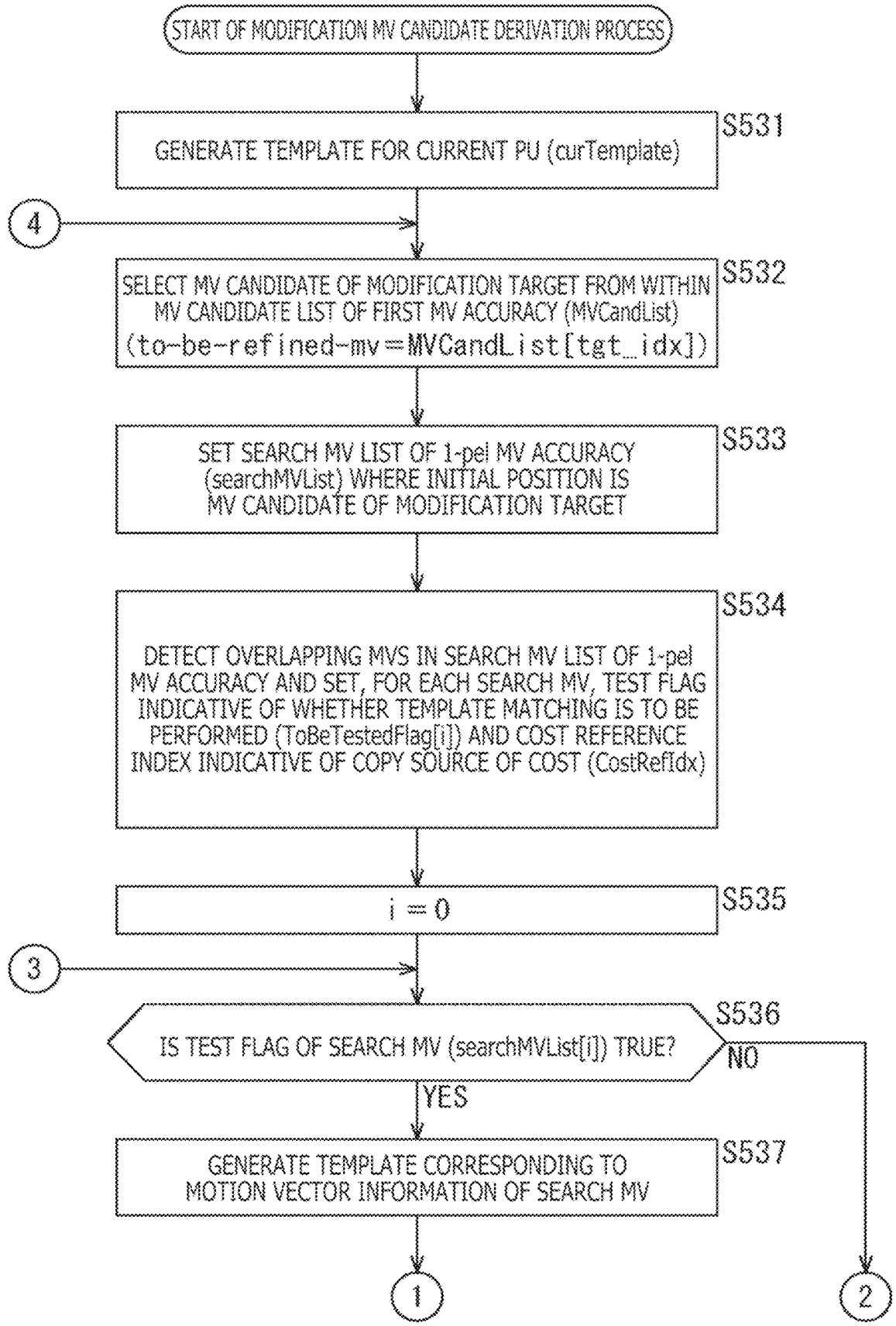
FIG. 41 is a flow chart illustrating an example of a flow of the modification MV candidate derivation process.

After the modification MV candidate derivation process is started, the current PU template generation section 131 generates, in step S531 of FIG. 41, a template of the current PU (curTemplate).

In step S532, the second MV accuracy search MV list derivation section 521 selects an MV candidate of a modification target from within the MV candidate list of the first MV accuracy (MVCandList) (to-be-refined-mv=MVCandList[tgt_idx]).

In step S533, the second MV accuracy search MV list derivation section 521 sets a search MV list (searchMVList) of 1-pel MV accuracy in which the MV candidate of the modification target is an initial position.

In step S534, the overlapping MV detection section 541 detects overlapping MVs in the search MV list of the 1-pel MV accuracy and sets, for each search MV, a test flag (ToBeTestedFlag) indicative of whether template matching is to be performed and a cost reference index (CostRefIdx) indicative of a replication source of a cost.

In step S535, the search point template generation section 532 sets an initial value (for example, "0") to the variable i.

In step S536, the search point template generation section 532 decides whether or not the test flag of the search MV (searchMVList[i]) is true. In the case where it is decided that this test flag is true (for example, ToBeTestFlag[i]==1), the processing advances to step S537.

In step S537, the search point template generation section 532 refers to the motion vector information of the search MV of the processing target to generate a template corresponding to the motion vector information. After the process in step S537 ends, the processing advances to step S541 of FIG. 42.

Figure 42:
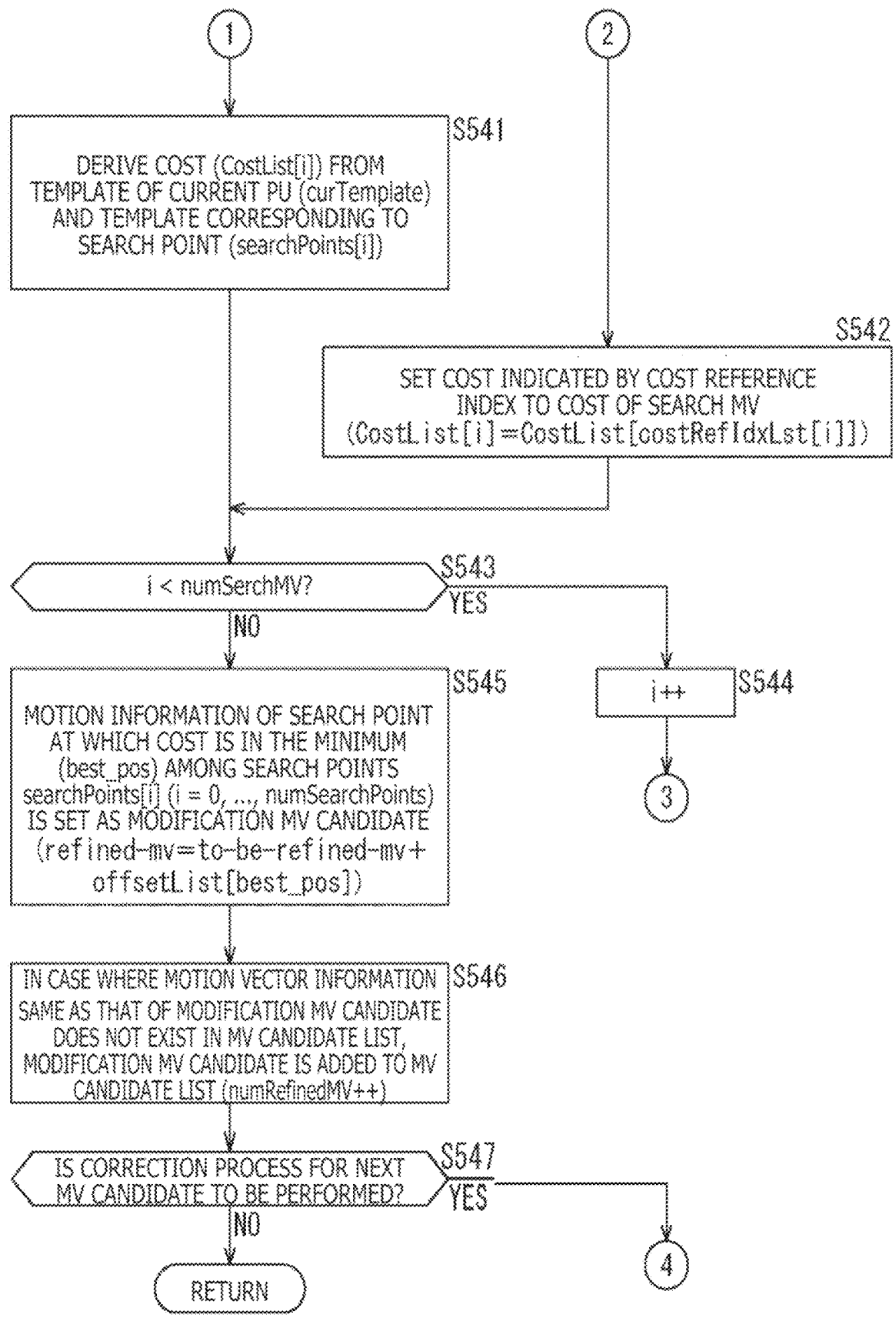
FIG. 42 is a flow chart, continued from FIG. 41, illustrating the example of the flow of the modification MV candidate derivation process.

In step S541 of FIG. 42, the cost calculation section 533 derives a cost (CostList[i]) on the basis of the template of the current PU generated in step S531 of FIG. 41 and the template corresponding to the search point (searchPoints[i]) of the second MV accuracy of the processing target generated in step S537 of FIG. 41. After the cost is derived, the processing advances to step S543.

On the other hand, in the case where it is decided in step S536 of FIG. 41 that the test flag of the search MV is false (for example, ToBeTestFlag[i]==0), the processing advances to step S542 of FIG. 42.

In step S542, the cost calculation section 533 sets the cost indicated by the cost reference index (CostRefIdx) set in step S534 of FIG. 41 to the cost of the search MV of the processing target. In short, the cost value of same motion information is re-utilized (substituted). Consequently, calculation of the cost value for the search MV of the processing target (template matching) can be omitted. After the process in step S542 ends, the processing advances to step S543.

In step S543, the search point template generation section 532 decides whether or not the value of the variable i is smaller than a value (numSearchMV) indicative of the number of MV candidates included in the search MV list (searchMVList). In the case where it is decided that the variable i is smaller than the value (numSearchMV) (i<numSearchMV), the processing advances to step S544.

In step S544, the search point template generation section 532 increments the variable i (adds "+1" to the value of the variable i). After the process in step S544 ends, the processing returns to step S536 of FIG. 41, and the processes in the subsequent steps are repeated.

In short, the processes in steps S536 to S544 are executed for each search MV (cost (CostList[i]) corresponding to the search MV).

Then, in the case where it is decided in step S543 of FIG. 42 that the variable i is equal to or greater than the value (numSearchMV) (i numSearchMV), the processing advances to step S545.

In step S545, the MV candidate list update section 522 refers to the cost list (CostList) to set motion information of the search point (best_pos) that indicates a minimum cost among the search points (searchPoints[i]) as a modification MV candidate (refined-mv=to-be-refined-mv+offsetList[best_pos]).

In step S546, in the case where motion vector information same as the modification MV candidate does not exist in the MV candidate list, the MV candidate list update section 522 adds the modification MV candidate to the MV candidate list (numRefinedMV++).

In step S547, the MV candidate list update section 522 decides whether or not the processing is to advance to a correction process for a next MV candidate. In the case where it is decided that the processing is to advance to a correction process for a next MV candidate, the processing returns to step S532 of FIG. 41. On the other hand, in the case where it is decided in step S547 of FIG. 42 that the processing is not to advance to a correction process for a next MV candidate, the modification MV candidate derivation process is ended.

By performing the modification MV candidate derivation process in such a manner as described above, the modification MV candidate derivation section 502 can suppress increase of the number of times of template matching (reduce the number of times) and can suppress increase of the load of modification MV candidate derivation.

<Method #1-3: Application to Thinning of Template>

Now, a case in which the method #1-3 of FIG. 3 is applied is described. In the method #1-3, template matching is performed using a template from which some pixels are thinned out.

By doing this, the number of pixels decreases in comparison with that of a template of a same size in the case where the method #1-3 is not applied, and therefore, increase of the calculation amount in template matching can be suppressed (the calculation amount can be reduced). Consequently, increase of the hardware cost, increase of the processing time, increase of the power consumption, and so forth necessary for template matching can be suppressed.

Further, the thinning rate is set according to the size of the current PU. By doing this, increase of the number of pixels of the template by increase of the block size (namely, increase of the calculation amount) can be suppressed, and the number of pixels of a template can be controlled so as to be appropriate also for a small block size.

It is to be noted that, also in this case, the number of pixels of a template may be controlled such that pixels are thinned out from a generated template or, in the case where the method #1-3 is not applied, some of pixels in an adjacent pixel group included in the template are sampled (extracted) and the sampled pixels are used to generate a template.

Also in this case, the way of thinning pixels (method of extraction (sampling)) may be freely decided. For example, the upper template may be thinned (extracted (sampled)) for each column and the left template may be thinned (extracted (sampled)) for each row (line).

<Modification MV Candidate Derivation Section>

Figure 43:
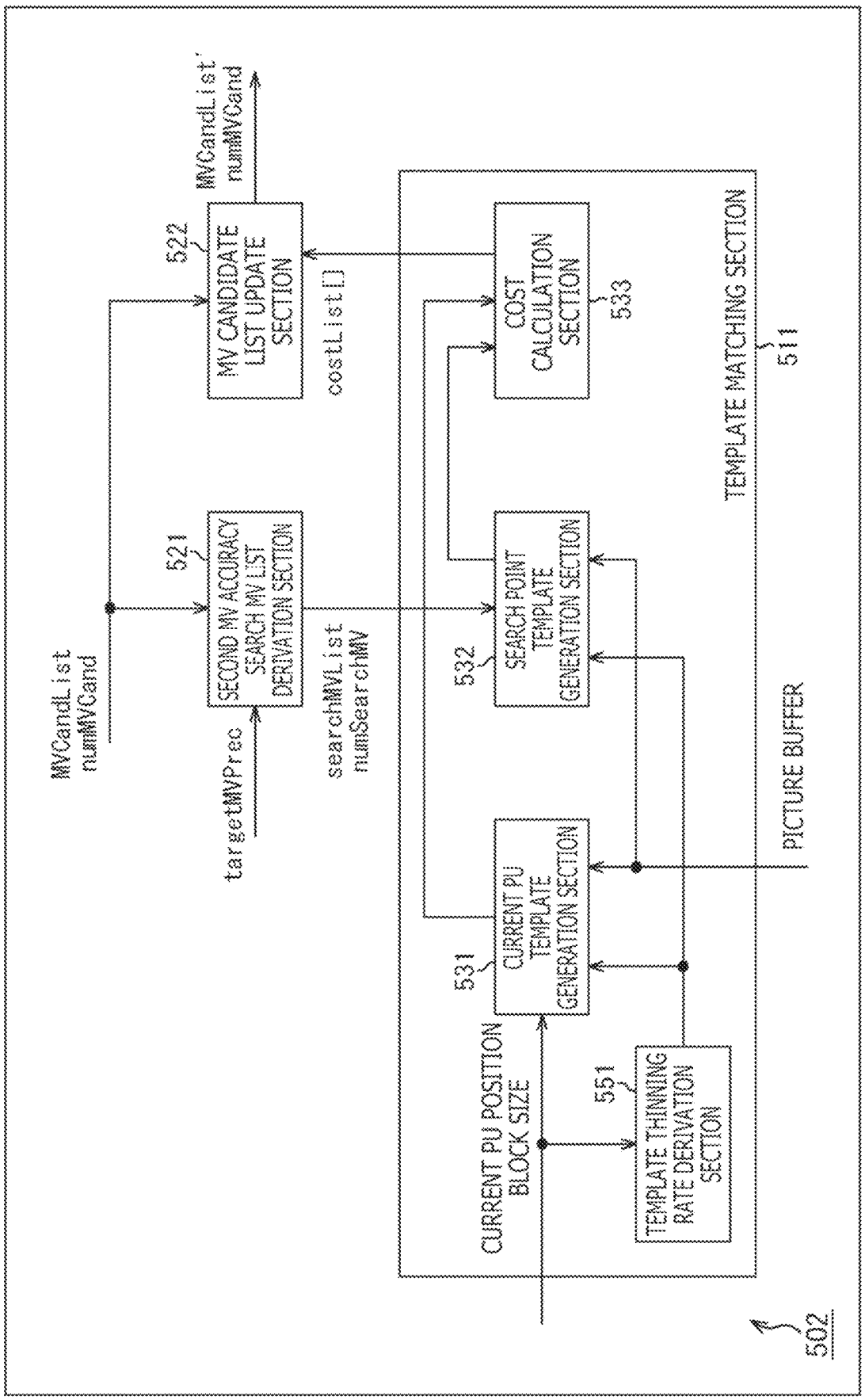
FIG. 43 is a block diagram depicting an example of principal components of the modification MV candidate derivation section.

FIG. 43 is a block diagram depicting an example of a configuration of the modification MV candidate derivation section 502 of FIG. 34. The modification MV candidate derivation section 502 in this case performs derivation of a modification MV candidate using the method #1-1 and the method #1-3. In particular, the modification MV candidate derivation section 502 performs template matching with rough accuracy and then thins out some of pixels of the template at a thinning rate (ratio) according to the size of the current PU.

The modification MV candidate derivation section 502 in this case includes, as depicted in FIG. 43, a second MV accuracy search MV list derivation section 521, an MV candidate list update section 522, and a template matching section 511 similarly as in the case of FIG. 36. However, the template matching section 511 includes a template thinning rate derivation section 551 in addition to the components of the case of FIG. 36.

<Template Thinning Rate Derivation Section>

The template thinning rate derivation section 551 derives thinning rates of the upper template and the left template according to the size of the current PU by a method similar to that in the case of the template thinning rate derivation section 151. The template thinning rate derivation section 551 supplies the derived template thinning rate to the current PU template generation section 531 and the search point template generation section 532.

<Current PU Template Generation Section>

In this case, the current PU template generation section 531 refers to the template thinning rate supplied thereto to generate a template of the current PU (CurTemplate). The current PU template generation section 531 supplies the generated template of the current PU to the cost calculation section 533.

<Search Point Template Generation Section>

The search point template generation section 532 refers to the template thinning rate supplied from the template thinning rate derivation section 551 to derive (generate) a template corresponding to motion information of the search point (searchMVList[i]). The search point template generation section 532 supplies the generated template of the search point to the cost calculation section 533.

<Cost Calculation Section>

The cost calculation section 533 performs template matching using a template generated in such a manner as described above (template in which some of pixels are thinned out). Accordingly, increase of the calculation amount of template matching can be suppressed (the calculation amount can be reduced). In short, increase of the hardware cost, increase of the processing time, increase of the power consumption, and so forth necessary for template matching can be suppressed. Further, increase of the load of modification MV candidate derivation can be suppressed thereby. In short, increase of the hardware cost, increase of the processing time, increase of the power consumption, and so forth necessary for modification MV candidate derivation can be suppressed.

<Flow of Modification MV Candidate Derivation Process>

Figure 44:
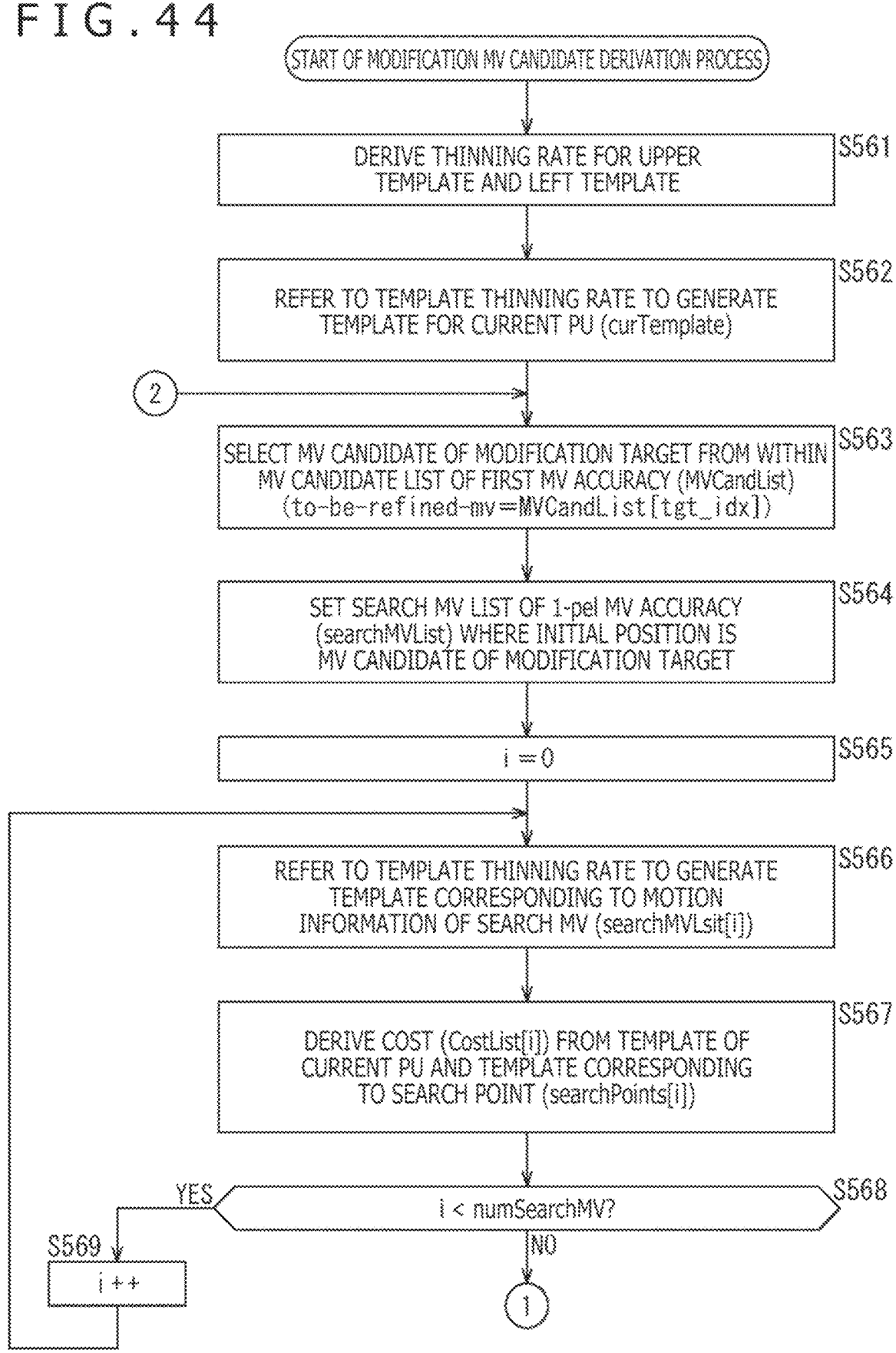
FIG. 44 is a flow chart illustrating an example of a flow of the modification MV candidate derivation process.

An example of a flow of the modification MV candidate derivation process executed in step S502 of FIG. 35 by the modification MV candidate derivation section 502 in this case (method #1-3 (and method #1-1)) is described with reference to flow charts of FIGS. 44 and 45.

After the modification MV candidate derivation process is started, the template thinning rate derivation section 151 derives template thinning rates of the upper template and the left template in step S561.

In step S562, the current PU template generation section 531 refers to the template thinning rates derived in step S561 to generate a template (curTemplate) of the current PU.

In step S563, the second MV accuracy search MV list derivation section 521 selects an MV candidate of a modification target from within the MV candidate list (MVCandList) of the first MV accuracy (to-be-refined-mv=MVCandList[tgt_idx]).

In step S564, the second MV accuracy search MV list derivation section 521 sets a search MV list (searchMVList) of the 1-pel MV accuracy in which the MV candidate of the modification target is an initial position.

In step S565, the search point template generation section 532 sets an initial value (for example, "0") to the variable i.

In step S566, the search point template generation section 532 refers to the template thinning rate derived in step S561 to generate a template corresponding to the motion information of the search MV (searchMVList[i]).

In step S567, the cost calculation section 533 derives a cost (CostList[i]) on the basis of the template of the current PU generated in step S562 and the template of the search point of the second MV accuracy generated in step S566. In short, the cost calculation section 533 performs template matching using the template generated by reference to the template thinning rate derived in step S561 (template in which pixels are thinned out at the template thinning rate) and derives a cost.

In step S568, the search point template generation section 532 decides whether or not the value of the variable i is smaller than a value (numSearchMV) indicative of the number of search MVs included in the search MV list (searchMVList). In the case where it is decided that the variable i is smaller than the value (numSearchMV) (i<numSearchMV), the processing advances to step S569.

In step S569, the search point template generation section 532 increments the variable i (adds "+1" to the value of the variable i). After the process in step S569 ends, the processing returns to step S566 and the processes in the subsequent steps are repeated.

In short, the processes in steps S566 to S569 are executed for each search MV (cost (CostList[i]) corresponding to the search MV).

Figure 45:
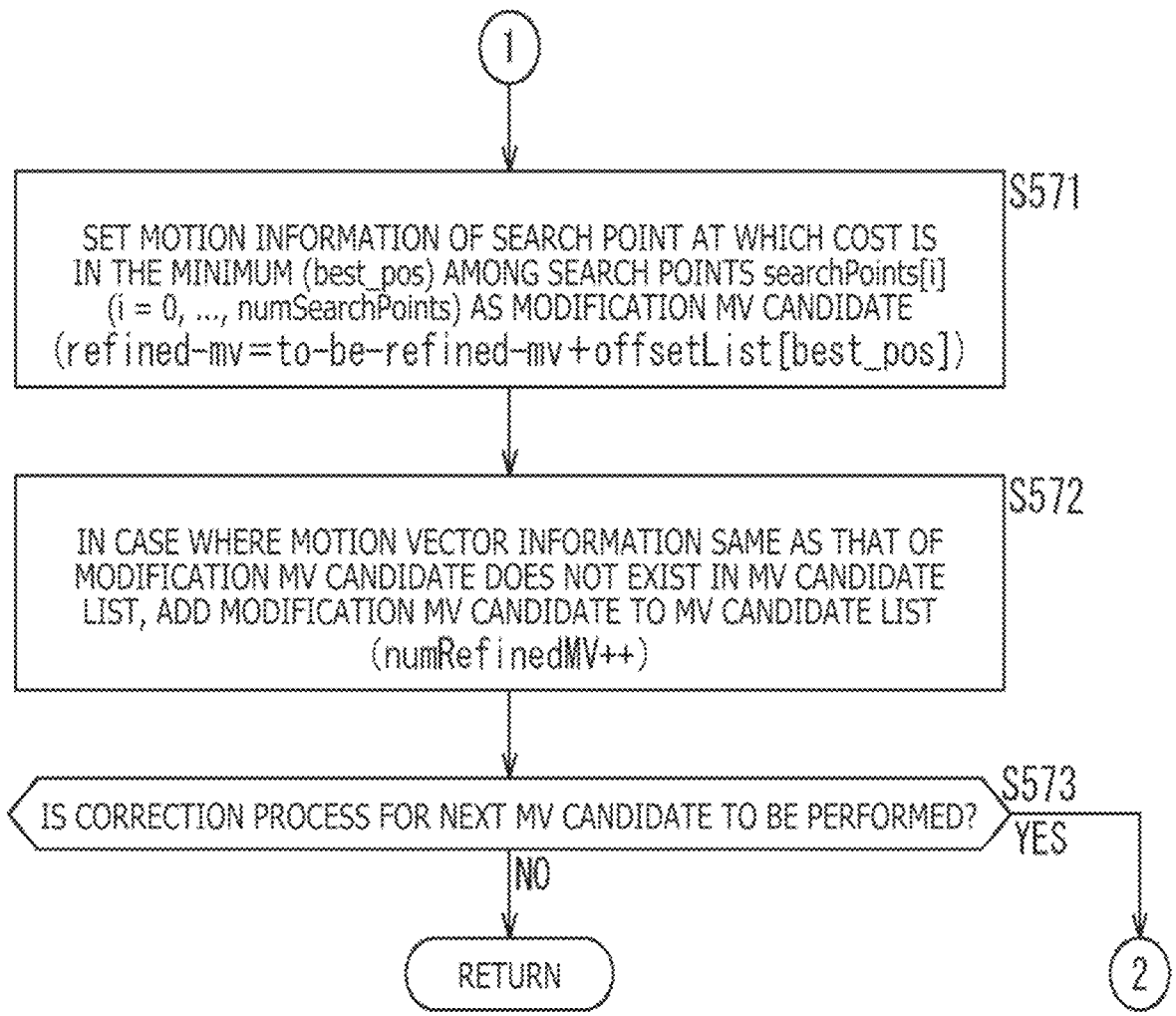
FIG. 45 is a flow chart, continued from FIG. 44, illustrating the example of the flow of the modification MV candidate derivation process.

Then, in the case where it is decided in step S568 that the variable i is equal to or greater than the value (numSearchMV) (i numSearchMV), the processing advances to step S571 of FIG. 45.

In step S571, the MV candidate list update section 522 refers to the cost list (CostList) to search for a search point (best_pos) that indicates a minimum cost among the search points (searchPoints[i]) and sets the motion information of the search point as a modification MV candidate (refined-mv=to-be-refined-mv+offsetList[best_pos]).

In step S572, in the case where motion vector information same as the modification MV candidate does not exist in the MV candidate list, the MV candidate list update section 522 adds the modification MV candidate to the MV candidate list (numRefinedMV++).

In step S573, the MV candidate list update section 522 decides whether or not the processing is to advance to a correction process for a next MV candidate. In the case where it is decided that the processing is to advance to a correction process for a next MV candidate, the processing returns to step S563 of FIG. 44. On the other hand, in the case where it is decided in step S573 of FIG. 45 that the processing is not to advance to a correction process for a next MV candidate, the modification MV candidate derivation process is ended.

By performing the modification MV candidate derivation process in such a manner as described above, the modification MV candidate derivation section 502 can suppress increase of the calculation amount of template matching (reduce the calculation amount) and can suppress increase of the load of modification MV candidate derivation.

<Method #1-4: Application to Modification MV Candidate derivation Section>

Figure 46:
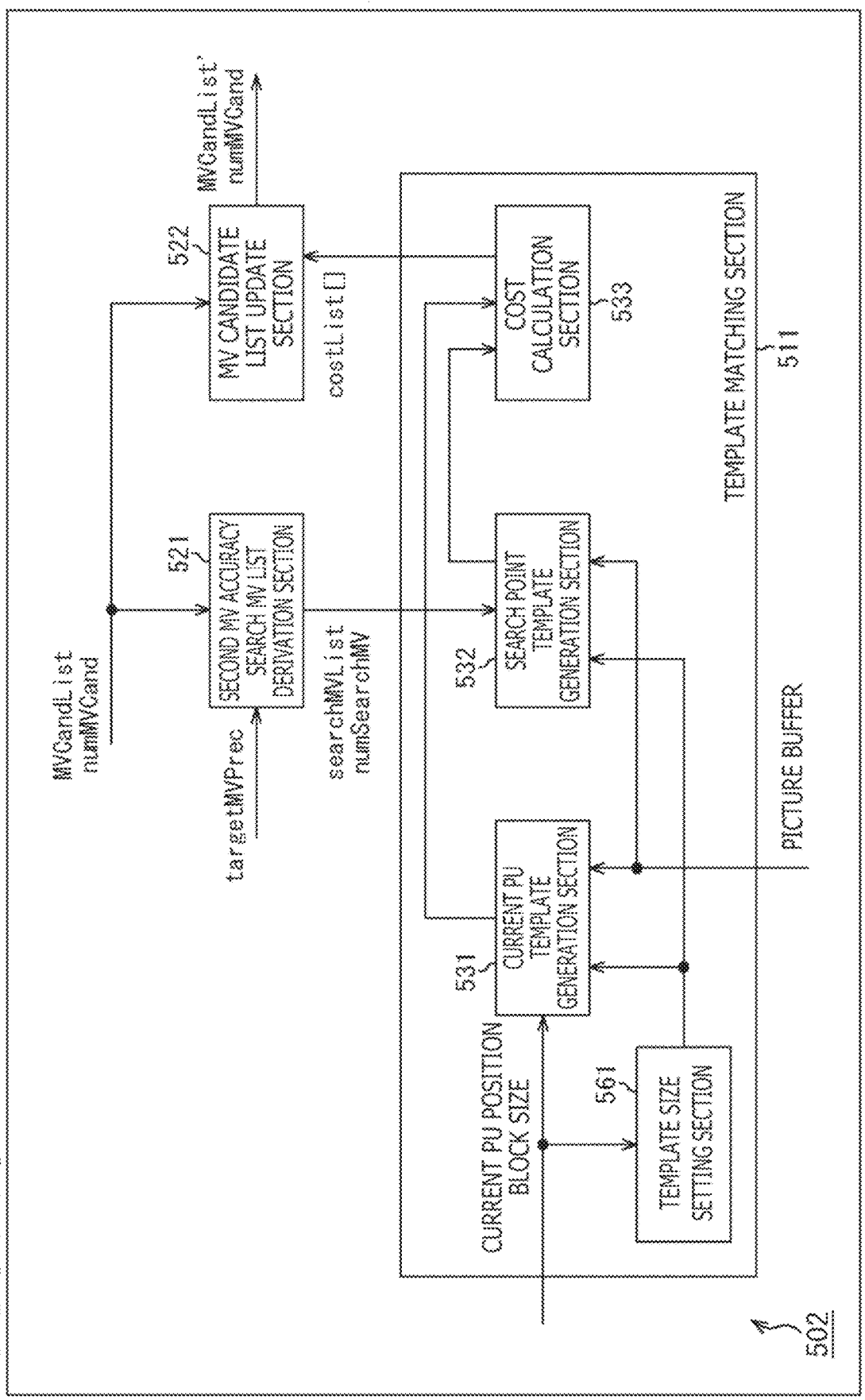
FIG. 46 is a block diagram depicting an example of principal components of the modification MV candidate derivation section.

Now, a case in which the method #1-4 of FIG. 3 is applied is described. FIG. 46 is a block diagram depicting an example of a configuration of the modification MV candidate derivation section 502 of FIG. 34. The modification MV candidate derivation section 502 in this case performs modification MV candidate derivation using the method #1-1 and the method #1-4. In particular, the modification MV candidate derivation section 502 performs template matching with rough accuracy and then controls the template size according to the position of the current PU.

The modification MV candidate derivation section 502 in this case includes, as depicted in FIG. 46, a second MV accuracy search MV list derivation section 521, an MV candidate list update section 522 and a template matching section 511 similarly as in the case of FIG. 36. However, the template matching section 511 includes a template size setting section 561 in addition to the components of the case of FIG. 36.

<Template Size Setting Section>

The template size setting section 561 sets a size of the upper template and the left template (template size). By reducing an adjacent decoded pixel group (line buffer) necessary for encoding and decoding a current CTU, the circuit scale of hardware can be reduced. Therefore, in order to reduce the size of the line buffer of the CTU level for holding decoded pixels, the template size setting section 561 sets the template size according to the position of the current PU in the CTU by a method similar to the case of the template size setting section 161. Also in this case, the values of templateSize1 and templateSize2 may be freely decided as long as they have the relation of templateSize1<templateSize2.

Similarly, also the size of the reference pixel region of intra prediction may be determined according to the position of the current PU in the CTU. By doing this, increase of the line buffer used to hold a reference pixel region of intra prediction can be suppressed (the line buffer can be reduced).

The template size setting section 561 supplies information of the template size set in such a manner as described above to the current PU template generation section 531 and the search point template generation section 532.

<Current PU Template Generation Section>

The current PU template generation section 531 refers to a template size supplied from the template size setting section 561 to generate a template of the current PU. The current PU template generation section 531 supplies the generated template of the current PU to the cost calculation section 533.

<Search Point Template Generation Section>

The search point template generation section 532 acquires a search MV list of the second MV accuracy derived by the second MV accuracy search MV list derivation section 521, pixel values decoded already from the picture buffer, and a template size supplied from the template size setting section 561 and derives (generates) a template of a search MV on the basis of them. The search point template generation section 532 supplies the generated template of the search MV to the cost calculation section 533.

<Cost Calculation Section>

The cost calculation section 533 performs template matching using a template generated in such a manner as described above (template whose template size is controlled according to the position of the current PU). Accordingly, increase of decoded pixels to be used in template generation can be suppressed (decoded pixels to be used in template generation can be reduced). In short, increase of the size of the line buffer for storing (retaining) the decoded pixels can be suppressed (the line buffer size can be reduced). In short, increase of the load of template matching can be suppressed. Further, by this, increase of the load of derivation of modification MV candidates can be suppressed.

<Flow of Modification MV Candidate Derivation Process>

Figure 47:
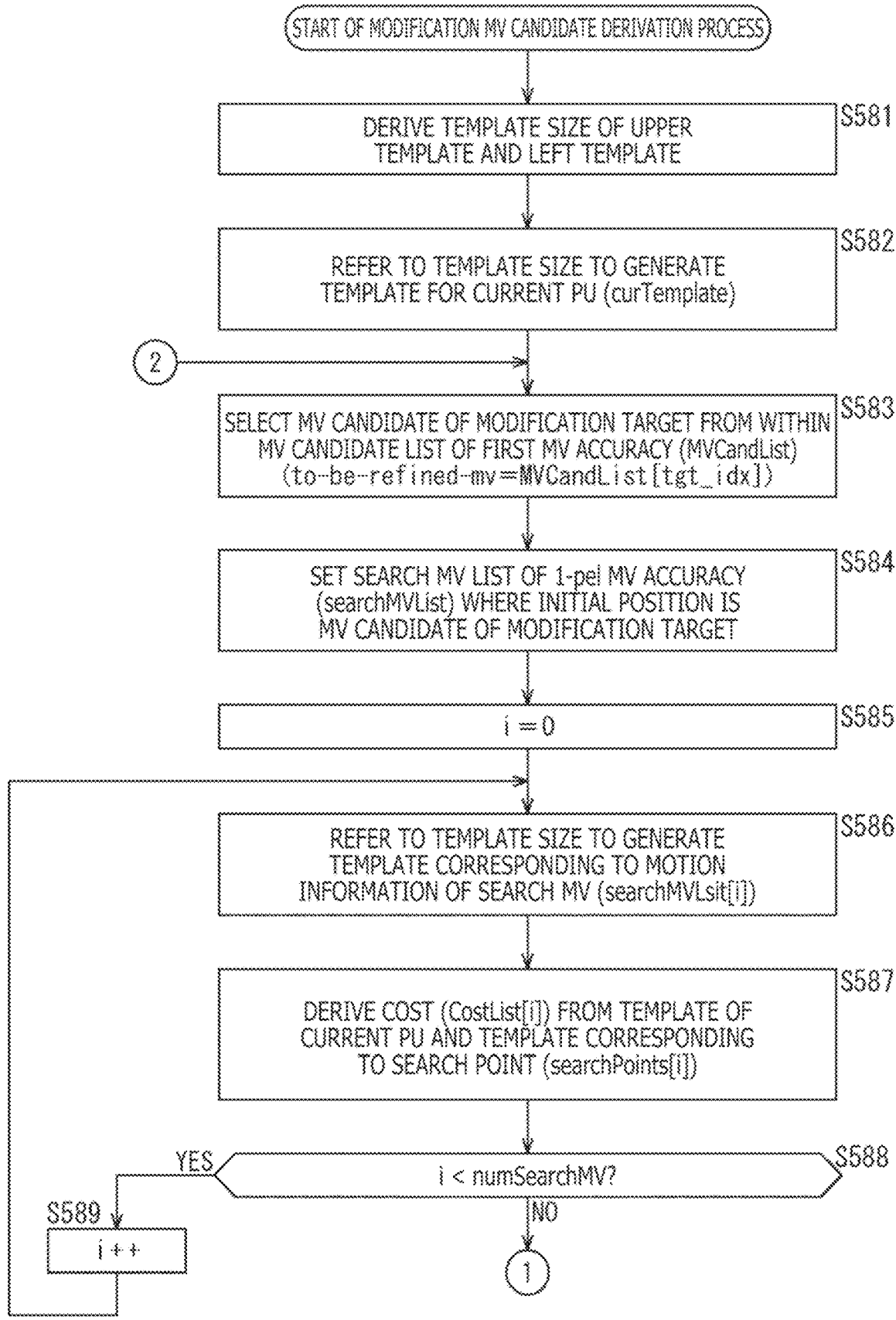
FIG. 47 is a flow chart illustrating an example of a flow of the modification MV candidate derivation process.

An example of a flow of the modification MV candidate derivation process executed in step S502 of FIG. 35 by the modification MV candidate derivation section 502 in this case (method #1-4 (and method #1-1)) is described with reference to flow charts of FIGS. 47 and 48.

After the modification MV candidate derivation process is started, the template size setting section 561 derives a template size of the upper template and the left template in step S581.

In step S582, the current PU template generation section 531 refers to the template size set in step S581 to generate a template (curTemplate) of the current PU. In step S583, the second MV accuracy search MV list derivation section 521 selects an MV candidate of a modification target from within the MV candidate list (MVCandList) of the first MV accuracy (to-be-refined-mv=MVCandList[tgt_idx]).

In step S584, the second MV accuracy search MV list derivation section 521 sets a search MV list (searchMVList) of the 1-pel MV accuracy in which the MV candidate of the modification target is the initial position.

In step S585, the search point template generation section 532 sets an initial value (for example, "0") to the variable i.

In step S586, the search point template generation section 532 refers to the template size derived in step S581 to generate a template corresponding to the motion information of the search MV (searchMVList[i]).

In step S587, the cost calculation section 533 derives a cost (CostList[i]) from the template of the current PU generated in step S582 and the template corresponding to the search point (searchPoints[i]) generated in step S586. In short, the cost calculation section 533 performs template matching using the template of the template size set in step S581 (template size set according to the position of the current PU) to derive a cost.

In step S588, the search point template generation section 532 decides whether or not the value of the variable i is smaller than a value (numSearchMV) indicative of the number of search MVs included in the search MV list. In the case where it is decided that the variable i is smaller than the value (numSearchMV) (i<numSearchMV), the processing advances to step S589.

In step S589, the search point template generation section 532 increments the variable i (adds "+1" to the value of the variable i). After the process in step S589 ends, the processing returns to step S586 and the processes in the subsequent steps are repeated. In short, the processes in steps S586 to S589 are executed for each search MV (cost (CostList[i]) corresponding to each MV candidate).

Figure 48:
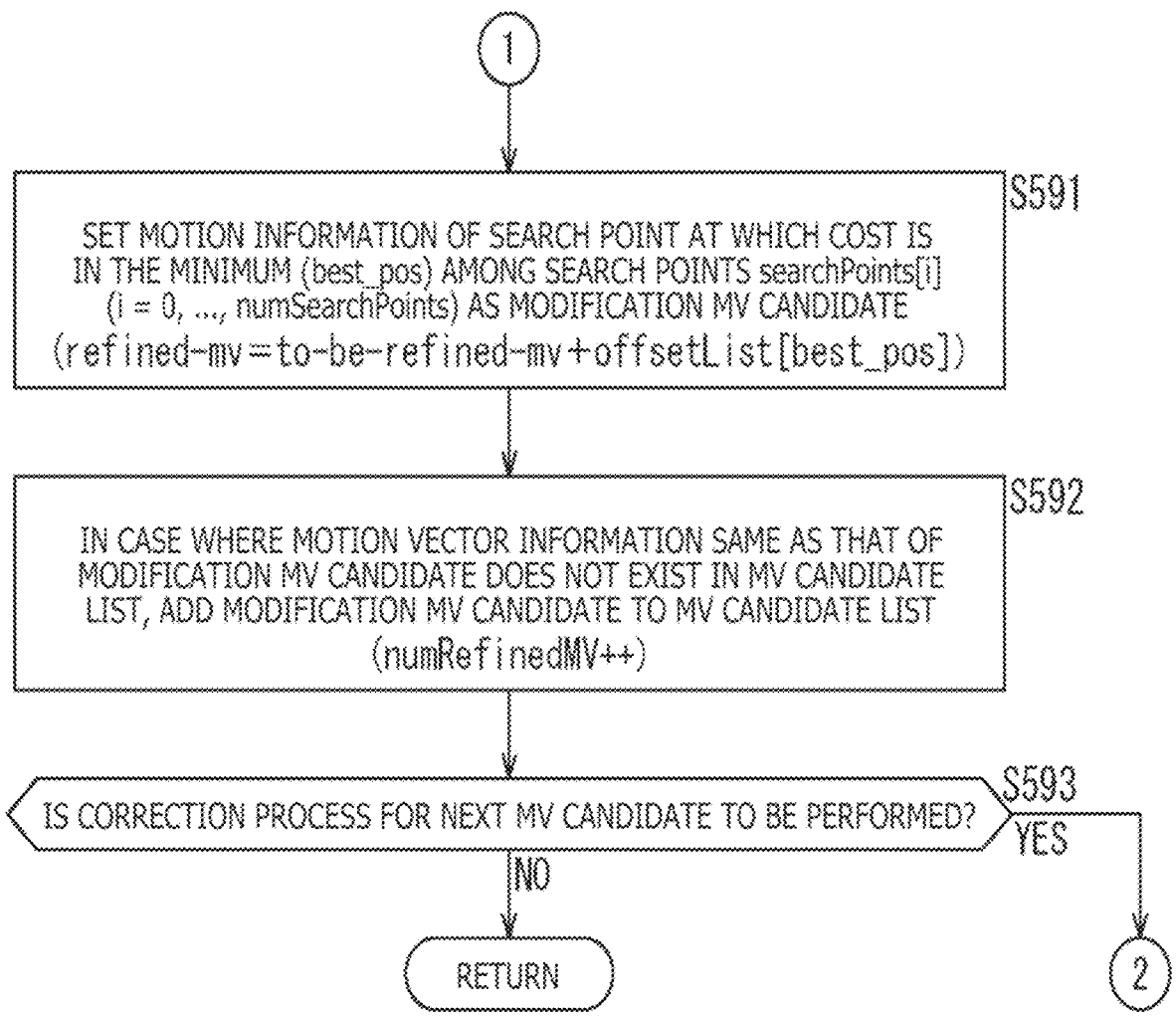
FIG. 48 is a flow chart, continued from FIG. 47, illustrating the example of the flow of the modification MV candidate derivation process.

Then, in the case where it is decided in step S587 that the variable i is equal to or greater than the value (numSearchMV) (i≥numSearchMV), the processing advances to step S591 of FIG. 48.

In step S591 of FIG. 48, the MV candidate list update section 522 sets the motion information of a search point (best_pos) that indicates a minimum cost among the search points (searchPoints[i]) as a modification MV candidate (refined-mv=to-be-refined-mv+offsetList[best_pos]).

In step S592, in the case where motion vector information same as the modification MV candidate does not exist in the MV candidate list, the MV candidate list update section 522 adds the modification MV candidate to the MV candidate list (numRefinedMV++).

In step S593, the MV candidate list update section 522 decides whether or not the processing is to advance to a correction process for a next MV candidate. In the case where it is decided that the processing is to advance to a correction process for a next MV candidate, the processing returns to step S583 of FIG. 47. On the other hand, in the case where it is decided in step S593 of FIG. 48 that the processing is not to advance to a correction process for a next MV candidate, the modification MV candidate derivation process is ended.

By performing the modification MV candidate derivation process in such a manner as described above, the modification MV candidate derivation section 502 can suppress increase of the size of the line buffer used in template matching (reduce the line buffer size) and can suppress increase of the load of modification MV candidate derivation.

<Method #1-5: Application to Modification MV Candidate Derivation Section>

Figure 49:
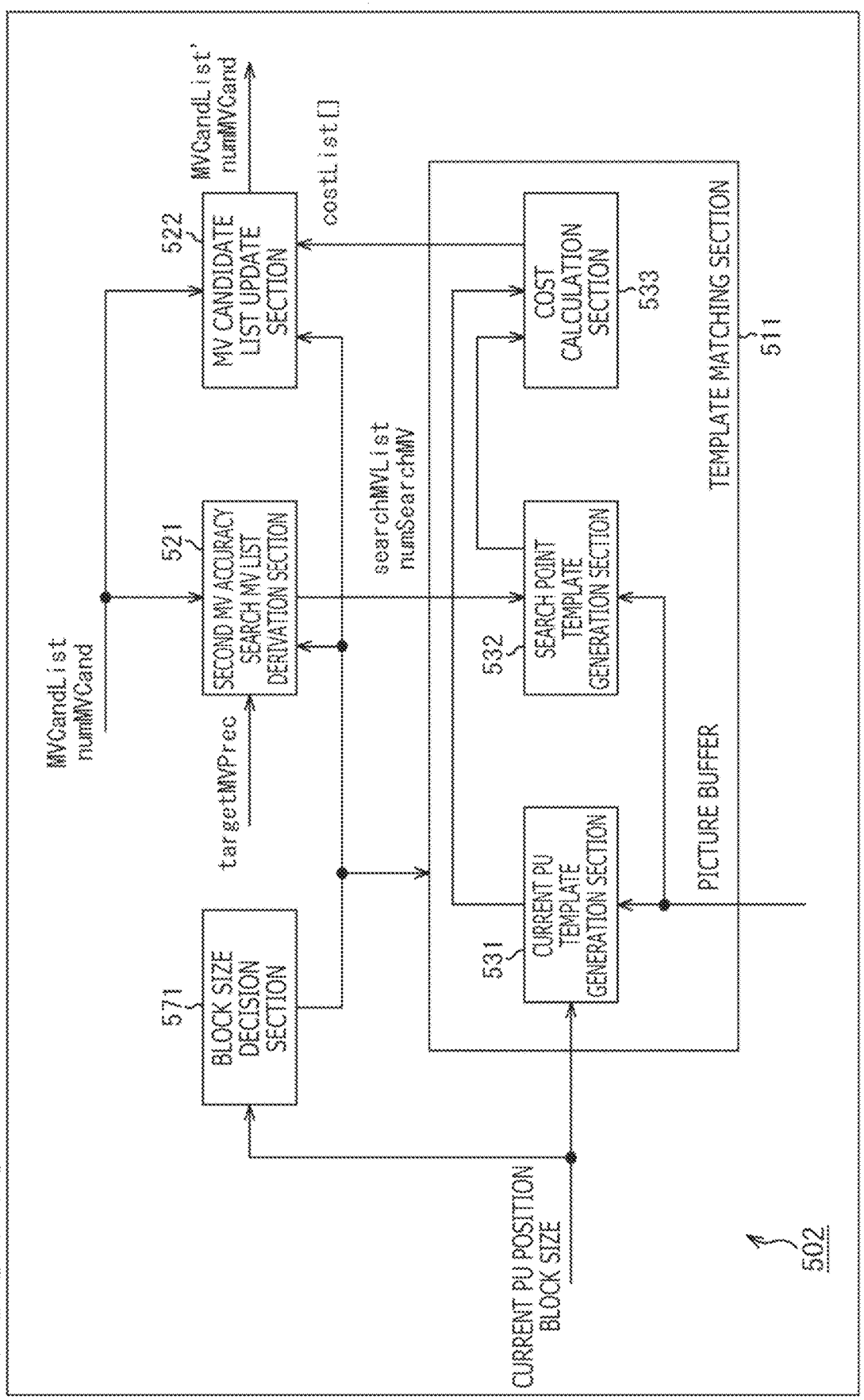
FIG. 49 is a block diagram depicting an example of principal components of the modification MV candidate derivation section.

Now, a case in which the method #1-5 of FIG. 3 is applied is described. FIG. 49 is a block diagram depicting an example of a configuration of the modification MV candidate derivation section 502 of FIG. 34. The modification MV candidate derivation section 502 in this case performs derivation of a modification MV candidate using the method #1-1 and the method #1-5. In particular, the modification MV candidate derivation section 502 first performs template matching with rough accuracy, and further, in the case where the size of the current PU is small, the modification MV candidate derivation process is skipped (omitted).

The modification MV candidate derivation section 502 in this case includes, as depicted in FIG. 49, a block size decision section 571 in addition to the components in the case of FIG. 36 (the second MV accuracy search MV list derivation section 521, the MV candidate list update section 522, and the template matching section 511).

<Block Size Decision Section>

The block size decision section 571 decides a block size of the current PU by a method similar to that of the block size decision section 171. For example, the block size decision section 571 decides on the basis of information indicative of a block size of the current PU whether or not the block size of the current PU is smaller than a predetermined threshold value. Then, in the case where it is decided that the block size of the current PU is smaller than the predetermined threshold value, the block size decision section 571 controls the second MV accuracy search MV list derivation section 521, the template matching section 511, and the MV candidate list update section 522 to skip (omit) their respective processing. In short, the block size decision section 571 causes them to skip (omit) their modification MV candidate derivation process.

If the block size of the current PU is small, then there is the possibility that the number of times of access to an adjacent decoded pixel group or to a reference picture upon template matching increases to increase the memory band necessary for processing. Therefore, in the case where the size of the current PU is smaller than the predetermined block size, the modification MV candidate derivation section 502 omits the derivation process of a modification MV candidate by template matching. By such control as just described, increase of the memory band necessary for processing can be suppressed. In short, increase of the load of template matching and modification MV candidate derivation can be suppressed.

<Flow of MV Candidate List Derivation Process>

Figure 50:
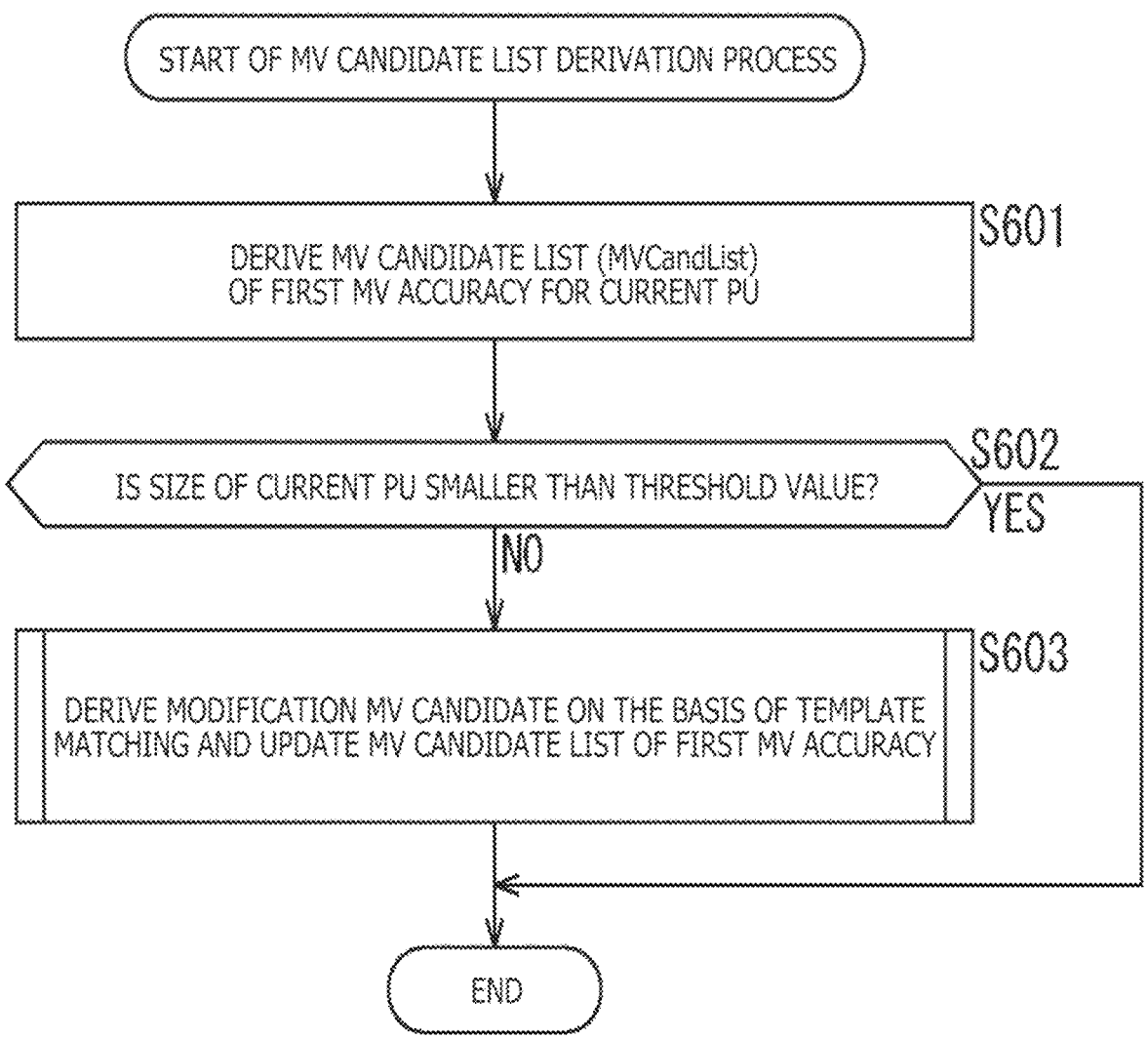
FIG. 50 is a flow chart illustrating an example of a flow of the MV candidate list derivation process.

An example of a flow of an MV candidate list derivation process executed by the MV candidate list derivation apparatus 100 in this case is described with reference to a flow chart of FIG. 50.

After the MV candidate list derivation process is started, the first MV accuracy MV candidate list derivation section 101 derives (generates) an MV candidate list (MVCandList) of the first MV accuracy for the current PU in step S601. It is to be noted that, at this time, the first MV accuracy MV candidate list derivation section 101 derives (generates) information (numMVCand) indicative of the number of MV candidates included in the MV candidate list of the first MV accuracy.

In step S602, the block size decision section 571 decides on the basis of the information indicative of the block size of the current PU whether or not the size of the current PU is smaller than a predetermined threshold value. In the case where it is decided that the size of the current PU is not smaller than the predetermined threshold value (is equal to or greater than the threshold value), the block size decision section 171 controls such that a modification MV candidate derivation process is performed. In particular, the processing advances to step S603.

In step S603, the modification MV candidate derivation section 502 (the second MV accuracy search MV list derivation section 521, the template matching section 511, and the MV candidate list update section 522) derives modification MV candidates on the basis of template matching, and by use of the modification MV candidates, updates the MV candidate list of the first MV accuracy derived in step S601 to derive (generate) an MV candidate list after updating (MVCandList').

When the process in step S603 ends, the MV candidate list derivation process ends.

On the other hand, in the case where it is decided in step S602 that the size of the current PU is smaller than the predetermined threshold value, the block size decision section 571 controls such that the modification MV candidate derivation process is skipped (omitted). In particular, the process in step S603 is skipped (omitted) and the MV candidate list derivation process is ended.

As above, by executing the processes in the steps, increase of the memory band necessary for processing can be suppressed, and increase of the load of template matching and the updating process of the MV candidate list can be suppressed.

<Method #1-6: Application to Modification MV Candidate derivation Section>

Figure 51:
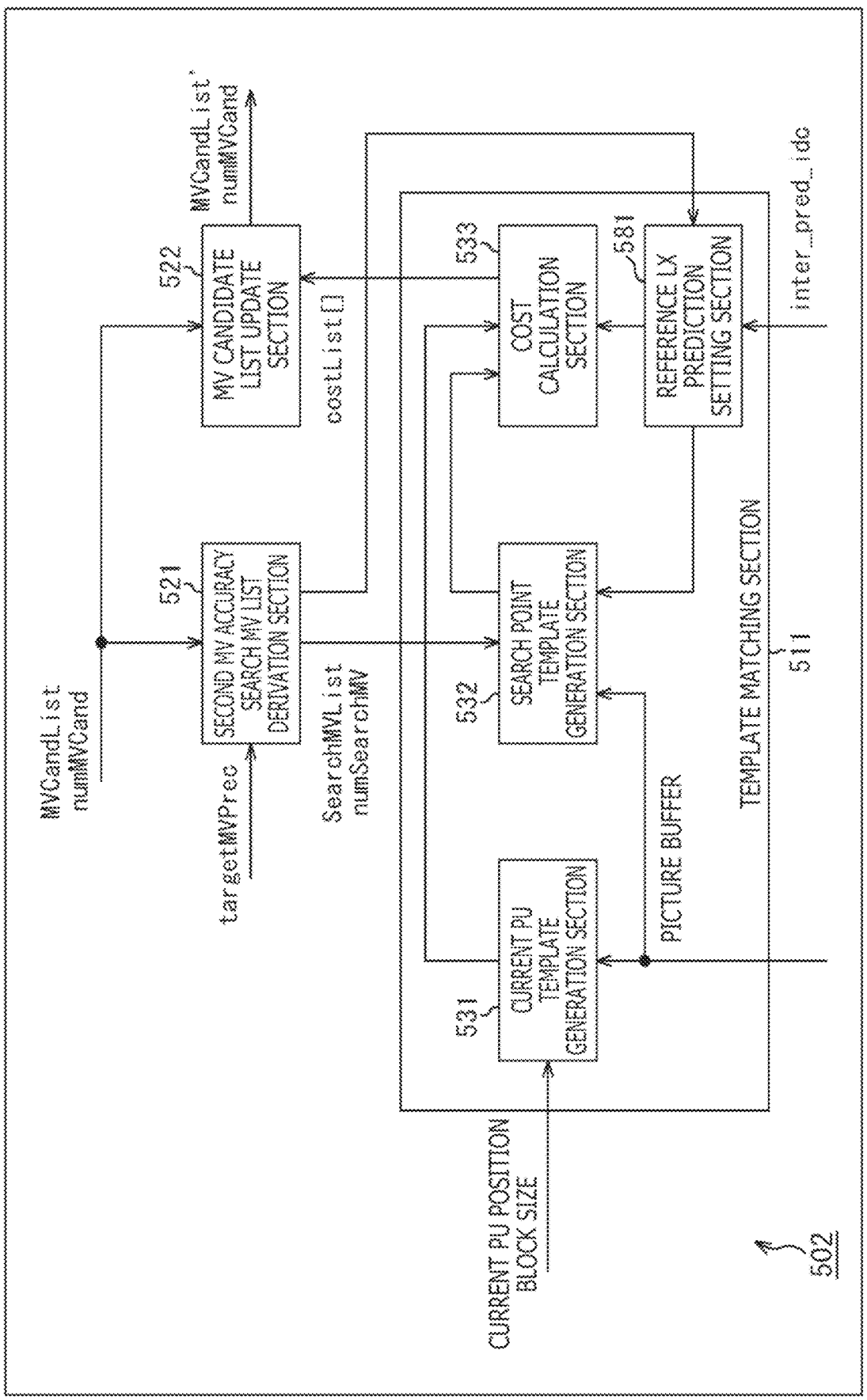
FIG. 51 is a block diagram depicting an example of principal components of the modification MV candidate derivation section.

Now, a case in which the method #1-6 of FIG. 3 is applied is described. FIG. 51 is a block diagram depicting an example of a configuration of the modification MV candidate derivation section 502 of FIG. 34. The modification MV candidate derivation section 502 in this case performs derivation of a modification MV candidate using the method #1-1 and the method #1-6. In particular, the modification MV candidate derivation section 502 performs template matching with rough accuracy, reduces the number of prediction for MV candidates for which multiple prediction is to be performed, and performs template matching by single prediction.

The modification MV candidate derivation section 502 in this case includes a second MV accuracy search MV list derivation section 521, an MV candidate list update section 522, and a template matching section 511 as depicted in FIG. 51 similarly as in the case of FIG. 36. However, the template matching section 511 includes a reference LX prediction setting section 581 in addition to the components in the case of FIG. 36.

<Reference LX prediction Setting Section>

The reference LX prediction setting section 581 refers to motion vector information of a search MV (searchMVList[i]) of the second MV accuracy to set reference LX prediction to be used for template generation by a method similar to that in the case of the reference LX prediction setting section 181. The reference LX prediction setting section 581 supplies information indicative of the set reference LX prediction to the search point template generation section 532 and the cost calculation section 533.

<Search Point Template Generation Section>

The search point template generation section 532 generates a template corresponding to the reference LX prediction supplied from the reference LX prediction setting section 581 and supplies the generated template of the reference block to the cost calculation section 533.

<Cost Calculation Section>

The cost calculation section 533 performs template matching of the template of the current PU generated by the current PU template generation section 531 and a template corresponding to the reference LX prediction generated by the search point template generation section 532 to derive (calculate) a cost (CostList[i]).

By doing the above, in the case where the MV candidate is by bi-prediction, the template to be generated actually can be restricted to any one of the L0 prediction or the L1 prediction. Accordingly, increase of the calculation amount of template matching relating to the MV candidate of bi-prediction can be suppressed (the calculation amount can be reduced). In short, increase of the hardware cost, increase of the processing time, increase of the power consumption, and so forth necessary for template matching can be suppressed. Further, by this, increase of the load of derivation of a modification MV candidate can be suppressed. In short, increase of the hardware cost, increase of the processing time, increase of the power consumption, and so forth necessary for derivation of a modification MV candidate can be suppressed.

<Flow of Modification MV Candidate Derivation Process>

Figure 52:
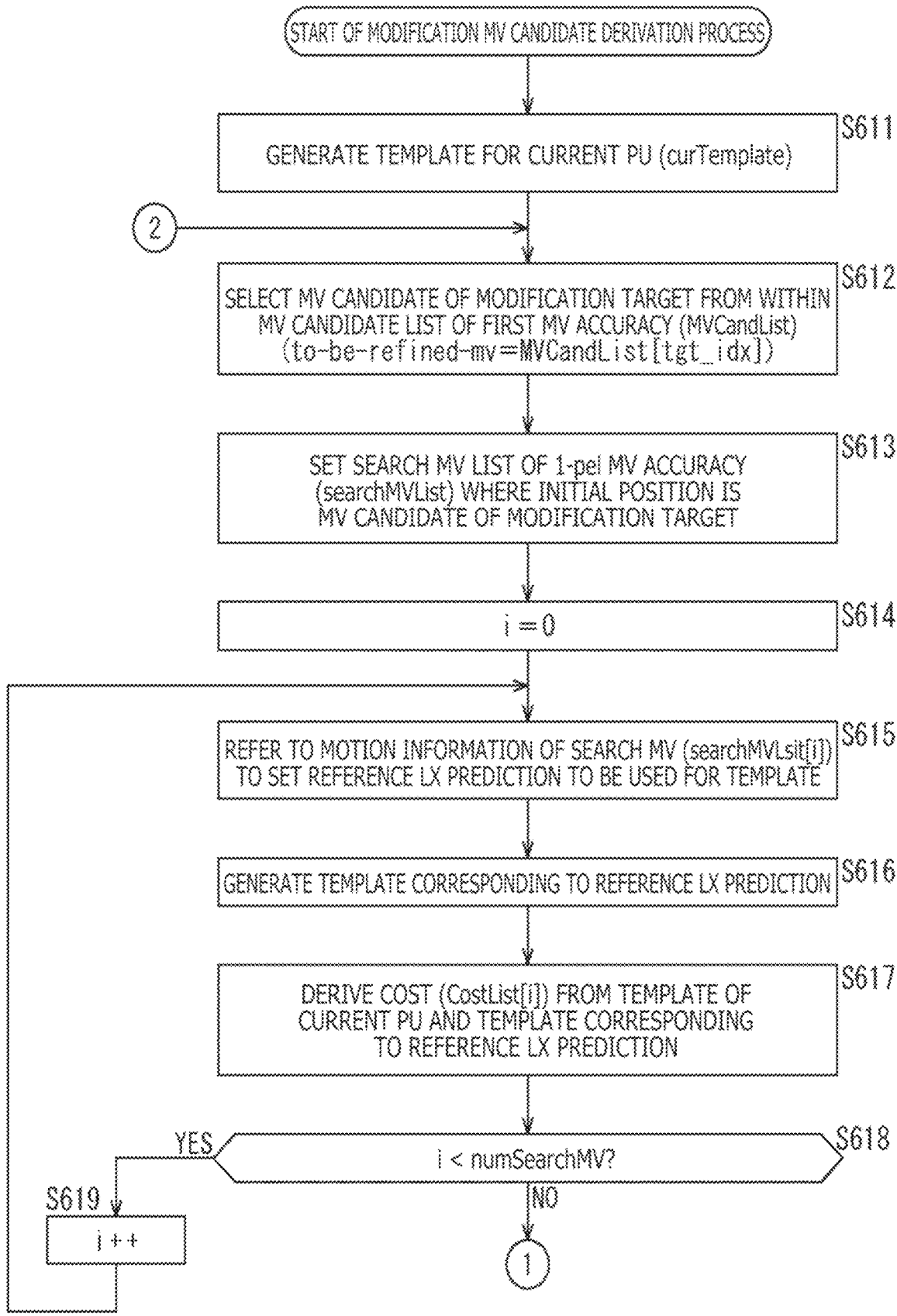
FIG. 52 is a flow chart illustrating an example of a flow of the modification MV candidate derivation process.

An example of a flow of the modification MV candidate derivation process executed in step S502 of FIG. 35 by the modification MV candidate derivation section 502 in this case (method #1-6 (and method #1-1)) is described with reference to flow charts of FIGS. 52 and 53.

After the modification MV candidate derivation process is started, the current PU template generation section 531 generates a template (curTemplate) of the current PU in step S611.

In step S612, the second MV accuracy search MV list derivation section 521 selects an MV candidate of a modification target from within the MV candidate list (MVCandList) of the first MV accuracy (to-be-refined-mv=MVCandList[tgt_idx]).

In step S613, the second MV accuracy search MV list derivation section 521 sets a search MV list (searchMVList) of the 1-pel MV accuracy in which the MV candidate of the modification target is an initial position.

In step S614, the search point template generation section 532 sets an initial value (for example, "0") to the variable i.

In step S615, the reference LX prediction setting section 581 refers to the motion information of the search MV (searchMVList[i]) to set reference LX prediction to be used for a template.

In step S616, the search point template generation section 532 generates a template corresponding to the reference LX prediction set in step S615.

In step S617, the cost calculation section 533 derives a cost (CostList[i]) on the basis of the template of the current PU generated in step S611 and the template corresponding to the reference LX prediction generated in step S616. In short, the cost calculation section 533 performs template matching using the templates to derive a cost.

In step S618, the search point template generation section 532 decides whether or not the value of the variable i is smaller than a value (numSearchMV) indicative of the number of search points included in the search MV list (searchMVList). In the case where it is decided that the variable i is smaller than the value (numSearchMV) (i<numSearchMV), the processing advances to step S619.

In step S619, the search point template generation section 532 increments the variable i ("+1" is added to the value of the variable i). After the process in step S619 ends, the processing returns to step S615 and the processes in the subsequent steps are repeated.

In short, the processes in step S615 to step S619 are executed in regard to the cost (CostList[i]) corresponding to each search MV.

Figure 53:
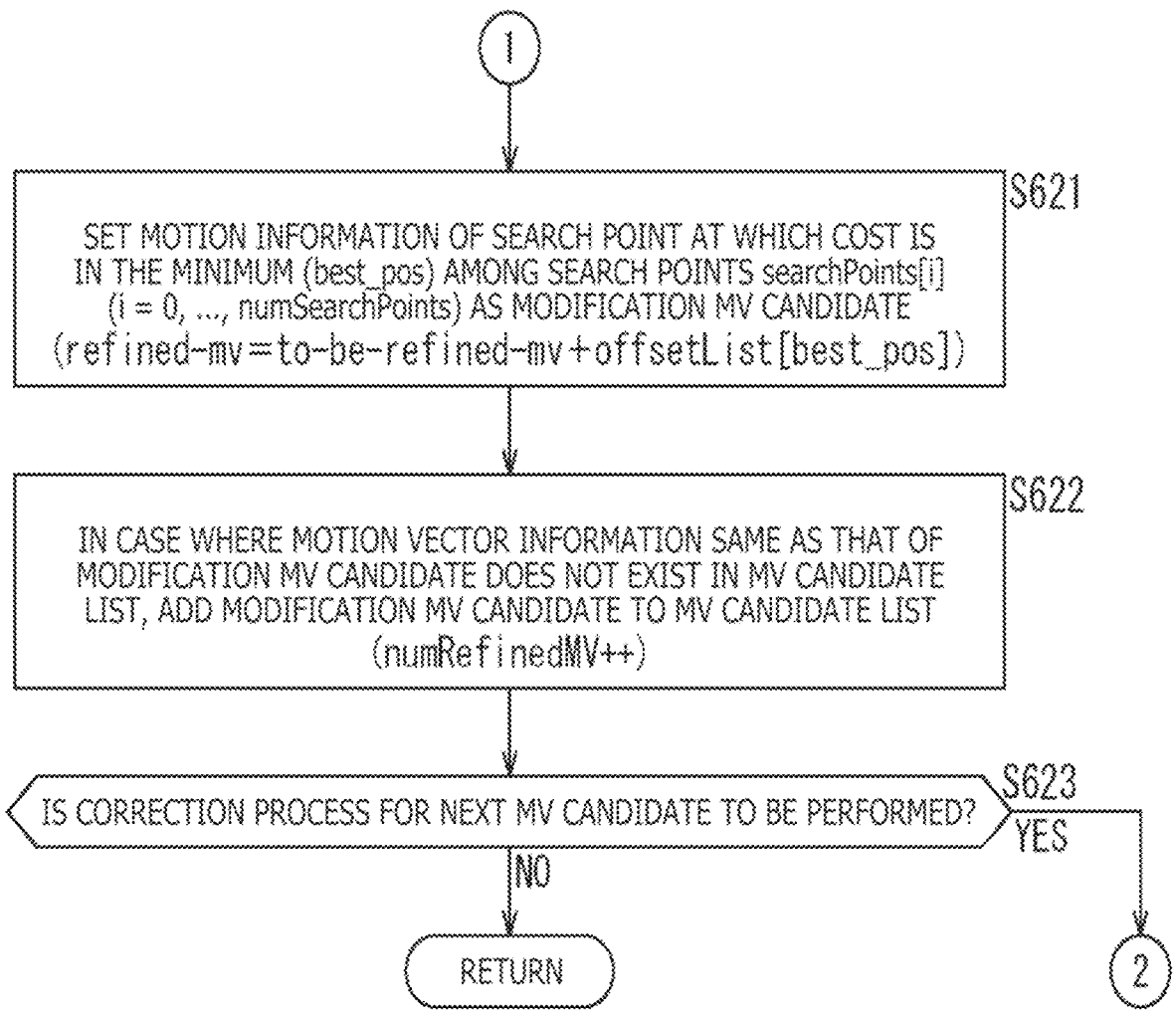
FIG. 53 is a flow chart, continued from FIG. 52, illustrating the example of the flow of the modification MV candidate derivation process.

Then, in the case where it is decided in step S618 that the variable i is equal to or greater than the value (numSearchMV) (i≥numSearchMV), the processing advances to step 621 of FIG. 53.

In step 621, the MV candidate list update section 522 sets motion information of the search point (best_pos) that indicates a minimum cost among the search points (searchPoints[i]) as a modification MV candidate (refined-mv=to-be-refined-mv+offsetList[best_pos]).

In step 622, in the case where motion vector information same as the modification MV candidate does not exist in the MV candidate list, the MV candidate list update section 522 adds the modification MV candidate to the MV candidate list (numRefinedMV++).

In step 623, the MV candidate list update section 522 decides whether or not the processing is to advance to a correction process for a next MV candidate. In the case where it is decided that the processing is to advance to a correction process for a next MV candidate, the processing returns to step 612 of FIG. 52. On the other hand, in the case where it is decided in step S623 of FIG. 53 that the processing is not to advance to a correction process for a next MV candidate, the modification MV candidate derivation process is ended.

By performing the modification MV candidate derivation process in such a manner as described above, the modification MV candidate derivation section 502 can suppress increase of the calculation amount of template matching (reduce the calculation amount) and can suppress increase of the load of the update process of the MV candidate list.

<Application to Image Encoding Apparatus>

It is to be noted that also the present technology described hereinabove in connection with the present embodiment can be applied to any apparatus, device, or the like similarly as in the case of the first embodiment. For example, the present embodiment may be applied to the image encoding apparatus 300 described hereinabove. For example, in the image encoding apparatus 300, the prediction section 322 may perform motion vector encoding, and at that time, the MV candidate list derivation section 331 may perform template matching to which at least any one of the methods #1-1 to #1-6 is applied to derive a modification MV candidate such that the MV candidate list is updated using the modification MV candidate.

The prediction section 322 performs encoding of a motion vector using the MV candidate list after updating. In short, the prediction section 322 performs inter prediction to generate a prediction image and uses a motion vector candidate list updated using the modification motion vector candidate to encode the motion vector to be used for generation of the prediction image.

By doing this, template matching that is performed in a modification MV candidate derivation process can be simplified. Accordingly, the prediction section 322 can suppress increase of the load of encoding of a motion vector (reduce the load).

<Application to Image Decoding Apparatus>

Similarly, also the present technology described in connection with the present embodiment may be applied to the image decoding apparatus 400 described above. For example, in the image decoding apparatus 400, the prediction section 419 may perform restoration of a motion vector, and at that time, the MV candidate list derivation section 431 may perform template matching to which at least any one of the methods #1-1 to #1-6 is applied to derive a modification MV candidate such that the MV candidate list is updated using the modification MV candidate.

The prediction section 419 performs restoration of a motion vector using the MV candidate list after updating. In short, the prediction section 419 restores a motion vector to be used for generation of a prediction image using the motion vector candidate list updated using the modification motion vector candidate.

By doing this, template matching that is performed in a modification MV candidate derivation process can be simplified. Accordingly, the prediction section 419 can suppress increase of the load of restoration of a motion vector (reduce the load).

<Combination>

It is to be noted that both sorting of an MV candidate list described hereinabove in connection with the first embodiment and derivation of a modification MV candidate described hereinabove in connection with the fourth embodiment may be performed. For example, the first MV accuracy MV candidate list derivation section 101, the MV candidate list sorting section 102, and the modification MV candidate derivation section 502 depicted in FIGS. 4 and 34 may be connected in series to each other such that the first MV accuracy MV candidate list derivation section 101 derives an MV candidate list of the first MV accuracy and the MV candidate list sorting section 102 sorts the MV candidate list and then the modification MV candidate derivation section 502 derives a modification MV candidate and updates the MV candidate list after sorting.

6. Fifth Embodiment

<Application of Difference Motion Vector to Sign Derivation>

Figure 54:
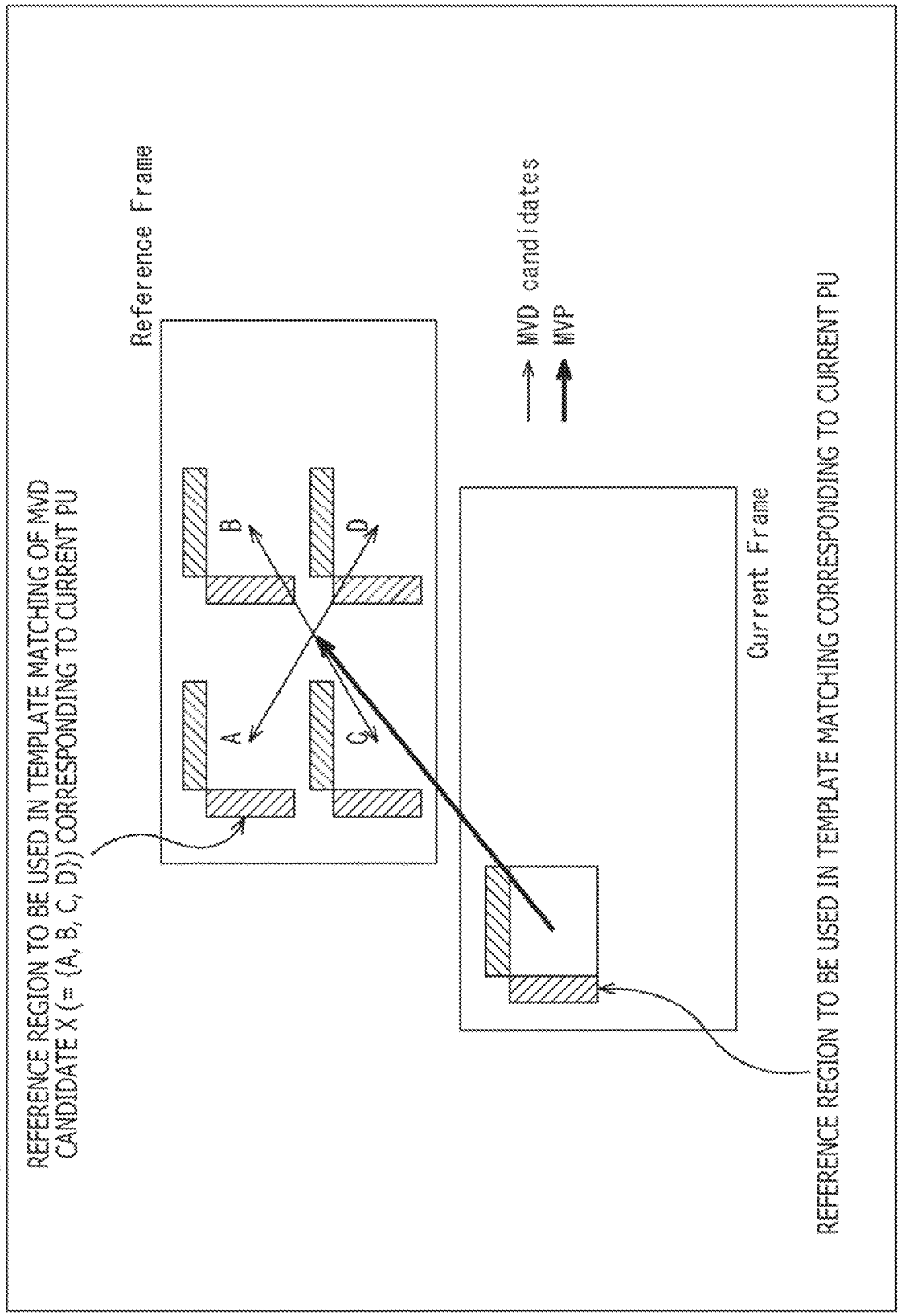
FIG. 54 is a view illustrating an example of a manner of selection of a difference motion vector candidate.

The present technology can be applied also to apparatuses other than the examples described above. For example, in NPL 7, a method is proposed that signaling of a difference motion vector is performed by a combination of absolute values in an x direction and a y direction and signs, and in order to derive a combination of such signs, the cost of each candidate for a combination of signs is derived by template matching and then the candidates are sorted in a cost order so as to be converted into a list such that a candidate is selected from within the candidate list (FIG. 54).

Also to such processing, the present technology described above can be applied to simplify template matching.

<Flow of Motion Vector Derivation Process>

Figure 55:
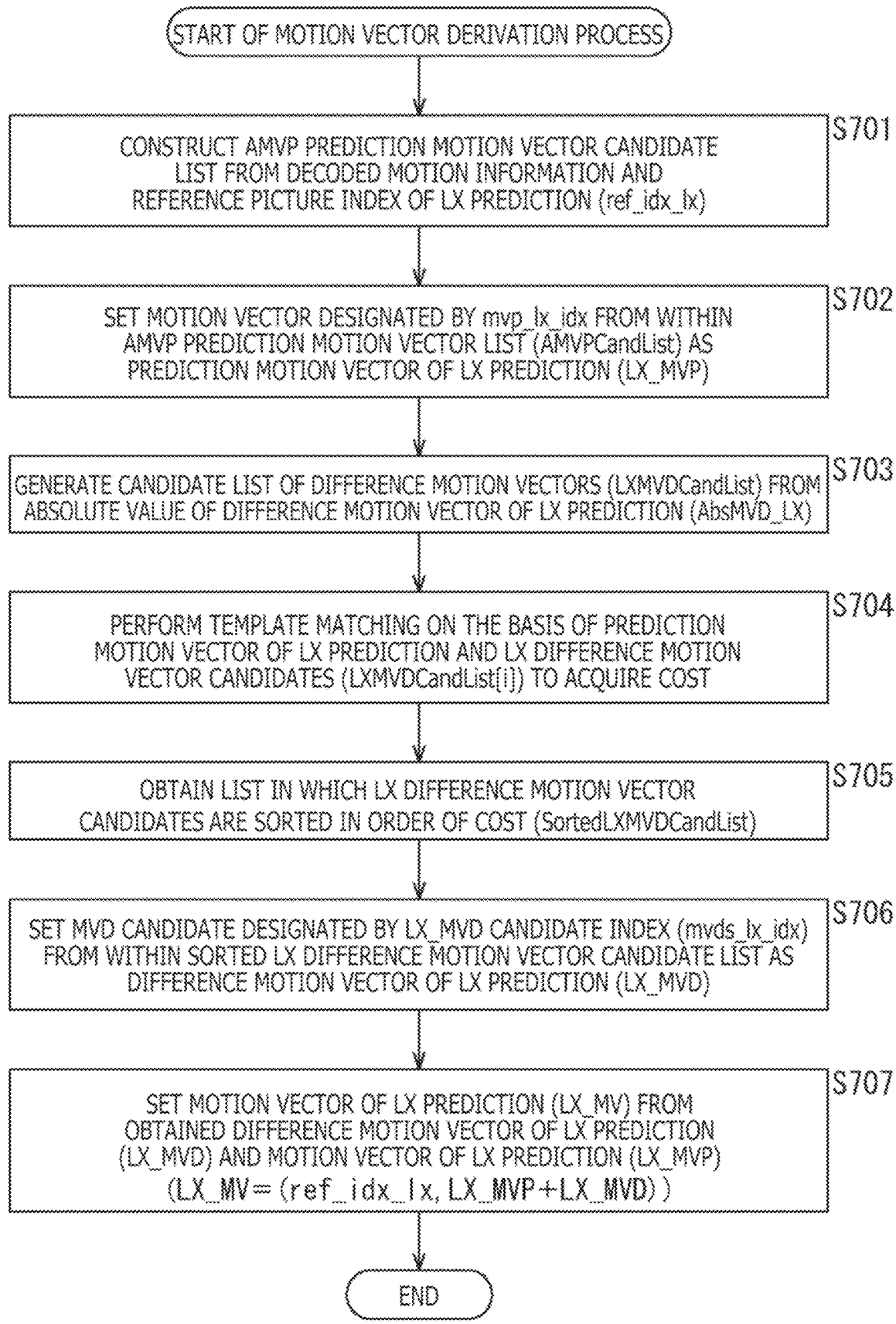
FIG. 55 is a flow chart illustrating an example of a flow of a motion vector derivation process.

An example of a flow of a motion vector derivation process executed in such a case as just described is described with reference to a flow chart of FIG. 55.

An AMVP (Adaptive Motion Vector Prediction) prediction motion vector candidate list is constructed from decoded motion information and a reference picture index (re_idx_lx) of LX prediction (step S701).

A motion vector designated by mvp_lx_idx from within the AMVP prediction motion vector list (AMVPCandList) is set as a prediction motion vector of the LX prediction (LX_MVP) (step S702).

A candidate list of difference motion vectors (LXMVDCandList) is generated from absolute values of such difference motion vectors of the LX prediction (AbsMVD_LX) (step S703).

Template matching is performed on the basis of the prediction motion vectors of the LX prediction and the LX difference motion vector candidates (LXMVDCandList[i]) to acquire a cost (step S704).

A list in which the LX difference motion vector candidates are sorted into the order of the cost (SortedLXMVDCandList) is obtained (step S705).

An MVD candidate designated by the LX_MVD candidate index (muds_lx_idx) from within the sorted LX difference motion vector candidate list is set as a difference motion vector (LX_MVD) of the LX prediction (step S706).

A motion vector of the LX prediction (LX_MV) is set from the found difference motion vector of the LX prediction (LX_MVD) and the motion vector of the LX prediction (LX_MVP) (LX_MV=(ref_idx_lx, LX_MVP+LX_MVD)) (step S707).

In such processes as described above, the present technology described hereinabove is applied to the process in step S704 to simplify the template matching. By doing this, increase of the load of template matching can be supplied. In short, increase of the load of derivation of a difference motion vector can be suppressed.

7. Appendix

<Computer>

While the series of processes described above can be executed by hardware, it can otherwise be executed also by software. In the case where the series of processes is executed by software, a program that constructs the software is installed into a computer. The computer here includes a computer that is incorporated in hardware for exclusive use, a personal computer, for example, for universal use that can execute various kinds of functions by installing various kinds of programs into the personal computer or the like.

FIG. 56 is a block diagram depicting an example of a hardware configuration of a computer that executes the series of processes described hereinabove in accordance with a program.

In the computer 800 depicted in FIG. 56, a CPU (Central Processing Unit) 801, a ROM (Read Only Memory) 802, and a RAM (Random Access Memory) 803 are connected to one another by a bus 804.

Also an input/output interface 810 is connected to the bus 804. An inputting section 811, an outputting section 812, a storage section 813, a communication section 814, and a drive 815 are connected to the input/output interface 810.

The inputting section 811 includes, for example, a keyboard, a mouse, a microphone, a touch panel, an input terminal, and so forth. The outputting section 812 includes, for example, a display, a speaker, an output terminal, and so forth. The storage section 813 includes, for example, a hard disk, a RAM disk, a nonvolatile memory, or the like. The communication section 814 includes, for example, a network interface. The drive 815 drives a removable medium 821 such as a magnetic disk, an optical disk, a magneto-optical disk, or a semiconductor memory.

In the computer configured in such a manner as described above, the CPU 801 loads a program stored, for example, in the storage section 813 into the RAM 803 through the input/output interface 810 and the bus 804 and executes the program to perform the series of processes described above. Into the RAM 803, also data and so forth necessary for the CPU 801 to execute various kinds of processes are stored suitably.

The program to be executed by the computer (CPU 801) can be recorded on and applied as a removable medium 821 as, for example, a package medium. In this case, by mounting the removable medium 821 on the drive 815, the program can be installed into the storage section 813 through the input/output interface 810.

Also it is possible to provide this program through a wired or wireless transmission medium such as a local area network, the Internet, or a digital satellite broadcast. In this case, the program can be received by the communication section 814 and installed into the storage section 813.

Alternatively, also it is possible to install the program in the ROM 802 or the storage section 813 in advance.

<Unit of Information and Processing>

Data units with which various kinds of information described hereinabove are set and data units that are made a target of the various kinds of processes may each be freely decided and are not restricted to the examples described hereinabove. For example, such information or processes may be set for each TU (Transform unit), TB (Transform Block), PU (Prediction Unit), PB (Prediction Block), CU (Coding Unit), LCU (Large Coding Unit), sub block, block, tile, slice, picture, sequence, or component, or data of such data units may be targeted. Naturally, the data units can be set for each piece of information or for each process, and the data units of all information or all processes need not be unified. It is to be noted that the storage location of such information may be freely decided and may be stored in headers, parameter sets, or the like of the data units described above. Further, such information may be stored at a plurality of locations.

<Control Information>

The control information relating to the present technology described hereinabove in connection with the embodiments may be transmitted from the encoding side to the decoding side. For example, control information for controlling whether or not it is to be permitted (or inhibited) to apply the present technology described hereinabove (for example, enabled_flag) may be transmitted. Further, control information, for example, indicative of a target to which the present technology described above is to be applied (or a target to which the present technology is not to be applied) may be transmitted. For example, control information that designates a block size (an upper limit or a lower limit or both of them), a frame, a component, a layer, or the like to which the present technology is to be applied (or such application is to be permitted or inhibited) may be transmitted.

<Application Target of Present Technology>

The present technology can be applied to any image encoding and decoding methods. In short, specifications of various kinds of processes relating to image encoding and decoding such as transform (inverse transform), quantization (dequantization), encoding (decoding), and prediction may be freely decided and are not restricted to the examples described above unless they are contradictory to the present technology described above. Further, part of the processes described above may be omitted unless it is contradictory to the present technology described above.

Further, the present technology can be applied to multi-view image encoding and decoding systems that perform encoding and decoding of multi-view images including images of a plurality of points of view. In this case, it is sufficient if the present technology is applied to encoding and decoding of each point of view.

Furthermore, the present technology can be applied to hierarchical image encoding (scalable encoding) and decoding systems that performs encoding and decoding of hierarchical images having multiple layers (hierarchies) so as to have a scalability function in regard to a predetermined parameter. In this case, it is sufficient if the present technology is applied to encoding and decoding of each hierarchy (layer).

The image processing apparatus, the image encoding apparatus, and the image decoding apparatus according to the embodiments described above can be applied to various kinds of electronic equipment such as, for example, transmitters and receivers (for example, television receivers and portable telephone sets) in wired broadcasting of satellite broadcasting and cable TV broadcasting or on the Internet or delivery to terminals by cellular communication; or apparatuses that record images on such a medium as an optical disk, a magnetic disk, or a flash memory or reproduce images from such storage media (for example, hard disk recorders and cameras).

Also it is possible to carry out the present technology in any configuration that is incorporated in any apparatus or any apparatus that configures a system, for example, a processor (for example, a video processor) as a system LSI (Large Scale Integration), a module (for example, a video module) that uses a plurality of processors and so forth, a unit (for example, a video unit) that uses a plurality of modules and so forth, a set (for example, a video set) to which some other function is added to a unit, and so forth (namely, as a configuration of part of an apparatus).

Also it is possible to apply the present technology to a network system configured from a plurality of apparatuses. For example, the present technology can be applied also to a cloud service that provides a service relating to an image (moving image) to any terminal such as a computer, AV (Audio Visual) equipment, a portable information processing terminal, an IoT (Internet of Things) device, and so forth.

It is to be noted that a system, an apparatus, a processing section, and so forth to which the present technology is applied can be utilized in any field of, for example, traffic, medical, crime prevention, agriculture, livestock industry, mining, beauty, factory, home appliances, weather, nature monitoring, and so forth. Also the application of them may be freely decided.

For example, the present technology can be applied to a system or a device that is used for provision of content for viewing. Further, for example, the present technology can be applied also to a system or a device provided for traffic such as monitoring of a traffic situation or autonomous driving control. Furthermore, for example, the present technology can be applied also to a system or a device that is used for the security. Furthermore, for example, the present technology can be applied also to a system or a device used for automatic control of machines or the like. Further, for example, the present technology can be applied to a system or a device used for the agriculture or the livestock industry. Further, the present technology can be applied also to a system or a device for monitoring a state of the nature such as, for example, a volcano, a forest, or an ocean, or monitoring wild animals. Furthermore, for example, the present technology can be applied also to a system or a device used for sports.

<Others>

It is to be noted that the term "flag" in the present specification signifies information for identifying a plurality of states and includes not only information to be used when two states of the true (1) and the false (0) are to be identified but also information capable of identifying three or more states. Accordingly, the value that can be taken by the "flag" may be, for example, two values of 1/0 or may be three values or more. In other words, the bit number configuring the "flag" may be freely decided and may be 1 bit or a plurality of bits. Further, the identification information (including a flag) is assumed to have not only a form in which the identification information is included in a bit stream but also a form in which difference information of the identification information with respect to information that becomes a certain reference is included in a bit stream. Therefore, in the present specification, the "flag" and the "identification information" include not only information of themselves but also difference information of such information with respect to reference information.

Further, various kinds of information (metadata and so forth) relating to encoded data (bit stream) may be transmitted or recorded in any form if they are associated with the encoded data. Here, the term "associate" signifies that, for example, when one piece of the data is to be processed, the other piece of the data can be used (linked). In short, data pieces associated with each other may be put together as one data or may be individual separate pieces of data. For example, information associated with encoded data (image) may be transmitted on a transmission line different from that of the encoded data (image). Further, for example, information associated with encoded data (image) may be recorded on a recording medium separate from that of the encoded data (image) (or in a recording area of the same recording medium). It is to be noted that this "association" may be not of the overall data but of part of such data. For example, an image and information corresponding to the image may be associated with each other in any unit such as a plurality of frames, one frame, or a portion in a frame.

It is to be noted that, in the present specification, such terms as "synthesize," "multiplex," "add," "integrate," "include," "store," "put forth," "put in," and "insert" signify to combine multiple things into one such as to combine, for example, encoded data and metadata into one data, and signifies one method of the "association" described above.

Further, the embodiment of the present technology is not limited to the embodiments described hereinabove and allows various alterations without departing from the subject matter of the present technology.

Further, for example, the configuration described as one apparatus (or one processing section) may be divided so as to configure a plurality of apparatuses (or processing sections). Conversely, the configurations described as a plurality of apparatuses (or processing sections) in the foregoing description may be put together so as to configure a single apparatus (or processing section). Further, a configuration not described hereinabove may naturally be added to the configuration of each apparatus (or processing section). Furthermore, if a configuration or operation of an entire system is substantially the same, then some of the components of a certain apparatus (or processing section) may be included in the configuration of some other apparatus (or some other processing section).

It is to be noted that, in the present specification, the term system is used to signify an aggregation of a plurality of components (devices, modules (parts), and so forth) and it does not matter whether or not all components are accommodated in a same housing. Accordingly, a plurality of apparatuses accommodated in separate housings and connected to each other through a network is a system, and also one apparatus in which a plurality of modules is accommodated in a single housing is a system.

Further, for example, the present technology can take a configuration of cloud computing by which one function is shared and cooperatively processed by a plurality of apparatuses through a network.

Further, for example, the program described above can be executed by any apparatus. In this case, it is sufficient if the apparatus has necessary functions (functional blocks and so forth) and can obtain necessary information.

Further, each of the steps of the flow charts described hereinabove can be executed by a single apparatus and can be shared and executed by a plurality of apparatuses. Further, in the case where a plurality of processes is included in one step, the plurality of processes included in the one step can be executed by one apparatus and can be shared and executed by a plurality of apparatuses. In other words, it is also possible to execute a plurality of processes included in one step as a process of a plurality of steps. Conversely, also it is possible to execute a process described as a plurality of steps collectively as one step.

It is to be noted that, in a program to be executed by a computer, processes of steps that describe the program may be carried out in a time series in the order as described in the present specification or may be executed in parallel or executed individually at necessary timings such as when the process is called. In short, the processes in the steps may be executed in an order different from the order described hereinabove unless they give rise to a contradiction. Further, the processes in the steps that describe this program may be executed in parallel to processes of some other program or may be executed in combination with processes of some other apparatus.

It is to be noted that a plurality of technologies relating to the present technology described in the present specification can be carried out alone and independently of each other unless they give rise to a contradiction. Naturally, a plurality of ones of the present technologies can be carried out together. For example, also it is possible to carry out part or the entirety of the present technology described in connection with any of the embodiments in combination with part or the entirety of the present technology described in connection of a different one or ones of the embodiments. Also, it is possible to carry out any part or the entirety of the present technology described hereinabove together with some other technology that is not described hereinabove.

REFERENCE SIGNS LIST

100 MV candidate list derivation apparatus, 101 First MV accuracy MV candidate list derivation section, 102 MV candidate list sorting section, 111 Template matching section, 121 Second MV accuracy MV candidate list derivation section, 122 MV candidate list sorting section, 131 Current PU template generation section, 132 Reference block template generation section, 133 Cost calculation section, 141 Overlapping MV detection section, 151 Template thinning rate derivation section, 161 Template size setting section, 171 Block size decision section, 181 Reference LX prediction setting section, 300 Image encoding apparatus, 322 Prediction section, 331 MV candidate list derivation section, 400 Image decoding apparatus, 419 Prediction section, 431 MV candidate list derivation section, 502 Modification MV candidate derivation section, 511 Template matching section, 521 Second MV accuracy search MV list derivation section, 522 MV candidate list update section, 531 Current PU template generation section, 532 Search point template generation section, 533 Cost calculation section, 541 Overlapping MV detection section, 551 Template thinning rate derivation section, 561 Template size setting section, 571 Block size decision section, 581 Reference LX prediction setting section

The invention claimed is:

1. An image processing apparatus comprising:
processing circuitry configured to
perform, for each of motion vector candidates of lower accuracy than accuracy of a motion vector candidate list, template matching between a template of a current block and a template of a reference block to derive a cost;
sort elements of the motion vector candidate list on a basis of the costs of the motion vector candidates derived by the processing circuitry; and
perform template matching between the template of the current block having a sampling interval according to a size of the current block and the template of the reference block having a sampling interval according to the size of the current block to derive the cost.

2. The image processing apparatus according to claim 1, the processing circuitry is further configured to:
derive a motion vector candidate list of integer pixel accuracy corresponding to a motion vector candidate list of decimal pixel accuracy, wherein
perform, for each of motion vector candidates in the motion vector candidate list of the integer pixel accuracy derived by the processing circuitry, template matching between the template of the current block and the template of the reference block to derive a cost, and
sort elements of the motion vector candidate list of the decimal pixel accuracy on a basis of the costs of the motion vector candidates derived by the processing circuitry.

3. The image processing apparatus according to claim 1, wherein
the processing circuitry skips template matching for a motion vector candidate same as a motion vector candidate for which template matching has been performed.

4. The image processing apparatus according to claim 1, wherein
the processing circuitry is configured to skip processing in a case where the current block is smaller than a predetermined threshold value.

5. The image processing apparatus according to claim 1, wherein
the processing circuitry sets single prediction for motion vector candidates of multiple prediction and performs template matching between the template of the current block and the template of the reference block as a motion vector candidate of the single prediction to derive the cost.

6. The image processing apparatus according to claim 1, wherein the processing circuitry is further configured to:
perform inter prediction to generate a prediction image and encode a motion vector to be used for generation of the prediction image by use of the motion vector candidate list in which the elements are sorted by the sorting section.

7. The image processing apparatus according to claim 1, wherein the processing circuitry is further configured to:
restore a motion vector to be used for generation of a prediction image by use of the motion vector candidate list in which the elements are sorted by the sorting section.

8. An image processing method comprising:
performing, for each of motion vector candidates of lower accuracy than accuracy of a motion vector candidate list, template matching between a template of a current block and a template of a reference block to derive a cost;
sorting elements of the motion vector candidate list on a basis of the derived costs of the motion vector candidates; and
performing template matching between the template of the current block having a sampling interval according to a size of the current block and the template of the reference block having a sampling interval according to the size of the current block to derive the cost.

9. An image processing apparatus comprising:
processing circuitry configured to
perform, for each of motion vector candidates of lower accuracy than accuracy of a motion vector candidate list, template matching between a template of a current block and a template of a search point to derive a cost; and
derive a modification motion vector candidate on a basis of the costs of the motion vector candidates derived by the processing circuitry and update the motion vector candidate list by use of the derived modification motion vector candidate; and
perform template matching between the template of the current block of a size according to a position of the current block and the template of the search point of a size according to the position of the current block to derive the cost.

10. The image processing apparatus according to claim 9, wherein the processing circuitry is further configured to:
  derive a motion vector candidate list of integer pixel accuracy corresponding to a motion vector candidate list of decimal pixel accuracy, wherein
  perform, for each of motion vector candidates in the motion vector candidate list of the integer pixel accuracy derived by the processing circuitry, template matching between the template of the current block and the template of the search point to derive a cost, and
  derive the modification motion vector candidate on a basis of the costs of the motion vector candidates derived by the processing circuitry and update the motion vector candidate list of the decimal pixel accuracy by use of the derived modification motion vector candidate.

11. The image processing apparatus according to claim 9, wherein
  the processing circuitry skips template matching for a motion vector candidate same as a motion vector candidate for which template matching has been performed.

12. The image processing apparatus according to claim 9, wherein
  the processing circuitry skips processing in a case where the current block is smaller than a predetermined threshold value.

13. The image processing apparatus according to claim 9, wherein
  the processing circuitry sets single prediction for motion vector candidates of multiple prediction and performs template matching between the template of the current block and the template of the search point as a motion vector candidate of the single prediction to derive the cost.

14. The image processing apparatus according to claim 9, wherein the processing circuitry is further configured to:
  perform inter prediction to generate a prediction image and encode a motion vector to be used for generation of the prediction image by use of the motion vector candidate list updated by the update section using the modification motion vector candidate.

15. The image processing apparatus according to claim 9, wherein the processing circuitry is further configured to:
  restore a motion vector to be used for generation of a prediction image by use of the motion vector candidate list updated by the update section using the modification motion vector candidate.

16. An image processing method comprising:
  performing, for each of motion vector candidates of lower accuracy than accuracy of a motion vector candidate list, template matching between a template of a current block and a template of a search point to derive a cost;
  deriving a modification motion vector candidate on a basis of the derived costs of the motion vector candidates and updating the motion vector candidate list by use of the derived modification motion vector candidate; and
  performing template matching between the template of the current block of a size according to a position of the current block and the template of the search point of a size according to the position of the current block to derive the cost.

* * * * *